US011510131B2

(12) United States Patent
Zhu et al.

(10) Patent No.: US 11,510,131 B2
(45) Date of Patent: Nov. 22, 2022

(54) CONFIGURATION METHOD, DATA TRANSMISSION METHOD, AND APPARATUS

(71) Applicant: HUAWEI TECHNOLOGIES CO., LTD., Guangdong (CN)

(72) Inventors: Yuanping Zhu, Shanghai (CN); Mingzeng Dai, Shenzhen (CN); Jing Liu, Shanghai (CN); Yibin Zhuo, Shanghai (CN); Yinghao Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/095,312

(22) Filed: Nov. 11, 2020

(65) Prior Publication Data

US 2021/0092667 A1 Mar. 25, 2021

Related U.S. Application Data

(63) Continuation of application No. PCT/CN2019/086706, filed on May 13, 2019.

(30) Foreign Application Priority Data

May 11, 2018 (CN) .......................... 201810451490.5

(51) Int. Cl.
H04W 40/24 (2009.01)
H04W 28/02 (2009.01)

(52) U.S. Cl.
CPC ..... *H04W 40/248* (2013.01); *H04W 28/0268* (2013.01)

(58) Field of Classification Search
CPC . H04W 24/02; H04W 24/248; H04W 40/248; H04W 28/0263; H04W 28/0268; H04W 84/047; H04W 88/085
See application file for complete search history.

(56) References Cited

U.S. PATENT DOCUMENTS 10,945,185 B2 * 3/2021 Hong ..................... H04W 76/19
2018/0227919 A1 * 8/2018 Lee ................... H04W 72/0413
(Continued)

FOREIGN PATENT DOCUMENTS

CN 101335715 A 12/2008
CN 102422705 A 4/2012
(Continued)

OTHER PUBLICATIONS

Samsung Electronics RandD Institute UK, "Adaptation layer for the CU-DU split architecture and its location within the IAB donor node," 3GPP TSG-RAN WG3 #99-bis, R3-181821, Sanya, China, Apr. 16-20, 2018, 4 pages.

(Continued)

*Primary Examiner* — Huy D Vu
*Assistant Examiner* — Bailor C Hsu
(74) *Attorney, Agent, or Firm* — Fish & Richardson P.C.

(57) ABSTRACT

This application provides wireless communications configuration methods and apparatuses. One method includes: receiving a routing configuration of a transmission path for a layer of the network device, wherein the routing configuration comprises an identifier of a first wireless backhaul node, the network device is a distributed unit (DU) of the donor node or a second wireless backhaul node connected to the DU, the CU and at least one wireless backhaul node is on the transmission path, and wherein the layer of the network device is capable of mapping, on a backhaul link based on identification information related to quality of service (QoS) requirement comprised in a data packet, the data packet to a radio link control (RLC) channel on a backhaul link for sending the data packet to a next-hop node of the network device on the transmission path; and performing the routing configuration on the layer.

12 Claims, 32 Drawing Sheets

(56) References Cited

U.S. PATENT DOCUMENTS

| | | | | |
|---|---|---|---|---|
| 2018/0337846 | A1* | 11/2018 | Lee | H04L 45/50 |
| 2019/0289492 | A1* | 9/2019 | Hampel | H04W 76/12 |
| 2020/0100124 | A1* | 3/2020 | Hampel | H04B 7/15528 |
| 2020/0146083 | A1* | 5/2020 | Wang | H04L 41/0806 |
| 2020/0351198 | A1* | 11/2020 | Majmundar | H04L 43/0805 |
| 2021/0051512 | A1* | 2/2021 | Hampel | H04W 80/06 |
| 2021/0392565 | A1* | 12/2021 | Akl | H04W 40/248 |

FOREIGN PATENT DOCUMENTS

| | | |
|---|---|---|
| EP | 3761698 A1 | 1/2021 |
| WO | 0235863 A2 | 5/2002 |
| WO | 2012114527 A1 | 8/2012 |
| WO | 2019216670 A1 | 11/2019 |

OTHER PUBLICATIONS

Office Action issued in Chinese Application No. 201810451490.5 dated Dec. 2, 2020, 8 pages.

Huawei, Hisilicon, "Adaptation layer based L2 relaying and light L2 relaying," 3GPP TSG-RAN WG2 #99bis, R3-181999, Sanya, China, Apr. 16-20, 2018, 9 pages.

Huawei, HiSilicon, "Comparison of L2 and L3 relay architectures," 3GPP TSG-RAN WG2 Ad Hoc, R2-1801132, Vancouver, Canada, Jan. 22-26, 2018, 3 pages.

Office Action issued in Chinese Application No. 201810451490.5 dated Apr. 22, 2020, 8 pages.

PCT International Search Report and Written Opinion issued in International Application No. PCT/CN2019/086706 dated Aug. 12, 2019, 15 pages (with English translation).

Catt, "Considerations on bearer management for L2 IAB architecture," 3GPP TSG-RAN WG3 #99bis, R3-181757, Sanya, China, Apr. 16-20, 2018, 3 pages.

Extended European Search Report issued in European Application No. 19799601.0 dated Jun. 2, 2021, 19 pages.

Zte, "Discussion on IAB architectures," 3GPP TSG-RAN WG3 Meeting #99bis, R3-181829, Sanya, China, Apr. 16-20, 2018, 9 pages.

* cited by examiner

CONFIGURATION METHOD, DATA TRANSMISSION METHOD, AND APPARATUS

CROSS-REFERENCE TO RELATED APPLICATIONS

This application is a continuation of International Application No. PCT/CN2019/086706, filed on May 13, 2019, which claims priority to Chinese Patent Application No. 201810451490.5, filed on May 11, 2018, The disclosures of the aforementioned applications are hereby incorporated by reference in their entireties.

TECHNICAL FIELD

Embodiments of this application relate to the field of communications technologies, and in particular, to a configuration method, a data transmission method, and an apparatus.

BACKGROUND

Compared with a 4th generation (4G) mobile communications system, a 5th generation (5G) mobile communications system has a stricter requirement on each network performance indicator, for example, a requirement for an ultra-high capacity (a capacity indicator is increased by 1000 times), a requirement for wider coverage, and a requirement for ultra-high reliability and a low latency. On the one hand, it is considered that high frequency carriers have rich frequency resources, so that in a hotspot area, to meet the requirement for an ultra-high capacity in 5G, networking may be performed by using high frequency small cells. High frequency carriers have a relatively poor propagation feature, are severely attenuated by obstacles, and have small coverage. Therefore, a large quantity of small cells need to be densely deployed. However, it is costly to provide and it is difficult to deploy fiber backhaul for the large quantity of densely deployed small cells. On the other hand, it is difficult and costly to deploy optical fibers to provide network coverage in some remote areas to meet the requirement for wide coverage. Currently, an integrated access and backhaul (IAB) technology can be used to resolve the foregoing two problems.

In an IAB scenario, there is an access link (AL) between an IAB node (which may also be referred to as a relay node (RN)) and user equipment (UE), and there is a backhaul link (BL) between the IAB node and a donor node (IAB donor), which may also be referred to as a donor gNodeB (e.g. donor gNodeB (DgNB)). A wireless transmission solution is applied to both the access link and the backhaul link. Referring to FIG. 1, each of an IAB node 1 and an IAB node 2 may provide a radio access service for user equipment (UE, user equipment). Service data of the UE is transferred to the IAB node 1 or the IAB node 2 through an AL, and then the IAB node 1 or the IAB node 2 transmits the service data of the UE to a donor gNodeB through a BL.

Currently, designing of an IAB protocol architecture may include a layer 2 (L2) forwarding-based IAB protocol architecture and a layer 3 (L3) forwarding-based IAB protocol architecture. For the L2 IAB protocol architecture, in an uplink transmission process, to enable an IAB node to forward an uplink data packet to a correct destination node based on a data packet quality-of-service requirement; or in a downlink transmission process, to enable an IAB node to forward a downlink data packet to a correct destination node, currently, adaptation information (for example, information required for routing and quality of service (QoS) mapping) may be provided at an adaptation layer (adapt).

However, for an uplink data packet, adaptation information required in a forwarding process is first added (which may also be referred to as configured) by an IAB node. However, for a downlink data packet, a node that first adds required adaptation information, a node participating in data forwarding (including the IAB node that adds the uplink adaptation information), and how to obtain the adaptation information are not defined in the prior art at present.

SUMMARY

Embodiments of this application provide a configuration method, a data transmission method, and an apparatus, to provide a necessary configuration required for data transmission in an IAB scenario.

To resolve the foregoing technical problem, the embodiments of this application provide the following technical solutions:

According to a first aspect, this application provides a configuration method. The method includes: receiving, by a first device, configuration information sent by a radio access network RAN device, where the configuration information includes a routing configuration for an adaptation layer of the first device on a transmission path; the transmission path includes the RAN device and at least one wireless backhaul node: the routing configuration includes an identifier of a second device; the first device is a distributed unit DU of a donor node or a first wireless backhaul node in the at least one wireless backhaul node; and the second device is a second wireless backhaul node in the at least one wireless backhaul node, or a terminal served by the first wireless backhaul node in the at least one wireless backhaul node, or a terminal served by a second wireless backhaul node; and performing, by the first device, the routing configuration on the adaptation layer of the first device.

According to the configuration method provided in this embodiment of this application, the RAN device configures the routing configuration for the first device. In this way, the first device can determine a descendant node and a child node of the first device based on the configuration information, so that a data packet can be forwarded to a correct next-hop node in a data forwarding process, until the data packet is transferred to a destination node.

With reference to the first aspect, in a first possible implementation of the first aspect, the configuration information further includes a quality of service QoS configuration that is used for the first device to perform data transmission on the transmission path. The QoS configuration is configured for the first device, so that a data packet can be forwarded by correctly selecting a radio bearer based on quality of service of the data packet.

Optionally, the quality of service QoS configuration includes one or more of the following: a QoS identifier, a QoS parameter corresponding to the QoS identifier, a mapping relationship between the QoS identifier and a radio bearer or a logical channel on a wireless interface of the first device, and a mapping relationship between a radio bearer or a logical channel on a prior-hop wireless interface of the first device and a radio bearer or a logical channel on a next-hop wireless interface.

With reference to the first aspect or the first possible implementation of the first aspect, in a second possible implementation of the first aspect, the first device is the first wireless backhaul node, and the method provided in this embodiment of this application further includes: receiving, by the first device, indication information sent by the RAN device, where the indication information is used to indicate an automatic repeat request ARQ mode of the first device at a radio link control RLC layer. The ARQ mode is configured for the first device. In this way, when a data packet fails to be transmitted, the first device can select a specified mode to process the data packet.

With reference to any one of the first aspect to the second possible implementation of the first aspect, in a third possible implementation of the first aspect, the first device is the DU, and the method provided in this embodiment of this application further includes: receiving, by the first device, information that is sent by the RAN device and that is used to configure a packet data convergence protocol PDCP layer of the first device, where the PDCP layer of the first device is a peer layer of a PDCP layer of the second wireless backhaul node that serves the terminal. The PDCP layer is configured for the first device, so that the first device performs security protection processing on data/signaling.

With reference to any one of the first aspect to the third possible implementation of the first aspect, in a fourth possible implementation of the first aspect, the RAN device is a centralized unit CU of the donor node or the donor node, the first device is the first wireless backhaul node, and the method provided in this embodiment of this application further includes: receiving, by the first device, the information that is sent by the RAN device and that is used to configure the PDCP layer of the first device, where the PDCP layer of the first device is a peer layer of a PDCP layer of the RAN device or is a peer layer of a PDCP layer of the DU.

According to a second aspect, an embodiment of this application provides a configuration method. The method includes: sending, by a radio access network RAN device, configuration information to a first device, where the configuration information includes a routing configuration for an adaptation layer of the first device on a transmission path, the transmission path includes the RAN device and at least one wireless backhaul node; the routing configuration includes an identifier of a second device; the first device is a distributed unit DU of a donor node or a first wireless backhaul node in the at least one wireless backhaul node; and the second device is a second wireless backhaul node in the at least one wireless backhaul node, or a terminal served by the first wireless backhaul node in the at least one wireless backhaul node, or a terminal served by a second wireless backhaul node.

With reference to the second aspect, in a first possible implementation of the second aspect, the configuration information further includes a quality of service QoS configuration for the first device to perform data transmission on the transmission path.

With reference to the second aspect or the first possible implementation of the second aspect, in a second possible implementation of the second aspect, the first device is the first wireless backhaul node, and the method provided in this embodiment of this application further includes: sending, by the RAN device, indication information to the first device, where the indication information is used to indicate an automatic repeat request ARQ mode of the first device at a radio link control RLC layer.

With reference to any one of the second aspect to the second possible implementation of the second aspect, in a third possible implementation of the second aspect, the first device is the DU, and the method provided in this embodiment of this application further includes: sending, by the RAN device to the first device, information used to configure a packet data convergence protocol PDCP layer of the first device, where the PDCP layer of the first device is a peer layer of a PDCP layer of the second wireless backhaul node that serves the terminal.

With reference to any one of the second aspect to the third possible implementation of the second aspect, in a fourth possible implementation of the second aspect, the RAN device is a centralized unit CU of the donor node or the donor node, the first device is the first wireless backhaul node, and the method provided in this embodiment of this application further includes: sending, by the RAN device to the first device, the information used to configure the PDCP layer of the first device, where the PDCP layer of the first device is a peer layer of a PDCP layer of the RAN device or is a peer layer of a PDCP layer of the DU.

According to a third aspect, this application provides a configuration apparatus. The configuration apparatus can implement the method according to any one of the first aspect or the possible implementations of the first aspect, and therefore can further implement beneficial effects according to any one of the first aspect or the possible implementations of the first aspect. The apparatus may be a first device (for example, a wireless backhaul node), or may be an apparatus that can support a first device in implementing the method according to any one of the first aspect or the possible implementations of the first aspect, such as a chip applied to the first device. The apparatus may implement the foregoing method by using software or hardware, or by hardware executing corresponding software.

This application provides a configuration apparatus. The apparatus may be used as a first device or a chip of a first device. The apparatus includes: a receiving unit, configured to receive configuration information sent by a radio access network RAN device, where the configuration information includes a routing configuration for an adaptation layer of the apparatus on a transmission path; the transmission path includes the RAN device and at least one wireless backhaul node; the routing configuration includes an identifier of a second device; the apparatus is a distributed unit DU of a donor node or a first wireless backhaul node in the at least one wireless backhaul node; the second device is a second wireless backhaul node in the at least one wireless backhaul node, or a terminal served by the first wireless backhaul node in the at least one wireless backhaul node, or a terminal served by a second wireless backhaul node; and a configuration unit, configured to perform the routing configuration on the adaptation layer of the apparatus.

With reference to the third aspect, in a first possible implementation of the third aspect, the configuration information further includes a quality of service QoS configuration that is for the apparatus to perform data transmission on the transmission path.

With reference to the third aspect or the first possible implementation of the third aspect, in a second possible implementation of the third aspect, the apparatus is the first wireless backhaul node, and the receiving unit provided in this embodiment of this application is further configured to receive indication information sent by the RAN device, where the indication information is used to indicate an automatic repeat request ARQ mode of the apparatus at a radio link control RLC layer.

With reference to any one of the third aspect to the second possible implementation of the third aspect, in a third possible implementation of the third aspect, the apparatus is the DU, and the receiving unit provided in this embodiment of this application is further configured to receive information that is sent by the RAN device and that is used to configure a packet data convergence protocol PDCP layer of the apparatus, where the PDCP layer of the apparatus is a peer layer of a PDCP layer of the second wireless backhaul node that serves the terminal.

With reference to any one of the third aspect to the third possible implementation of the third aspect, in a fourth possible implementation of the third aspect, the RAN device is a centralized unit CU of the donor node or the donor node, the apparatus is the first wireless backhaul node, and the receiving unit provided in this embodiment of this application is further configured to receive the information that is sent by the RAN device and that is used to configure the PDCP layer of the apparatus, where the PDCP layer of the apparatus is a peer layer of a PDCP layer of the RAN device or is a peer layer of a PDCP layer of the DU.

According to a fourth aspect, this application provides a configuration apparatus. The configuration apparatus can implement the method according to any one of the second aspect or the possible implementations of the second aspect, and therefore can further implement beneficial effects according to any one of the second aspect or the possible implementations of the second aspect. The apparatus may be a radio access network RAN device (for example, a base station or a centralized unit (CU) of a base station), or may be an apparatus that can support a RAN device in implementing the method according to any one of the second aspect or the possible implementations of the second aspect, such as a chip applied to the RAN device. The apparatus may implement the foregoing method by using software or hardware, or by hardware executing corresponding software.

An embodiment of this application provides a configuration apparatus. The apparatus may be used as a radio access network RAN device. The apparatus includes: a sending unit, configured to send configuration information to a first device, where the configuration information includes a routing configuration for an adaptation layer of the first device on a transmission path; the transmission path includes the apparatus and at least one wireless backhaul node: the routing configuration includes an identifier of a second device: the first device is a distributed unit DU of a donor node or a first wireless backhaul node in the at least one wireless backhaul node; and the second device is a second wireless backhaul node in the at least one wireless backhaul node, or a terminal served by the first wireless backhaul node in the at least one wireless backhaul node, or a terminal served by a second wireless backhaul node.

With reference to the fourth aspect, in a first possible implementation of the fourth aspect, the configuration information further includes a quality of service QoS configuration for the first device to perform data transmission on the transmission path.

With reference to the fourth aspect or the first possible implementation of the fourth aspect, in a second possible implementation of the fourth aspect, the first device is the first wireless backhaul node, and the sending unit provided in this embodiment of this application is further configured to send indication information to the first device, where the indication information is used to indicate an automatic repeat request ARQ mode of the first device at a radio link control RLC layer.

With reference to any one of the fourth aspect to the second possible implementation of the fourth aspect, in a third possible implementation of the fourth aspect, the first device is the DU, and the sending unit provided in this embodiment of this application is further configured to send, to the first device, information used to configure a packet data convergence protocol PDCP layer of the first device, where the PDCP layer of the first device is a peer layer of a PDCP layer of the second wireless backhaul node that serves the terminal.

With reference to any one of the fourth aspect to the third possible implementation of the fourth aspect, in a fourth possible implementation of the fourth aspect, the apparatus is a centralized unit CU of the donor node or the donor node, the first device is the first wireless backhaul node, and the sending unit provided in this embodiment of this application is further configured to send, to the first device, the information used to configure the PDCP layer of the first device, where the PDCP layer of the first device is a peer layer of a PDCP layer of the RAN device or is a peer layer of a PDCP layer of the DU.

According to a fifth aspect, an embodiment of this application provides an uplink data transmission method. The method includes: receiving, by a first device, a first data packet that is generated by a second device and that carries a first application layer message, where the first data packet includes an identifier of the second device and first indication information, and the first indication information is used to indicate that a type of a message carried in the first data packet is the first application layer message; and sending, by the first device to a third device, a second data packet that carries the first application layer message, where the second data packet includes the identifier of the second device and second indication information, and the second indication information is used to indicate that a type of a message carried in the second data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has a first application layer being a peer layer of a first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has a first application layer being a peer layer of a first application layer of the second device.

Optionally, the identifier of the second device is used to indicate a device to which the first application layer message is to be transmitted.

According to a sixth aspect, an embodiment of this application provides an uplink data transmission method. The method includes: generating, by a second device, a first data packet that carries a T1 application protocol AP message; and sending, by the second device, the first data packet to a first device, where the first data packet includes an identifier of the second device and first indication information, and the first indication information is used to indicate that a type of a message carried in the first data packet is a first application layer message, where the first device is a first wireless backhaul node in a plurality of wireless backhaul nodes on a transmission path, and the second device is a second wireless backhaul node in the plurality of wireless backhaul nodes on the transmission path: or the first device is a distributed unit DU of a donor node, and the second device is a second wireless backhaul node in at least one wireless backhaul node on a transmission path.

According to a seventh aspect, an embodiment of this application provides an uplink data transmission method. The method includes: receiving, by a third device, a second data packet that is sent by a first device and that carries a first application layer message, where the second data packet includes an identifier of a second device and second indication information, and the second indication information is used to indicate that a type of a message carried in the second data packet is the first application layer message; and delivering, by the third device, the first application layer message in the second data packet to a first application layer being a peer layer of a first application layer of the second device for receiving processing, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has the first application layer being the peer layer of the first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has the first application layer being the peer layer of the first application layer of the second device.

According to an eighth aspect, an embodiment of this application provides a downlink data transmission method. The method includes: generating, by a third device, a first data packet that is to be sent to a second device and that carries a first application layer message; and sending, by the third device to a first device, the first data packet that carries the first application layer message, where the first data packet carries an identifier of the second device and first indication information, and the first indication information is used to indicate that a type of a message carried in the first data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a distributed unit DU that is of a donor node and that has a first application layer being a peer layer of a first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has a first application layer being a peer layer of a first application layer of the second device.

According to a ninth aspect, an embodiment of this application provides a downlink data transmission method. The method includes: receiving, by a first device, a first data packet that is sent by a third device and that carries a first application layer message, where the first data packet carries an identifier of a second device and first indication information, and the first indication information is used to indicate that a type of a message carried in the first data packet is the first application layer message; and sending, by the first device to the second device, a second data packet that carries the first application layer message, where the second data packet includes the identifier of the second device and second indication information, and the second indication information is used to indicate that a type of a message carried in the second data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a DU that is of a donor node and that has a first application layer being a peer layer of a first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has a first application layer being a peer layer of a first application layer of the second device.

According to a tenth aspect, an embodiment of this application provides a downlink data transmission method. The method includes: receiving, by a second device, a second data packet that is sent by a first device and that carries a first application layer message, where the second data packet includes an identifier of the second device and second indication information, and the second indication information is used to indicate that a type of a message carried in the second data packet is the first application layer message; and delivering, by the second device, the first application layer message in the second data packet to a first application layer being a peer layer of a first application layer of a third device for receiving processing, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has the first application layer being the peer layer of the first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has the first application layer being the peer layer of the first application layer of the second device.

According to an eleventh aspect, this application provides an uplink data transmission apparatus. The uplink data transmission apparatus can implement the method according to any one of the fifth aspect or the possible implementations of the fifth aspect, and therefore can further implement beneficial effects according to any one of the fifth aspect or the possible implementations of the fifth aspect. The apparatus may be a first device (for example, a wireless backhaul node), or may be an apparatus that can support a first device in implementing the method according to any one of the fifth aspect or the possible implementations of the fifth aspect, such as a chip applied to the first device. The apparatus may implement the foregoing method by using software or hardware, or by hardware executing corresponding software.

An embodiment of this application provides an uplink data transmission apparatus. The apparatus may be used as a first device or a chip applied to a first device. The apparatus includes: a receiving unit, configured to receive a first data packet that is generated by a second device and that carries a T1 application protocol AP message, where the first data packet includes an identifier of the second device and first indication information, and the first indication information is used to indicate that a type of a message carried in the first data packet is a first application layer message; and a sending unit, configured to send, to a third device, a second data packet that carries the first application layer message, where the second data packet includes the identifier of the second device and second indication information, and the second indication information is used to indicate that a type of a message carried in the second data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has a T1AP layer being a peer layer of a T1AP layer of the second device, or a donor node; or the first device is a distributed unit DU of a donor node, the second device is a second wireless backhaul node in at least one wireless backhaul node on a transmission path, and the third device is a centralized unit CU that is of the donor node and that has a T1AP layer being a peer layer of a T1AP layer of the second device.

Optionally, the identifier of the second device is used to indicate a device to which the T1AP message is to be transmitted.

According to a twelfth aspect, this application provides an uplink data transmission apparatus. The uplink data transmission apparatus can implement the method according to any one of the sixth aspect or the possible implementations of the sixth aspect, and therefore can further implement beneficial effects according to any one of the sixth aspect or the possible implementations of the sixth aspect. The apparatus may be a second device (for example, a wireless backhaul node), or may be an apparatus that can support a second device in implementing the method according to any one of the sixth aspect or the possible implementations of the sixth aspect, such as a chip applied to the second device. The apparatus may implement the foregoing method by using software or hardware, or by hardware executing corresponding software.

The uplink data transmission apparatus includes: a generation unit, configured to generate a first data packet that carries a T1 application protocol AP message; and a sending unit, configured to send the first data packet to a first device, where the first data packet includes an identifier of the second device and first indication information, and the first indication information is used to indicate that a type of a message carried in the first data packet is a first application layer message, where the first device is a first wireless backhaul node in a plurality of wireless backhaul nodes on a transmission path, and the second device is a second wireless backhaul node in the plurality of wireless backhaul nodes on the transmission path; or the first device is a distributed unit DU of a donor node, and the second device is a second wireless backhaul node in at least one wireless backhaul node on a transmission path.

According to a thirteenth aspect, this application provides an uplink data transmission apparatus. The uplink data transmission apparatus can implement the method according to any one of the seventh aspect or the possible implementations of the seventh aspect, and therefore can further implement beneficial effects according to any one of the seventh aspect or the possible implementations of the seventh aspect. The apparatus may be a third device (for example, a RAN device), or may be an apparatus that can support a RAN device in implementing the method according to any one of the seventh aspect or the possible implementations of the seventh aspect, such as a chip applied to the RAN device. The apparatus may implement the foregoing method by using software or hardware, or by hardware executing corresponding software.

The uplink data transmission apparatus includes: a receiving unit, configured to receive a second data packet that is sent by a first device and that carries a first application layer message, where the second data packet includes an identifier of a second device and second indication information, and the second indication information is used to indicate that a type of a message carried in the second data packet is the first application layer message; and a processing unit, configured to deliver the first application layer message in the second data packet to a first application layer being a peer layer of a first application layer of the second device for receiving processing, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has the first application layer being the peer layer of the first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has the first application layer being the peer layer of the first application layer of the second device.

According to a fourteenth aspect, this application provides a downlink data transmission apparatus. The downlink data transmission apparatus can implement the method according to any one of the eighth aspect or the possible implementations of the eighth aspect, and therefore can further implement beneficial effects according to any one of the eighth aspect or the possible implementations of the eighth aspect. The apparatus may be a third device (for example, a RAN device), or may be an apparatus that can support a RAN device in implementing the method according to any one of the eighth aspect or the possible implementations of the eighth aspect, such as a chip applied to the RAN device. The apparatus may implement the foregoing method by using software or hardware, or by hardware executing corresponding software.

The downlink data transmission apparatus includes: a generation unit, configured to generate a first data packet that is to be sent to a second device and that carries a first application layer message; and a sending unit, configured to send, to a first device, the first data packet that carries the first application layer message, where the first data packet carries an identifier of the second device and first indication information, and the first indication information is used to indicate that a type of a message carried in the first data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a distributed unit DU that is of a donor node and that has a first application layer being a peer layer of a first application layer of the second device, or a donor node; or the first device is a distributed unit DU of a donor node, the second device is a second wireless backhaul node in at least one wireless backhaul node on a transmission path, and the third device is a centralized unit CU that is of the donor node and that has a first application layer being a peer layer of a first application layer of the second device.

According to a fifteenth aspect, an embodiment of this application provides a downlink data transmission apparatus. The downlink data transmission apparatus can implement the method according to any one of the ninth aspect or the possible implementations of the ninth aspect, and therefore can further implement beneficial effects according to any one of the ninth aspect or the possible implementations of the ninth aspect. The apparatus may be a first device (for example, a wireless backhaul node), or may be an apparatus that can support a first device in implementing the method according to any one of the ninth aspect or the possible implementations of the ninth aspect, such as a chip applied to the first device. The apparatus may implement the foregoing method by using software or hardware, or by hardware executing corresponding software.

The downlink data transmission apparatus includes: a receiving unit, configured to receive a first data packet that is sent by a third device and that carries a first application layer message, where the first data packet carries an identifier of a second device and first indication information, and the first indication information is used to indicate that a type of a message carried in the first data packet is the first application layer message; and a sending unit, configured to send, to the second device, a second data packet that carries the first application layer message, where the second data packet includes the identifier of the second device and second indication information, and the second indication information is used to indicate that a type of a message carried in the second data packet is the first application layer message, where the first device is a first wireless backhaul node in a plurality of wireless backhaul nodes on a transmission path, the second device is a second wireless backhaul node in the plurality of wireless backhaul nodes on the transmission path, and the third device is a DU that is of a donor node and that has a first application layer being a peer layer of a first application layer of the second device, or a donor node: or the first device is a distributed unit DU of a donor node, the second device is a second wireless backhaul node in at least one wireless backhaul node on a transmission path, and the third device is a centralized unit CU that is of the donor node and that has a first application layer being a peer layer of a first application layer of the second device.

According to a sixteenth aspect, an embodiment of this application provides a downlink data transmission apparatus. The downlink data transmission apparatus can implement the method according to any one of the tenth aspect or the possible implementations of the tenth aspect, and therefore can further implement beneficial effects according to any one of the tenth aspect or the possible implementations of the tenth aspect. The apparatus may be a second device (for example, a wireless backhaul node), or may be an apparatus that can support a second device in implementing the method according to any one of the tenth aspect or the possible implementations of the tenth aspect, such as a chip applied to the second device. The apparatus may implement the foregoing method by using software or hardware, or by hardware executing corresponding software.

The downlink data transmission apparatus includes: a receiving unit, configured to receive a second data packet that is sent by a first device and that carries a first application layer message, where the second data packet includes an identifier of the second device and second indication information, and the second indication information is used to indicate that a type of a message carried in the second data packet is the first application layer message; and a processing unit, configured to deliver the T1AP message in the second data packet to a T1AP layer being a peer layer of a T1AP layer of a third device for receiving processing, where the first device is a first wireless backhaul node in a plurality of wireless backhaul nodes on a transmission path, the second device is a second wireless backhaul node in the plurality of wireless backhaul nodes on the transmission path, and the third device is a CU or a DU that is of a donor node and that has the T1AP layer being the peer layer of the T1AP layer of the second device, or a donor node; or the first device is a distributed unit DU of a donor node, the second device is a second wireless backhaul node in at least one wireless backhaul node on a transmission path, and the third device is a centralized unit CU that is of the donor node and that has the first application layer being the peer layer of the first application layer of the second device.

According to a seventeenth aspect, this application provides a computer-readable storage medium. The computer-readable storage medium stores an instruction, and when the instruction is run on a computer, the computer is enabled to perform one or more of the first aspect and the possible designs of the first aspect.

According to an eighteenth aspect, this application provides a computer-readable storage medium. The computer-readable storage medium stores an instruction, and when the instruction is run on a computer, the computer is enabled to perform one or more of the second aspect and the possible designs of the second aspect.

According to a nineteenth aspect, this application provides a computer-readable storage medium. The computer-readable storage medium stores an instruction, and when the instruction is run on a computer, the computer is enabled to perform one or more of the fifth aspect and the possible designs of the fifth aspect.

According to a twentieth aspect, this application provides a computer-readable storage medium. The computer-readable storage medium stores an instruction, and when the instruction is run on a computer, the computer is enabled to perform one or more of the sixth aspect and the possible designs of the sixth aspect.

According to a twenty-first aspect, this application provides a computer-readable storage medium. The computer-readable storage medium stores an instruction, and when the instruction is run on a computer, the computer is enabled to perform one or more of the seventh aspect and the possible designs of the seventh aspect.

According to a twenty-second aspect, this application provides a computer-readable storage medium. The computer-readable storage medium stores an instruction, and when the instruction is run on a computer, the computer is enabled to perform one or more of the eighth aspect and the possible designs of the eighth aspect.

According to a twenty-third aspect, this application provides a computer-readable storage medium. The computer-readable storage medium stores an instruction, and when the instruction is run on a computer, the computer is enabled to perform one or more of the ninth aspect and the possible designs of the ninth aspect.

According to a twenty-fourth aspect, this application provides a computer-readable storage medium. The computer-readable storage medium stores an instruction, and when the instruction is run on a computer, the computer is enabled to perform one or more of the tenth aspect and the possible designs of the tenth aspect.

According to a twenty-fifth aspect, this application provides a computer program product including an instruction. When the computer program product runs on a computer, the computer is enabled to perform one or more of the first aspect and the possible designs of the first aspect.

According to a twenty-sixth aspect, this application provides a computer program product including an instruction. When the computer program product runs on a computer, the computer is enabled to perform one or more of the second aspect and the possible designs of the second aspect.

According to a twenty-seventh aspect, this application provides a computer program product including an instruction. When the computer program product runs on a computer, the computer is enabled to perform one or more of the fifth aspect and the possible designs of the fifth aspect.

According to a twenty-eighth aspect, this application provides a computer program product including an instruction. When the computer program product runs on a computer, the computer is enabled to perform one or more of the sixth aspect and the possible designs of the sixth aspect.

According to a twenty-ninth aspect, this application provides a computer program product including an instruction. When the computer program product runs on a computer, the computer is enabled to perform one or more of the seventh aspect and the possible designs of the seventh aspect.

According to a thirtieth aspect, this application provides a computer program product including an instruction. When the computer program product runs on a computer, the computer is enabled to perform one or more of the eighth aspect and the possible designs of the eighth aspect.

According to a thirty-first aspect, this application provides a computer program product including an instruction. When the computer program product runs on a computer, the computer is enabled to perform one or more of the ninth aspect and the possible designs of the ninth aspect.

According to a thirty-second aspect, this application provides a computer program product including an instruction. When the computer program product runs on a computer, the computer is enabled to perform one or more of the tenth aspect and the possible designs of the tenth aspect.

According to a thirty-third aspect, this application provides a chip. The chip includes a processor and an interface circuit, the interface circuit is coupled to the processor, and the processor is configured to run a computer program or an instruction, to implement one or more of the first aspect and the possible designs of the first aspect.

According to a thirty-fourth aspect, this application provides a chip. The chip includes a processor and an interface circuit, the interface circuit is coupled to the processor, and the processor is configured to run a computer program or an instruction, to implement one or more of the second aspect and the possible designs of the second aspect.

According to a thirty-fifth aspect, this application provides a chip. The chip includes a processor and an interface circuit, the interface circuit is coupled to the processor, and the processor is configured to run a computer program or an instruction, to implement one or more of the fifth aspect and the possible designs of the fifth aspect.

According to a thirty-sixth aspect, this application provides a chip. The chip includes a processor and an interface circuit, the interface circuit is coupled to the processor, and the processor is configured to run a computer program or an instruction, to implement one or more of the sixth aspect and the possible designs of the sixth aspect.

According to a thirty-seventh aspect, this application provides a chip. The chip includes a processor and an interface circuit, the interface circuit is coupled to the processor, and the processor is configured to run a computer program or an instruction, to implement one or more of the seventh aspect and the possible designs of the seventh aspect.

According to a thirty-eighth aspect, this application provides a chip. The chip includes a processor and an interface circuit, the interface circuit is coupled to the processor, and the processor is configured to run a computer program or an instruction, to implement one or more of the eighth aspect and the possible designs of the eighth aspect.

According to a thirty-ninth aspect, this application provides a chip. The chip includes a processor and an interface circuit, the interface circuit is coupled to the processor, and the processor is configured to run a computer program or an instruction, to implement one or more of the ninth aspect and the possible designs of the ninth aspect.

According to a fortieth aspect, this application provides a chip. The chip includes a processor and an interface circuit, the interface circuit is coupled to the processor, and the processor is configured to run a computer program or an instruction, to implement one or more of the tenth aspect and the possible designs of the tenth aspect.

Optionally, the chip in this embodiment of this application further includes one or more (including two) memories, and the one or more memories store an instruction or a computer program. The interface circuit is configured to communicate with a module other than the chip.

According to a forty-first aspect, an embodiment of this application provides a communications system. The communications system includes one or more wireless backhaul nodes and a RAN device. The wireless backhaul node may be the configuration apparatus according to one or more of the third aspect and the possible implementations of the third aspect. The RAN device may be the configuration apparatus according to one or more of the fourth aspect and the possible implementations of the fourth aspect. Optionally, according to the forty-first aspect, the provided communications system may further include a terminal, and the terminal may access the RAN device through the one or more wireless backhaul nodes.

According to a forty-second aspect, an embodiment of this application provides a communications system. The communications system includes a first device, a second device, and a third device, where the first device is the uplink data transmission apparatus according to one or more of the eleventh aspect and the possible implementations of the eleventh aspect, the second device is the uplink data transmission apparatus according to one or more of the twelfth aspect and the possible implementations of the twelfth aspect, and the third device is the uplink data transmission apparatus according to one or more of the thirteenth aspect and the possible implementations of the thirteenth aspect.

According to a forty-third aspect, an embodiment of this application provides a communications system. The communications system includes a first device, a second device, and a third device, where the first device is the downlink data transmission apparatus according to one or more of the fifteenth aspect and the possible implementations of the fifteenth aspect, the second device is the downlink data transmission apparatus according to one or more of the sixteenth aspect and the possible implementations of the sixteenth aspect, and the third device is the downlink data transmission apparatus according to one or more of the fourteenth aspect and the possible implementations of the fourteenth aspect.

Certainly, it may be understood that the communications system provided in this embodiment of this application may further include another communications apparatus, for example, an access network device or a terminal.

According to a forty-fourth aspect, an embodiment of this application provides a configuration method, including: receiving, by a first device, configuration information sent by a radio access network RAN device, where the configuration information includes a routing configuration for an adaptation layer of the first device on a transmission path, the transmission path includes the first device and a transmission path device, the first device is a distributed unit DU or a wireless backhaul node connected to a DU, the routing configuration includes an identifier of the transmission path device, and the transmission path includes at least two wireless backhaul nodes; and performing, by the first device, the routing configuration on the adaptation layer of the first device.

For various possible implementations corresponding to the forty-fourth aspect, refer to the various possible implementations of the first aspect. Details are not described herein again in this embodiment of this application.

According to a forty-fifth aspect, an embodiment of this application provides a configuration method, including: sending, by a radio access network RAN device, configuration information to a first device, where the configuration information includes a routing configuration for an adaptation layer of the first device on a transmission path, the transmission path includes the first device and a transmission path device, the first device is a distributed unit DU or a wireless backhaul node connected to a DU, the routing configuration includes an identifier of the transmission path device, and the transmission path includes at least two wireless backhaul nodes.

For various possible implementations corresponding to the forty-fifth aspect, refer to the various possible implementations of the second aspect. Details are not described herein again in this embodiment of this application.

According to a forty-sixth aspect, an embodiment of this application provides a configuration apparatus, where the apparatus is a first device or a chip applied to a first device, and the apparatus includes: a receiving unit, configured to receive configuration information sent by a radio access network RAN device, where the configuration information includes a routing configuration for an adaptation layer of the first device on a transmission path, the transmission path includes the first device and a transmission path device, the first device is a distributed unit DU or a wireless backhaul node connected to a DU, the routing configuration includes an identifier of the transmission path device, and the transmission path includes at least two wireless backhaul nodes, and a configuration unit, configured to perform the routing configuration on the adaptation layer of the first device.

For various possible implementations corresponding to the forty-sixth aspect, refer to the various possible implementations of the third aspect. Details are not described herein again in this embodiment of this application.

According to a forty-seventh aspect, an embodiment of this application provides a configuration apparatus, where the apparatus is a RAN device or a chip applied to a RAN device, and the apparatus includes: a sending unit, configured to send configuration information to a first device, where the configuration information includes a routing configuration for an adaptation layer of the first device on a transmission path, the transmission path includes the first device and a transmission path device, the first device is a distributed unit DU or a wireless backhaul node connected to a DU, the routing configuration includes an identifier of the transmission path device, and the transmission path includes at least two wireless backhaul nodes.

For various possible implementations corresponding to the forty-seventh aspect, refer to the various possible implementations of the fourth aspect. Details are not described herein again in this embodiment of this application.

DESCRIPTION OF EMBODIMENTS

Figure 1:
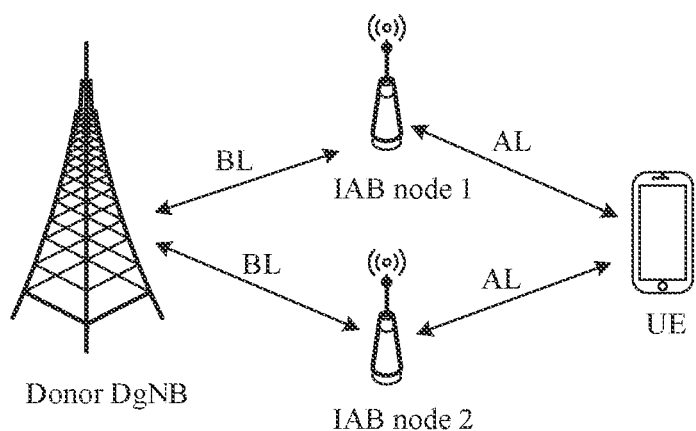
FIG. 1 is a first schematic networking diagram of IAB nodes according to an embodiment of this application.

It should be noted that, in the embodiments of this application, the word "as an example" or "for example" is used to represent giving an example, an illustration, or a description. Any embodiment or design scheme described by using "as an example" or "for example" in the embodiments of this application shall not be construed as being more preferred or more advantageous than another embodiment or design scheme. Exactly, use of the word such as "as an example" or "for example" is intended to present a relative concept in a specific manner.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "I" usually indicates an "or" relationship between the associated objects. "At least one item (piece) of the following" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be in a singular or plural form. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

The technical solutions in the embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system can implement wireless technologies such as universal terrestrial radio access (UTRA) and CDMA2000. UTRA may include a wideband CDMA (WCDMA) technology and another variation technology of CDMA. CDMA2000 may cover interim standard (IS) 2000 (IS-2000), IS-95, and IS-856 standards. The TDMA system can implement a wireless technology such as a global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and Flash OFDMA. UTRA corresponds to UMTS, and E-UTRA corresponds to an evolved version of UMTS. A new version of UMTS that uses E-UTRA is used in 3GPP long term evolution (LTE) and various versions evolved based on LTE. A 5G communications system and a new radio (NR) communications system are next-generation communications systems under research. In addition, the communications system is further applicable to a future-oriented communications technology, and is applicable to the technical solutions provided in the embodiments of this application.

The system architecture and the service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems. The embodiments of this application are described by using an example in which a provided method is applied to an NR system or a 5G network. However, it should be noted that the method provided in the embodiments of this application may further be applied to another network, for example, may be applied to an evolved packet system (EPS) network (namely, a 4th generation (4G) network). Correspondingly, when the method provided in the embodiments of this application is applied to the EPS network, a network node performing the method provided in the embodiments of this application is replaced with a network node in the EPS network. For example, when the method provided in the embodiments of this application is applied to the 5G network or the NR system, a wireless backhaul node in the following descriptions may be a wireless backhaul node in the 5G network. For example, the wireless backhaul node in the 5G network may be referred to as an IAB node, or certainly may have another name. This is not specifically limited in the embodiments of this application. When the method provided in the embodiments of this application is applied to the EPS network, a wireless backhaul node in the following descriptions may be a wireless backhaul node in the EPS network. For example, the wireless backhaul node in the EPS network may be referred to as a RN. In addition, it should be noted that the wireless backhaul node may alternatively be a terminal acting as a wireless backhaul node in a network.

As technologies such as virtual reality (VR), augmented reality (AR), and the internet of things develop, there will be an increasing quantity of terminals in a future network, and network data usage also continuously increases. To cope with the increasing quantity of terminals and extremely rapid growth of the network data usage in a market, a higher requirement is currently posed on a capacity of the 5G network. In a hotspot area, to meet a requirement for an ultra-high capacity in 5G, networking by high frequency small cells becomes more popular. High frequency carriers have a relatively poor propagation feature, are severely attenuated by obstacles, and have small coverage. Therefore, a large quantity of small cells need to be densely deployed in the hotspot area. These small cells may be IAB nodes.

To design a flexible and convenient access and backhaul solution, a wireless transmission solution is applied to both an access link (AL) and a backhaul link (BL) in an IAB scenario.

Figure 2:
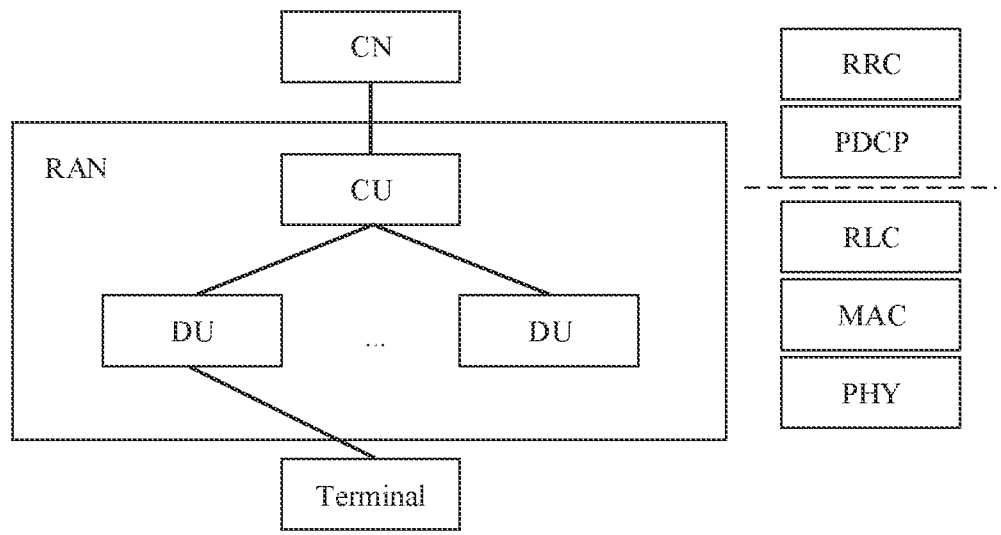
FIG. 2 is a first schematic structural diagram of a base station according to an embodiment of this application.

In a network including IAB nodes (an IAB network for short), the IAB node may provide a radio access service for a terminal, and is connected to a donor node (donor node, where for example, the donor node may be referred to as a donor gNodeB (DgNB) for short in the 5G network, and an example in which the donor node is a DgNB is used below to describe the embodiments of this application) through a wireless backhaul link to transmit service data of a user. The DgNB is a radio access network (RAN) device that is connected to a core network of a terminal and that provides a wireless backhaul function for an IAB node. The DgNB may be a complete entity. As shown in FIG. 2, the base station may alternatively be in a form in which a centralized unit (CU) and a distributed unit (DU) are separated. In other words, the donor gNodeB includes a centralized unit (Donor-CU) and a distributed unit (Donor-DU). Actual deployment manners of the CU and the DU are relatively flexible. For example, CUs of a plurality of base stations are integrated together to form a relatively large-scale functional network element. FIG. 2 is a schematic diagram of a network architecture according to an embodiment of this application. As shown in FIG. 2, the network architecture includes a core network (CN) device and a RAN device. The RAN device includes one or more CUs and one or more DUs. The RAN device may be implemented by using one node, or may be implemented by using a plurality of nodes. The RAN device is configured to implement functions of protocol layers such as a radio resource control (RRC) layer, a packet data convergence protocol (PDCP) layer, a radio link control (RLC) layer, and a medium access control (MAC) layer. As shown in FIG. 2, the CU and the DU may be divided based on protocol layers of a wireless network. For example, functions of the packet data convergence protocol layer and a protocol layer above the packet data convergence protocol layer are set on the CU, and functions of protocol layers, including functions of the RLC layer, the MAC layer, and the like, below the PDCP layer, are set on the DU.

Division based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner, for example, the division is performed based on a latency. A function with a processing time needing to meet a latency requirement is set on the DU, and a function with a processing time not needing to meet the latency requirement is set on the CU.

Figure 3:
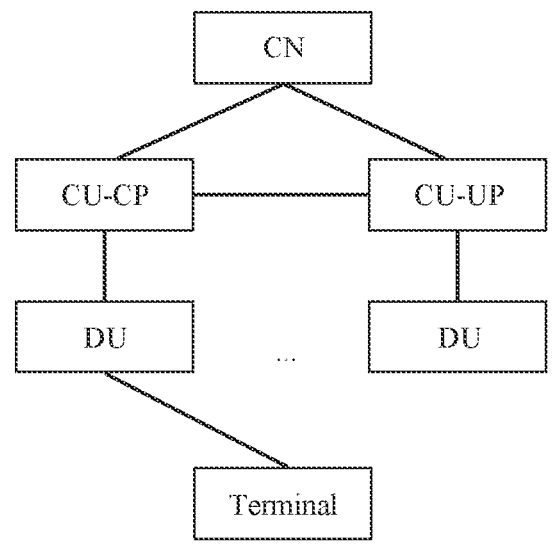
FIG. 3 is a second schematic structural diagram of a base station according to an embodiment of this application.

In addition, still referring to FIG. 2, compared with an architecture shown in FIG. 3, a control plane (CP) and a user plane (UP) of the CU may further be separated into different network elements for implementation, and the different network elements are respectively a CU-control plane network element (CU-CP network element) and a CU-user plane network element (CU-UP network element).

In the foregoing network architecture, data generated by the CU may be sent to a terminal through the DU, or data generated by a terminal may be sent to the CU through the DU. The DU may directly encapsulate the data at a protocol layer and then transmit the encapsulated data to the terminal or the CU without parsing the data. For example, data at the RRC layer or the PDCP layer is finally processed as data at a physical layer (PHY) and sent to the terminal, or is converted from received data at a PHY layer. In this architecture, it may also be considered that the data at the RRC layer or the PDCP layer is sent by the DU.

In the foregoing embodiment, the CU is used as an access network device in a RAN. In addition, the CU may alternatively be classified as an access network device in a CN. This is not limited herein.

An apparatus in the following embodiment of this application may be located in an access network device based on a function implemented by the apparatus. When the foregoing CU-DU structure is used, the access network device may be a CU node or a RAN device including functions of a CU node and a DU node.

The IAB nodes are connected to a core network through a wired link through the donor node (where for example, in a standalone networking 5G architecture, the IAB nodes are connected to a 5G core network (5GC) through a wired link through the DgNB; in a non-standalone networking 5G architecture, an IAB node on a control plane (CP) is connected to an evolved packet core network (EPC) through an eNB, and an IAB node on a user plane (UP) is connected to the EPC through the DgNB and the eNB.

The IAB network supports multi-hop IAB node networking and multi-connection IAB node networking. Therefore, there may be a plurality of transmission paths between the terminal and the DgNB. On one path, there is a determined hierarchical relationship between the IAB nodes, and between an IAB node and the DgNB serving the IAB node. Each IAB node considers a node providing a backhaul service for the IAB node as a parent node. Correspondingly, the IAB node may be considered as a child node of the parent node.

For example, referring to FIG. 1, parent nodes of an IAB node 2 and an IAB node 1 are both a DgNB. After an uplink data packet of a terminal may be transmitted to the DgNB through the IAB node 1 or the IAB node 2, the uplink data packet is sent by the DgNB to a mobile gateway device (for example, a user plane function (UPF) network element in a 5G network). After receiving a downlink data packet from the mobile gateway device, the DgNB sends the downlink data packet to the terminal through the IAB node 1 or the IAB node 2. There are two optional paths for service data transmission between the terminal and the DgNB: a path 1: the terminal→the IAB node 1→the DgNB, and a path 2: the terminal→the IAB node 2→the DgNB. When it is considered that service data of the terminal is transmitted through a plurality of paths, in the example in FIG. 1, downlink service data of the terminal is split at the DgNB and aggregated at the terminal, and uplink service data of the terminal is split at the terminal and aggregated at the DgNB.

Figure 4:
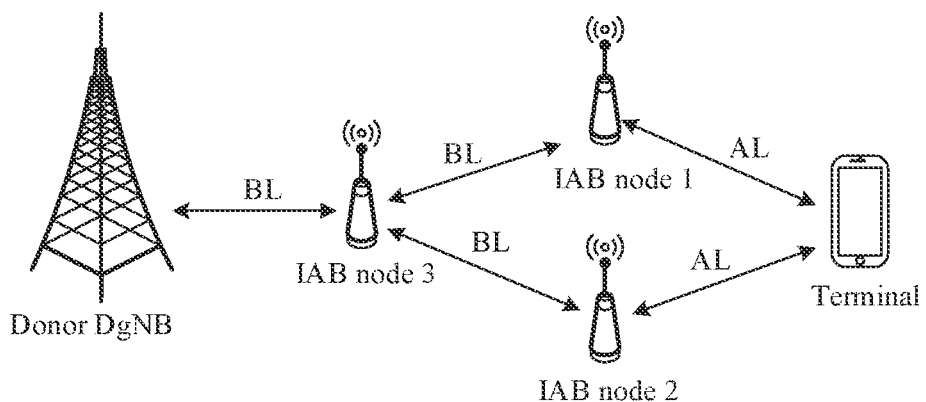
FIG. 4 is a second schematic networking diagram of IAB nodes according to an embodiment of this application.

For example, referring to FIG. 4, a terminal has two ALs, which are respectively connected to an IAB node 1 and an IAB node 2. Parent nodes of the IAB node 1 and the IAB node 2 are both an IAB node 3, and a parent node of the IAB node 3 is a DgNB. There are two optional paths for service data transmission between the terminal and the DgNB: a path 1: the terminal→the IAB node 1→the IAB node 3→the DgNB, and a path 2: the terminal→the IAB node 2→the IAB node 3→the DgNB. In the scenario shown in FIG. 4, when it is considered that service data of the terminal is transmitted through both the two paths, downlink service data of the terminal is split at the IAB node 3 and aggregated at the terminal, and uplink service data of the terminal is split at the terminal and aggregated at the IAB node 3.

Figure 5:
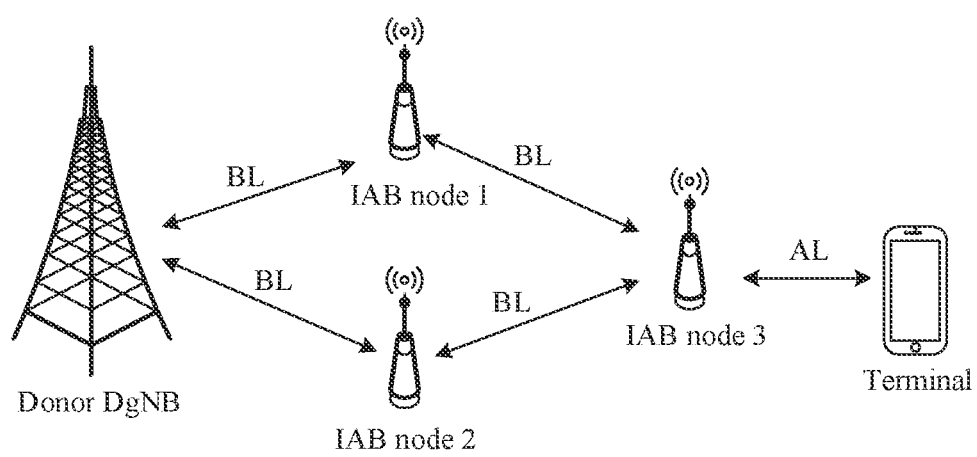
FIG. 5 is a third schematic networking diagram of IAB nodes according to an embodiment of this application.

For example, referring to FIG. 5, there is an AL between a terminal and an IAB node 3, and parent nodes of the IAB node 3 are an IAB node 1 and an IAB node 2. To be specific, the IAB node 3 has two BLs (for example, a BL between the IAB node 3 and the IAB node 2, and a BL between the IAB node 3 and the IAB node 2), and parent nodes of the IAB node 2 and the IAB node 1 are both a DgNB. There are two optional paths for service data transmission between the terminal and the DgNB: a path 1: the terminal→the IAB node 3→the IAB node 1→the DgNB, and a path 2: the terminal→the IAB node 3→the IAB node 2→the DgNB. When it is considered that service data of the terminal is transmitted through both the two paths, downlink service data of the terminal is split at the DgNB and aggregated at the IAB node 3, and uplink service data of the terminal is split at the IAB node 3 and aggregated at the DgNB.

Figure 6:
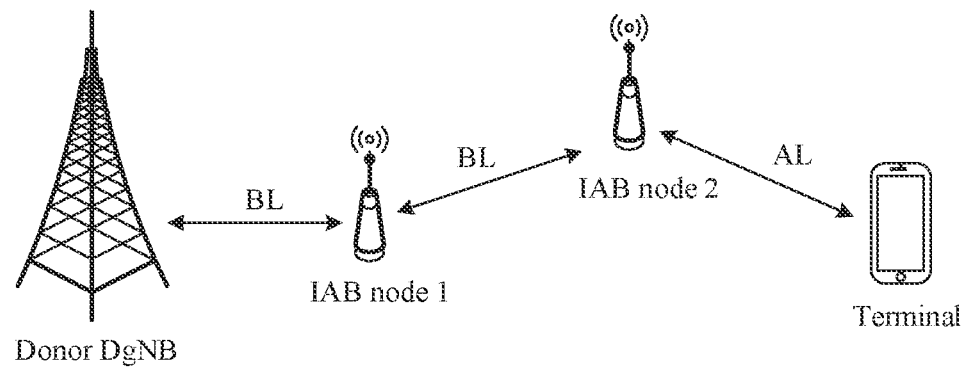
FIG. 6 is a fourth schematic networking diagram of IAB nodes according to an embodiment of this application.

For example, referring to FIG. 6, there is an AL between a terminal and an IAB node 2, the IAB node 2 has one BL, a parent node of the IAB node 2 is an IAB node 1, and there is a BL between the IAB node 1 and a DgNB. In an architecture shown in FIG. 6, there is an optional path for service data transmission between the terminal and the DgNB, for example, a path 1: the terminal→the IAB node 2→the IAB node 1→the DgNB.

The foregoing IAB networking scenarios are merely examples, and both the DgNB and the IAB nodes are devices on a RAN side. When multi-hop IAB node networking and multi-connection IAB node networking are combined, there are more other possibilities of IAB networking scenarios. For example, a DgNB and an IAB node served by another DgNB form dual connectivities to serve a terminal. The possibilities are not listed one by one herein.

Network elements in the embodiments of this application include a terminal, an access network device (for example, a base station), and a wireless backhaul node (for example, an IAB node). It should be noted that the terminal in the embodiments of this application may also be referred to as UE, an access terminal, a subscriber unit, a subscriber station, a mobile station, a remote station, a remote terminal, a mobile device, a user terminal, a wireless communications device, a user agent, or a user apparatus. The terminal may alternatively be a station (ST) in a wireless local area network (WLAN), a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, or a wearable device (which may also be referred to as a wearable intelligent device). The terminal may alternatively be a terminal in a next-generation communications system, for example, a terminal in 5G or a terminal in a future evolved public land mobile network (PLMN), or a terminal in a new radio (NR) communications system.

The IAB node may be a device such as customer premises equipment (CPE) or a residential gateway (RG). The method provided in the embodiments of this application may further be applied to a home access scenario.

To better understand the method described below, some protocol layers mentioned below and accompanying drawings related to the protocol layers are all described herein.

A protocol layer of a device includes one or more of the following protocol layers: a service data adaptation protocol (SDAP) layer, a PDCP layer, a general packet radio service tunneling protocol (GTP) layer, a user datagram protocol (UDP) layer, an internet protocol (IP) layer, a radio link control (RLC) layer, a MAC layer, a physical layer (PHY), an Adapt layer, a BL-L2 layer, a BL-L1 layer, an L2 layer, and an L1 layer. On an F1 interface between a CU and a DU, the L2 layer is a corresponding link layer of the interface between the CU and the DU, and the L layer is a corresponding physical layer of the interface between the CU and the DU.

The BL-L2 layer represents a link layer of a wireless backhaul link, and includes one or more of the following protocol layers: an SDAP layer, a PDCP layer, an RLC layer, and a MAC layer. The BL-L1 layer represents a physical layer, namely, a PHY layer, of the wireless backhaul link. Specific functions of the protocol layers depend on a specific standard (for example, LTE or NR) used for the wireless backhaul link, and may include some or all functions of all protocol layers defined in the specific standard. The wireless backhaul link is a link corresponding to a Un interface, and may be a backhaul link between IAB nodes or a backhaul link between an IAB node and a DgNB.

The Adapt laver has one or more of the following capabilities: adding (which may also be referred to as configuring), to a data packet, routing information that can be identified by a wireless backhaul node; perform route selection based on the routing information that can be identified by the wireless backhaul node; adding, to the data packet, identification information that can be identified by the wireless backhaul node and that is related to a quality of service (QoS) requirement: performing QoS mapping on a plurality of links including the wireless backhaul node for the data packet; adding data packet type indication information to the data packet; and sending flow control feedback information to a node having a flow control capability. It should be noted that a name of a protocol layer having the capabilities is not necessarily the Adapt layer. A person skilled in the art may understand that any protocol layer having the capabilities may be understood as the Adapt layer in the embodiments of this application.

The routing information that can be identified by the wireless backhaul node may be one or more of the following information: an identifier of UE, an identifier of an IAB node accessed by the UE, an identifier of a DgNB, an identifier of a donor-DU, an identifier of a donor-CU, an identifier of a transmission path, and the like.

The QoS mapping on the plurality of links may be: mapping, on the backhaul link based on the identification information that is related to the QoS requirement and that is carried in the data packet, the data packet to a radio bearer (or an RLC bearer) or a logical channel (or an RLC channel) on the backhaul link (the Un interface) to send the data packet to a next-hop node. For example, the IAB node may map, based on an identifier that is of a radio bearer (or a logical channel) of the UE and that is carried in the data packet, the data packet to the radio bearer (or the logical channel) of the UE to a radio bearer or a logical channel on the Un interface: or the IAB node may map, based on a logical channel or a radio bearer for receiving the data packet, the data packet to a logical channel or a radio bearer on a next-hop link. In a possible example, a quantity of logical channels maintained by the IAB node on the backhaul link is greater than or equal to a quantity of logical channels of the UE, and a logical channel #x of the UE is uniquely mapped to a logical channel #y of the IAB node. For example, when the identifier that is of the logical channel of the UE and that is carried in the data packet is LCID #1, the IAB node maps the data packet to a logical channel identified by LCID #1 on an air interface of the IAB node facing a next-hop node. The radio bearer in the embodiments of this application may be alternatively replaced with an RLC bearer corresponding to the radio bearer for understanding. The logical channel in the embodiments of this application may alternatively be replaced with an RLC channel corresponding to the logical channel for understanding.

The data packet type indication information may be used to indicate that content encapsulated in the Adapt layer includes any one of the following types: user plane data of the UE, a radio resource control (RRC) message of the UE, an RRC message of the IAB node, a first application layer message (for example, a T1 application protocol (T1AP) message) on a first interface (where in the embodiments of this application, the first interface is referred to as a T1 interface, and certainly, the first interface may alternatively have another name) between the IAB node and the DgNB or the donor-CU, a flow control feedback message generated by the IAB node, and the like. In the following embodiment, an example in which a first application layer is a T1AP layer and a message sent or generated by the first application layer is a T1AP message is used. One node may send a first message to a peer first application layer of another node through a first application layer of the node. The first message includes context management information of a terminal served by the another node and/or an RRC message of the terminal. In the embodiments of this application, a message generated or sent by one node at an X protocol layer may be referred to as an X message. For example, a message generated or sent by one node at the T1AP protocol layer may be referred to as a T1AP message.

It should be noted that an interface between the IAB node and the DgNB/donor-CU may be referred to as a T1 interface, or may use a name of an F1 interface or an F1* interface. The T1 interface is used as an example in the embodiments of this application, but a name of the interface is not limited.

The identification information related to the QoS requirement may be a QoS flow identifier (QFI), an identifier of a radio bearer (DRB) or a signaling radio bearer (SRB), an identifier of a logical channel (LCH) or an RLC bearer or an RLC channel corresponding to the radio bearer, a 5QI (5G quality of service identifier), a quality of service class identifier (QCI), a differentiated services code point (DSCP), and the like.

For example, the node having the flow control capability may be the DgNB, the donor-DU, the donor-CU, or a parent node of the IAB node, or an upstream node providing a backhaul service for the IAB node. Content of the flow control feedback information may include one or more of the following information: a cache status and a load degree of the IAB node, a status (for example, a link blockage, link resuming, or link quality information) of a link including the IAB node, a bandwidth and a transmission latency of the link including the IAB node, a sequence number of a data packet lost at the IAB node, a sequence number of a data packet successfully sent by the IAB node to a terminal or a child node of a terminal, and the like.

The Adapt layer may be above all protocol layers included in the BL-L2 layer. For example, if the BL-L2 layer includes the RLC layer and the MAC layer, the Adapt layer may be above the RLC layer. The Adapt layer may alternatively be between any two protocol layers included in the BL-L2 layer. For example, if the BL-L2 layer includes the RLC layer and the MAC layer, the Adapt layer may be between the RLC layer and the MAC layer, that is, above the MAC layer and below the RLC layer. The Adapt layer may alternatively be between the BL-L2 layer and the BL-L1 layer. A specific location of the Adapt layer is not limited in the embodiments of this application. In addition, in a possible case, a function of the Adapt layer may alternatively be extended from a function or functions of any one or more layers included in the BL-L2 layer without any additional protocol layer. In another possible case, a function of the Adapt layer may alternatively be extended from a function or functions of any one or more protocol layers above the BL-L2 layer without any additional protocol layer.

The accompanying drawings related to the protocol layer mentioned below include FIG. 7 to FIG. 12 (IABn in the accompanying drawings represents an IAB node n, for example, IAB4 represents an IAB node 4). FIG. 7 to FIG. 12 are all drawn by using an example in which a network architecture is the network architecture shown in FIG. 6, that is, an example in which two IAB nodes are used. In an actual process, there may be one IAB node, or there may be two or more IAB nodes between a base station and UE. When a quantity of IAB nodes between the base station and the UE changes, for a protocol stack of the IAB node between the UE and the base station, refer to architectures of protocol stacks of IAB nodes shown in FIG. 7 to FIG. 12. Details are not described herein in the embodiments of this application.

Figure 7:
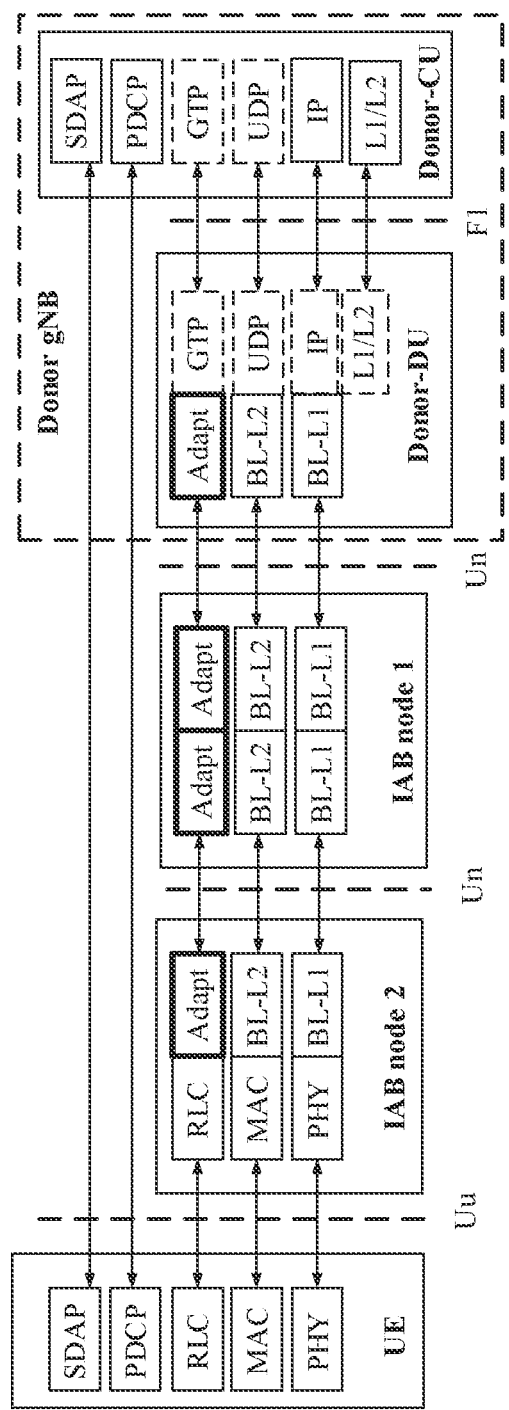
FIG. 7 is a first schematic architectural diagram of a protocol stack according to an embodiment of this application.

FIG. 7 shows an L2 IAB protocol user plane multi-hop protocol stack architecture. In FIG. 7, devices in the user plane protocol architecture include a CU, a DU, an IAB node 1, an IAB node 2, and UE. A protocol stack of the UE includes, in sequence from top to bottom, an SDAP layer and a PDCP layer that are peer layers of an SDAP layer and a PDCP layer of the CU, and an RLC layer, a MAC layer, and a PHY layer that are peer layers of an RLC layer, a MAC layer, and a PHY layer of the IAB node 2. A protocol stack of the IAB node 2 for communication with the UE includes the RLC layer, the MAC layer, and the PHY layer in sequence from top to bottom. A protocol stack of the IAB node 2 for communication with the IAB node 1 includes an Adapt layer, a BL-L2 layer, and a BL-L1 layer in sequence from top to bottom. A protocol stack of the IAB node 1 for communication with the IAB node 2 includes an Adapt layer, a BL-L2 layer, and a BL-L1 layer in sequence from top to bottom. A protocol stack of the IAB node 1 for communication with the DU includes an Adapt layer, a BL-L2 layer, and a BL-L1 layer in sequence from top to bottom. A protocol stack of the DU for communication with the IAB node 1 includes an Adapt layer, a BL-L2 layer, and a BL-L1 layer in sequence from top to bottom. A protocol stack of the DU for communication with the CU includes a GTP layer, a UDP layer, an IP layer, and an L1/L2 layer (indicating an L1 layer and an L2 layer) in sequence from top to bottom. A protocol stack of the CU includes, in sequence from top to bottom, the SDAP layer and the PDCP layer that are peer layers of the SDAP layer and the PDCP layer of the UE, and a GTP layer, a UDP layer, an IP layer, and an L1/L2 layer that are peer layers of a GTP layer, a UDP layer, an IP layer, and an L1/L2 layer of the DU.

Figure 8:
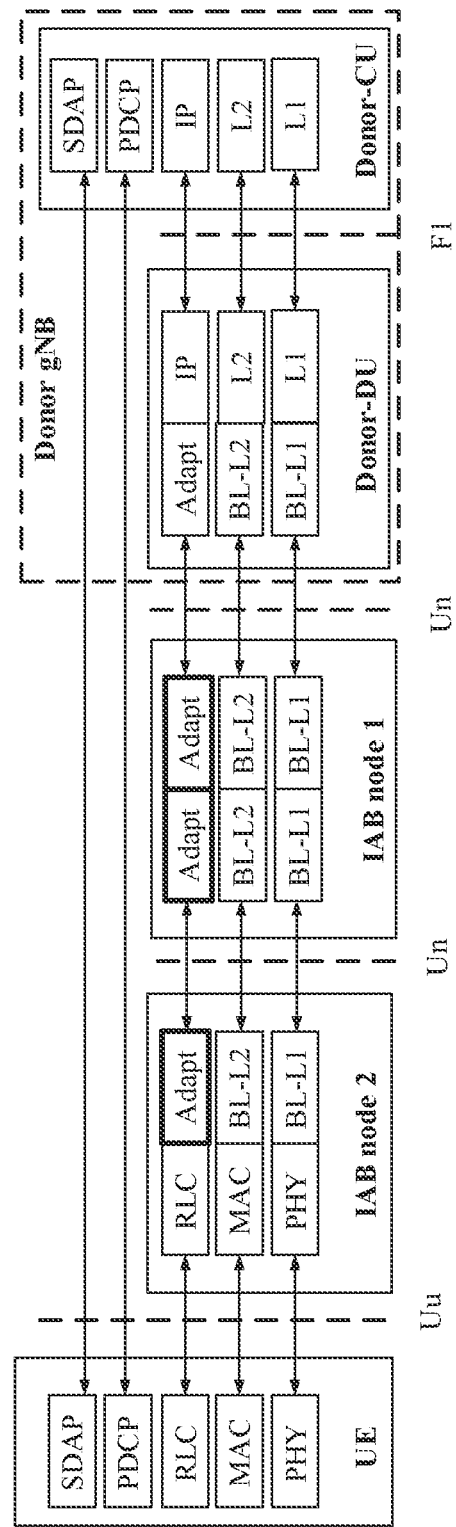
FIG. 8 is a second schematic architectural diagram of a protocol stack according to an embodiment of this application.

It may be understood that, in FIG. 7, the GTP layer/the UDP layer/the IP layer shown in a dashed-line box on an F1 interface between the CU and the DU is an optional protocol layer. That is, the three protocol layers may not be configured for the CU and the DU, or some protocol layers of the GTP layer/UDP layer/IP layer are not configured (for example, as shown in FIG. 8, the GTP layer and the UDP layer are not configured for an interface (for example, the F1 interface) between the CU and the DU, but the IP layer is configured for the interface between the CU and the DU).

Figure 9:
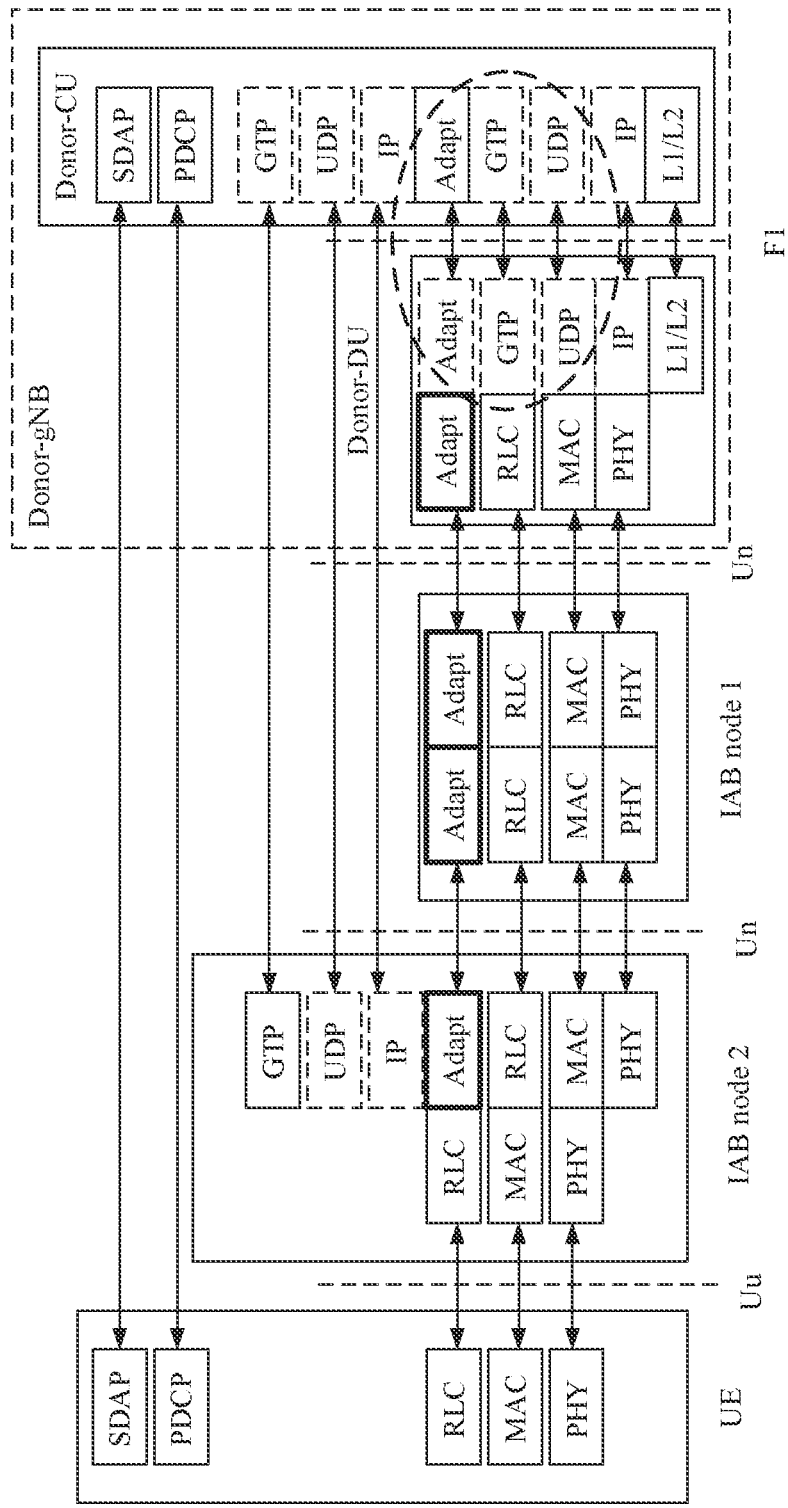
FIG. 9 is a third schematic architectural diagram of a protocol stack according to an embodiment of this application.

FIG. 9 shows another optional protocol stack architecture according to an embodiment of this application. A difference between FIG. 9 and FIG. 7 lies in that peer GTP layers may further be configured for an interface between the IAB node 2 and the CU. Optionally, peer UDP layers and peer IP layers may further be set below the GTP layers for the interface between the IAB node 2 and the CU. It may be understood that, the UDP layers and the IP layers below the GTP layers of the interface between the IAB node 2 and the CU are optional layers, that is, may not be configured. A GTP tunnel that is set up based on the GTP layers corresponds to a DRB of the UE, that is, a tunnel endpoint identifier (TEID) of the GTP layers may be uniquely mapped to one DRB of the UE. The GTP layer of the IAB node 2 is located above the Adapt layer, and the GTP layer that is configured for the CU and that is the peer layer of the GTP layer of the IAB node 2 is located below the PDCP layer of the CU. There may further be a UDP layer and an IP layer that are peer layers of a UDP layer and an IP layer of the IAB node 2 below the GTP layer that is configured for the CU and that is the peer layer of the GTP layer of the IAB node 2. Therefore, in FIG. 9, an example in which the GTP layer configured for the CU is located between the PDCP layer of the CU and the UDP layer of the CU is used.

Figure 10:
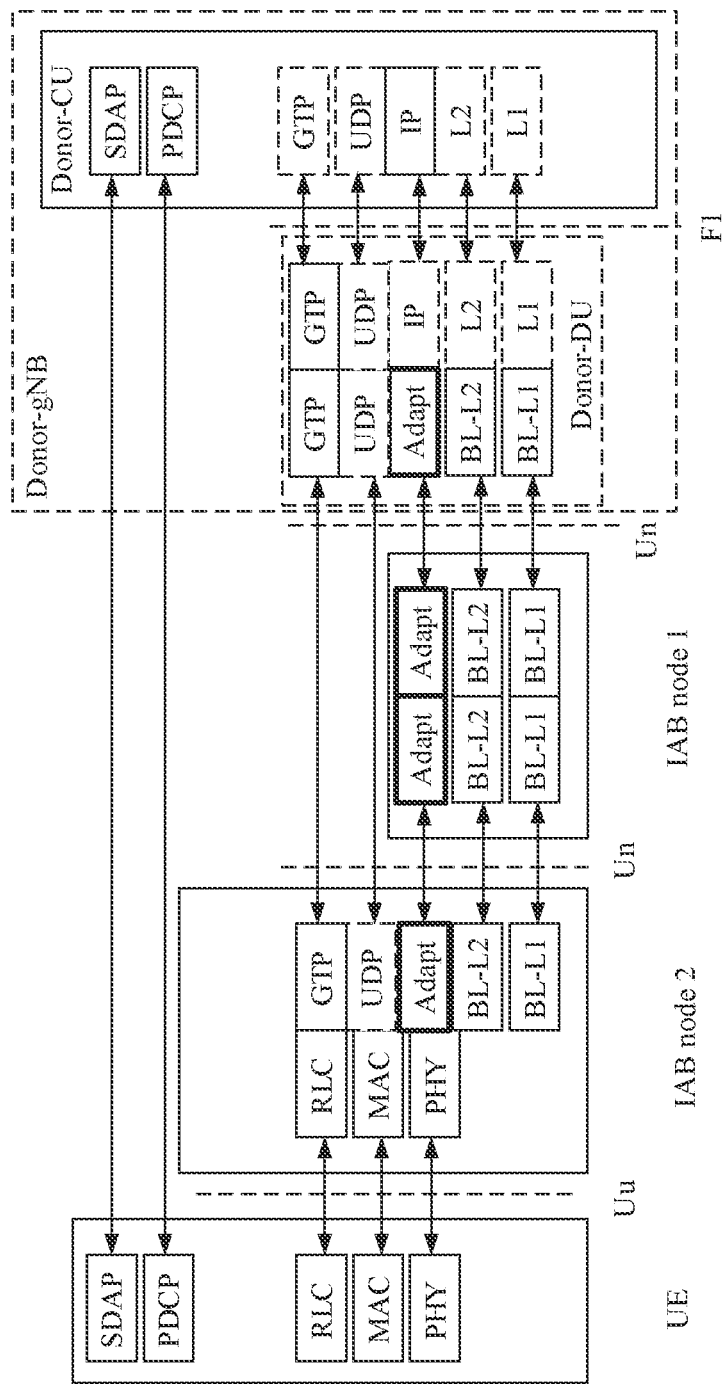
FIG. 10 is a fourth schematic architectural diagram of a protocol stack according to an embodiment of this application.

FIG. 10 shows still another optional protocol stack architecture according to an embodiment of this application. A difference between FIG. 10 and FIG. 7 lies in that: in FIG. 10, there are hop-by-hop peer GTP layers or segment-by-segment peer GTP layers of the IAB node 2 and the CU, and a GTP tunnel that is set up based on the GTP layers also corresponds to a DRB of the UE.

Figure 11:
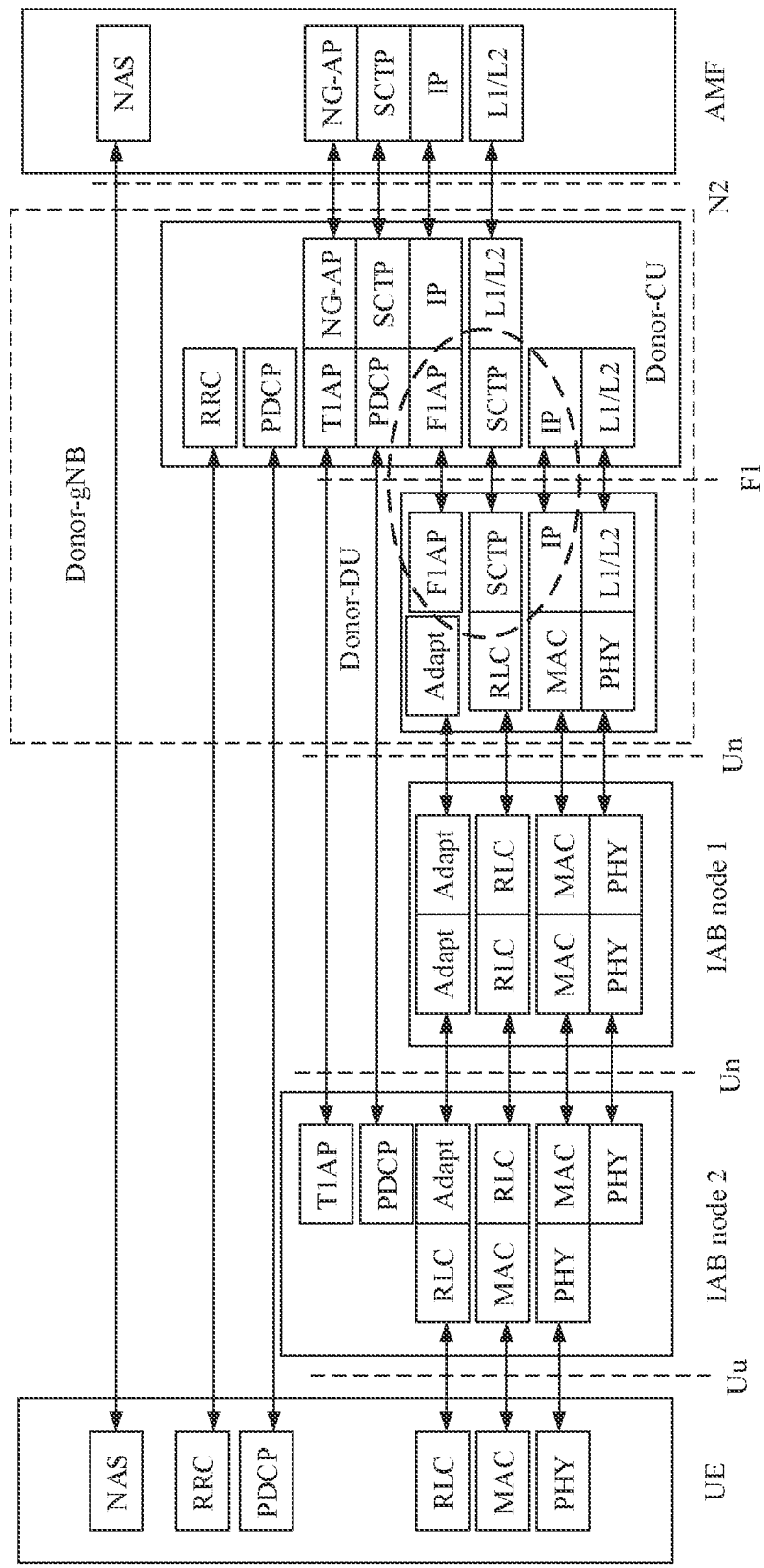
FIG. 11 is a fifth schematic architectural diagram of a protocol stack according to an embodiment of this application.

In FIG. 11, devices in a control plane multi-hop protocol architecture include an access management function (AMF) unit, a CU, a DU, an IAB node 1, an IAB node 2, and UE. A protocol stack of the UE includes, in sequence from top to bottom, a NAS layer that is a peer layer of a NAS layer of the AMF, an RRC layer that is a peer layer of an RRC layer of the CU, a PDCP layer that is a peer layer of a PDCP layer of the CU, and an RLC layer, a MAC layer, and a PHY layer that are peer layers of an RLC layer, a MAC layer, and a PHY layer of the IAB node 2 when the UE communicates with the IAB node 2. In protocol stacks of the IAB node 2 and the UE, peer protocol layers include RLC layers, MAC layers, and PHY layers in sequence from top to bottom. In protocol stacks of the IAB node 2 and the IAB node 1, peer protocol layers include Adapt layers, RLC layers, MAC layers, and PHY layers in sequence from top to bottom. In addition, in FIG. 11, the IAB node 2 further includes a T1AP layer and a PDCP layer that are located above the Adapt layer and that are peer layers of a T1AP layer and a PDCP layer of the CU. The T1AP layer is located above the PDCP layer. A protocol stack of the IAB node 1 for communication with the IAB node 2 includes an Adapt layer, an RLC layer, a MAC layer, and a PHY layer in sequence from top to bottom. A protocol stack of the IAB node 1 for communication with the DU includes an Adapt layer, an RLC layer, a MAC layer, and a PHY layer in sequence from top to bottom. A protocol stack of the DU for communication with the IAB node 1 includes an Adapt layer, an RLC layer, a MAC layer, and a PHY layer in sequence from top to bottom. Protocol stacks of the DU and the CU for communication include peer F1AP layers, peer SCTP layers, peer IP layers, and peer L1/L2 layers in sequence from top to bottom. A protocol stack of the CU for communication with the UE, the IAB node 2, and the DU includes, in sequence from top to bottom, the RRC layer being the peer layer of the RRC layer of the UE, the PDCP layer being the peer layer of the PDCP layer of the UE, a T1AP layer being a peer layer of the T1AP layer of the IAB node 2, a PDCP layer being a peer layer of the PDCP layer of the IAB node 2, an F1AP layer being a peer layer of the F1AP layer of the DU, an SCTP layer being a peer layer of the SCTP layer of the DU, an IP layer being a peer layer of the IP layer of the DU, and an L1/L2 layer being a peer layer of the L1/L2 layer of the DU. A protocol stack that is of an interface between the CU and the AMF and that is for communication includes an NG-AP layer, an SCTP layer, an IP layer, and an L1/L2 layer in sequence from top to bottom. A protocol stack of the AMF includes, in sequence from top to bottom, the NAS layer that is the peer layer of the NAS layer of the UE, and an NG-AP layer, an SCTP layer, an IP layer, and an L1/L2 layer that are peer layers of the NG-AP layer, the SCTP layer, the IP layer, and the L1/L2 layer of the CU. In FIG. 11, N2 represents an interface between a base station and the AMF. A name of the interface between the base station and the AMF is not limited in this embodiment of this application, in other words, the interface between the base station and the AMF may have another name.

In FIG. 11, the PDCP layer of the IAB node 2 and the PDCP layer of the CU are configured to provide security protection, such as encryption and integrity protection, for a T1AP message transmitted between the CU and the IAB node 2. For a function of the T1AP layer, refer to functions of the F1AP layers of the CU and the DU. For example, the T1AP layer is mainly configured to: when an IAB node is considered as a wireless distributed unit of the CU, carry a control plane message between the IAB node and the CU. For example, an interface between the IAB node and the CU (in this application, an example in which an interface between the IAB node 2 and the CU is a T1 interface is used) is used to manage a message related to configuration updates of the IAB node and the CU, and configuration information relate to a child node (including the UE, another IAB node, and the like) of the IAB node 2. It should be noted that the interface between the IAB node and the CU may be referred to as the T1 interface, or may use a name of an F1 interface or an F1* interface. In this embodiment of this application, an example in which the name of the interface between the IAB node and the CU is the T1 interface is used, but the name of the interface between the IAB node and the CU is not limited.

It should be noted that an XXAP layer in this embodiment of this application is named by using an XX interface between the IAB node and the CU. Therefore, using an example in which the interface between the IAB node and the CU is the T1 interface, an AP layer of the IAB node may be referred to as a T1AP layer. When the interface between the IAB node and the CU has another name, the name of the T1AP layer changes accordingly. For example, when the interface between the IAB node and the CU is the F1* interface, the AP layer of the IAB node may be referred to as an F1*AP layer.

For the architecture shown in FIG. 11, the peer F1AP layers, the peer SCTP layers, and the peer IP layers on the F1 interface between the CU and the DU may alternatively be replaced with GTP layers, UDP layers, and IP layers. In this case, a T1AP message of the IAB node is transmitted through a user plane transmission channel on the F1 interface.

Figure 12:
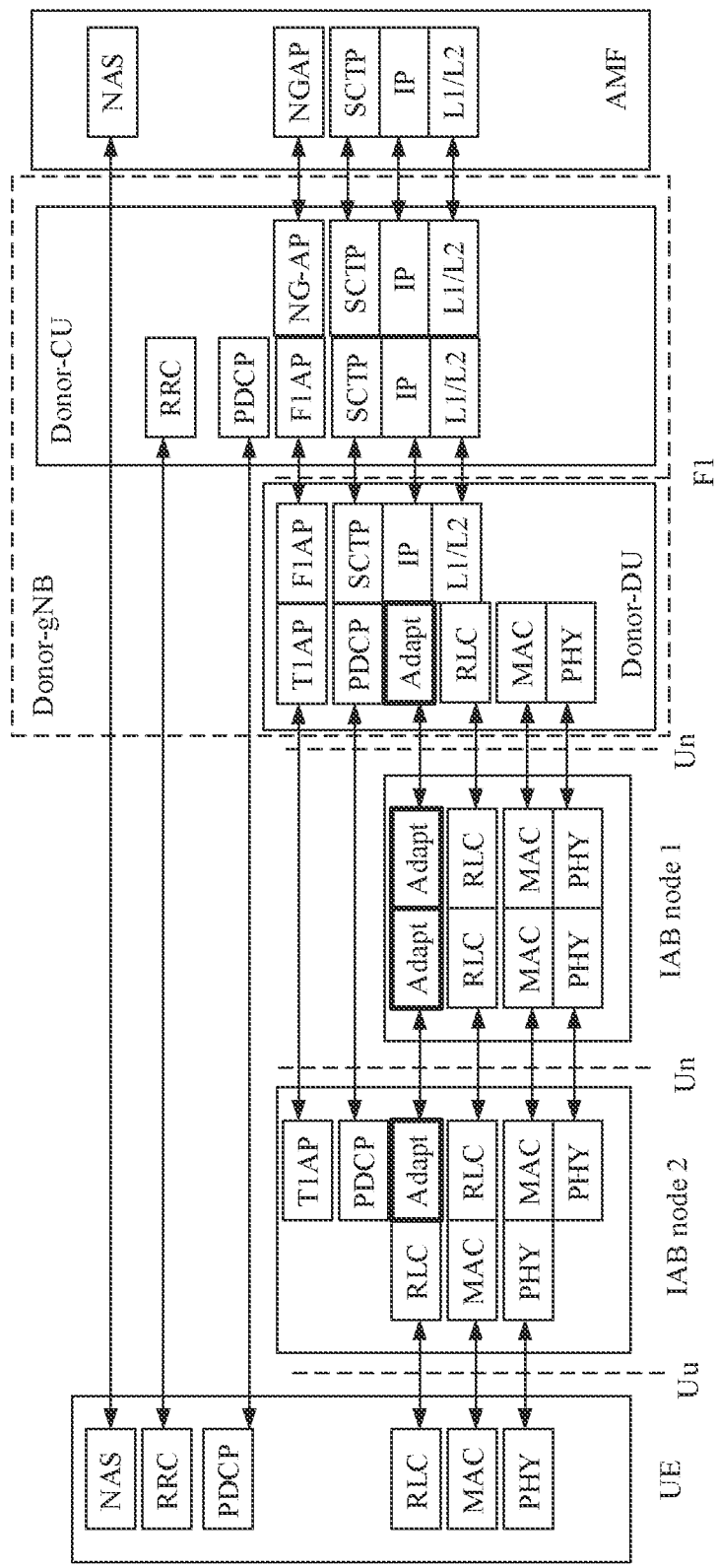
FIG. 12 is a sixth schematic architectural diagram of a protocol stack according to an embodiment of this application.

FIG. 12 shows another control plane multi-hop protocol architecture according to an embodiment of this application. In FIG. 12, a DU may serve as a proxy node for a control plane message between an IAB node and a CU, to perform conversion between a T1AP message between an IAB node 2 and the DU and an F1AP message between the DU and the CU. In the architecture shown in FIG. 12, a specific type of F1AP message needs to be defined, to indicate that content of the F1AP message is from a T1AP message of an IAB node. In a downlink, after receiving an F1AP message sent by the CU, the DU first determines that the F1AP message needs to be sent to the IAB node 2 (for example, the CU adds, to the F1AP message, an identifier of the IAB node 2 or special indication information, to indicate that content in the F1AP message needs to be forwarded to the IAB node 2). Then, the DU modifies and converts the F1AP message into a T1AP message, to send the T1AP message to the IAB node 2. In an uplink, after receiving a T1AP message, the DU determines that the T1AP message needs to be sent to the CU, so that the DU can modify and convert the T1AP message into an F1AP message (for example, the DU adds, to the F1AP message, an identifier of the IAB node 2 or special indication information, to indicate that content in the F1AP message is sent by the IAB node 2 to the CU) and send the F1AP message to the CU. In the architecture shown in FIG. 12, PDCP layers that perform security protection on the T1AP message are located in the DU and the IAB node (Note: This security configuration process is special. The PDCP layers are located in the DU and the IAB node. Therefore, the CU needs to configure a security parameter; in addition, in a network access procedure of the IAB node, the security parameter is sent to the DU and the IAB node 2 together with a routing configuration described in S213 to S215 in the following descriptions). As the proxy node, for a UE-related T1AP message, the DU allocates, to the UE, a first identifier, for example, a DU T1AP UE ID, which is carried in the T1AP message to identify the UE. The DU further allocates, to the UE, a second identifier, for example, a DU F1AP UE ID, which is carried in the F1AP message to identify the UE. The DU may maintain a correspondence between the DU T1AP UE ID and the DU F1AP UE ID, and a correspondence between the UE and an IAB node (for example, the IAB node 2 in FIG. 12) that provides an access service for the UE. For a UE-independent T1AP message, an identifier of an IAB node is correspondingly carried in an F1AP message between the DU and the CU, and is used to indicate an IAB node from or to which content included in the F1AP message comes or needs to be sent.

It should be noted that, in the embodiments of this application, the DgNB may be a complete functional entity, or may be in a form in which a CU and a DU are separated. In other words, the DgNB includes a centralized unit of the donor gNodeB (Donor-CU, CU for short below) and a distributed unit of the donor gNodeB (Donor-DU, DU for short below). If the DgNB is in the form in which the CU and the DU are separated, an L2 layer is a corresponding link layer of an interface between the CU and the DU, and an L1 layer is a corresponding physical layer of the interface between the CU and the DU. In addition, if the DgNB is a complete functional entity, the protocol stacks between the CU and the DU in FIG. 7 to FIG. 12 shown below may not exist, and the DgNB needs to reserve only a protocol stack being a peer protocol stack of a protocol stack of an IAB node and a protocol stack being a peer protocol stack of a protocol stack of a terminal.

Optionally, for the user plane protocol architectures shown in FIG. 7 and FIG. 8, there may further be peer GTP layers, or peer GTP layers and peer UDP layers of the IAB node 2 and the DgNB/CU. The GTP layer is located above the Adapt layer at the IAB node 2, and located, at the CU, below the PDCP layer being the peer layer of the PDCP layer of the UE and between the PDCP layer and the IP layer (or the L2 layer) of the F1 interface, or located, at the CU, between the PDCP layer being the peer layer of the PDCP layer of the UE and the GTP layer of the F1 interface.

In the embodiments of this application, a location relationship between protocol layers is defined as follows: In a process in which one node sends data or signaling, a protocol layer that first processes a data packet is above a protocol layer that processes the data packet later; in other words, the protocol layer that processes the data packet first may be considered as an upper protocol layer of the protocol layer that processes the data packet later. Alternatively, in a process in which one node receives data, a protocol layer that first processes a data packet is below a protocol layer that processes the data packet later; in other words, the protocol layer that processes the data packet first may be considered as a lower protocol layer of the protocol layer that processes the data packet later. For example, referring to FIG. 9, in the protocol stack of the UE, both the SDAP layer and the PDCP layer are upper protocol layers of the RLC layer, and the SDAP layer, the PDCP layer, and the RLC layer are all upper protocol layers of the MAC layer.

To make the descriptions in the following clearer, descriptions of "hop-by-hop". "end-to-end", and "segment-by-segment" in the embodiments of this application are all clarified herein.

If a path between a node A and a node B includes S nodes, the nodes on the path are successively: the node A, a node 1, a node 2, . . . , a node S, and the node B.

If the node A and the node B are described as having hop-by-hop peer protocol layers (which may be, for example, first protocol layers), it indicates that the node A and the node 1 have the peer protocol layers, the node s and the node s+1 have the peer protocol layers, and the node S and the node B have the peer protocol layers, where s is an integer greater than 0 and less than S.

If the node A and the node B are described as having end-to-end peer protocol layers, it indicates that the node A and the node B have the peer protocol layers, the node A and the node 1 do not have the peer protocol layers, and the node S and the node B do not have the peer protocol layers either.

If the node A and the node B are described as having segment-by-segment peer protocol layers (which may be, for example, first protocol layers), it indicates that for the node A and the node B, the segment-by-segment peer protocol layers of the node A and the node B may be set up by using a plurality of end-to-end peer protocol layers, and data may be transmitted between two endpoints of at least one of the plurality of end-to-end peer protocol layers by forwarding the data by another node. For example, for the node A and the node B, the segment-by-segment peer protocol layers of the node A and the node B may be set up by using two of the end-to-end peer protocol layers. For example, the node A and a node S1 have the end-to-end peer protocol layers, the node S1 and the node B have the end-to-end peer protocol layers, and data may be transmitted between the node A and the node S1 or between the node S1 and the node B by forwarding the data by another node.

In the embodiments of this application, unless otherwise specified, that the node A and the node B have peer protocol layers may refer to the foregoing three cases.

If the node A and the node B are described as having hop-by-hop peer tunnels (which may be, for example, GTP tunnels), it indicates that the node A and the node 1 have the peer tunnels, the node s and the node s+1 have the peer tunnels, and the node S and the node B have the peer tunnels, where s is an integer greater than 0 and less than S.

If the node A and the node B are described as having end-to-end peer tunnels, it indicates that the node A and the node B have the peer tunnels, the node A and the node 1 do not have the peer tunnels, and the node S and the node B do not have the peer tunnels either.

If the node A and the node B are described as having segment-by-segment peer tunnels, it indicates that for the node A and the node B, the segment-by-segment peer tunnels of the node A and the node B may be set up by using a plurality of end-to-end peer tunnels, and data may be transmitted between two endpoints of at least one of the plurality of end-to-end peer tunnels by forwarding the data by another node. For example, for the node A and the node B, the segment-by-segment peer tunnels of the node A and the node B may be set up by using two of the end-to-end peer tunnels. For example, the node A and the node S1 have the end-to-end peer tunnels, the node S1 and the node B have the end-to-end peer tunnels, and data may be transmitted between the node A and the node S1 or between the node S1 and the node B by forwarding the data by another node.

In the embodiments of this application, unless otherwise specified, that the node A and the node B have peer tunnels may refer to the foregoing three cases. It should be noted that, in the hop-by-hop (or segment-by-segment) peer tunnels described in the embodiments of this application, hops (or segments) of the tunnels are in a one-to-one mapping.

The data packet in the embodiments of this application may be control plane signaling or user plane data. Alternatively, the data packet in the embodiments of this application may be a service data unit (SDU) or a protocol data unit (PDU). The data packet in the embodiments of this application may be a downlink data packet, or may be an uplink data packet.

Transmission mode of user-plane data and control-plane signaling:

User plane data packet. When a user plane data packet is transmitted between UE and a DgNB/donor-CU, on each access link and each backhaul link, the user plane data packet is mapped to a data radio bearer DRB or an RLC bearer/RLC channel/logical channel corresponding to the DRB for sending.

Control plane data packet: A control plane data packet is a data packet including control plane signaling. The control plane signaling is mainly classified into two types: One type is an RRC message, including an RRC message of UE and an RRC message used when an IAB node acts as UE/a mobile terminal (MT). The control plane data packet is sent through an access link over a signaling radio bearer (SRB) or an RLC bearer/RLC channel/logical channel corresponding to the SRB. The other type is a T1AP message of an IAB node. When the two types of control plane data packets are transmitted through a backhaul link, the data packets may be sent over a DRB of the backhaul link or an RLC bearer/RLC channel/logical channel corresponding to the DRB, or may be sent over an SRB of the backhaul link or an RLC bearer/RLC channel/logical channel corresponding to the SRB.

A child node of a node in this application is a node that is directly connected to the node (or connected to the node through a link) (for example, the IAB node 3 in FIG. 5 is a child node of the IAB node 1 and the IAB node 2).

A descendant child node of a node is connected to the node through n (n>1) links. For example, in FIG. 5, a descendant child node of the IAB node 1 and the IAB node 2 is the terminal.

It should be noted that, regardless of a child node or a descendant child node, the node provides a backhaul service for the child node and the descendant child node.

It may be understood that a configuration method in this application may be performed by a first device, or an apparatus that supports a first device in implementing the method, for example, an apparatus applied to the first device, such as a chip. A configuration method interacting with the foregoing configuration method may be performed by a RAN device, or an apparatus that supports a RAN device in implementing the method, for example, an apparatus applied to the RAN device, such as a chip. In the following embodiments, an example in which a configuration method is performed by a first device and a configuration method interacting with the configuration method may be performed by a RAN device is used.

Figure 13:
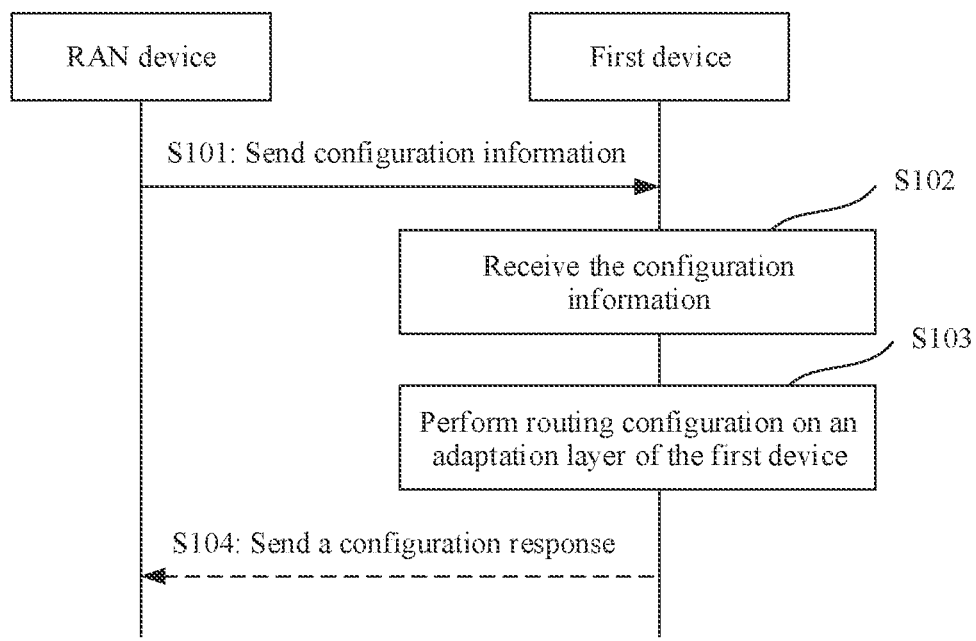
FIG. 13 is a first schematic flowchart of a configuration method according to an embodiment of this application.

FIG. 13 shows a configuration method according to an embodiment of this application. The method includes the following steps.

S101: A RAN device sends configuration information to a first device, where the configuration information includes a routing configuration for an adaptation layer of the first device on a transmission path: the transmission path includes the RAN device and at least one wireless backhaul node: the routing configuration includes an identifier of a second device, the first device is a distributed unit DU of a donor node or a first wireless backhaul node in the at least one wireless backhaul node; and the second device is a second wireless backhaul node in the at least one wireless backhaul node, or a terminal served by the first wireless backhaul node in the at least one wireless backhaul node, or a terminal served by a second wireless backhaul node.

For example, the configuration information in S101 in this embodiment of this application may alternatively be replaced with the following: The configuration information includes a routing configuration for an adaptation layer of the first device on a transmission path, the transmission path includes the first device and a transmission path device, the first device is a distributed unit DU or a wireless backhaul node connected to a DU, the routing configuration includes an identifier of the transmission path device, and the transmission path includes at least two wireless backhaul nodes.

For example, the transmission path device may be a child node or a descendant a child node of the first device on the transmission path, or may be a terminal served by the first device, or may be a terminal served by the transmission path device.

For example, the first device is a distributed unit DU of a donor node or a first wireless backhaul node in at least two wireless backhaul nodes, and the transmission path device is a second wireless backhaul node in the at least two wireless backhaul nodes, or a terminal served by the first wireless backhaul node in the at least two wireless backhaul nodes, or a terminal served by a second wireless backhaul node.

If there is a direct link between the RAN device and the first device, the RAN device may directly send the configuration information to the first device, or the RAN device sends the configuration information to the first device through another intermediate node.

Optionally, the identifier of the second device or the identifier of the transmission path device may be identifiers of one or more devices. This is not limited in this embodiment of this application.

An identifier of any device in this application may be, for example, a cell radio network temporary identifier (C-RNTI), a MAC layer identifier, an international mobile subscriber identity (IMSI), a temporary mobile subscriber identity (TMSI), or an identifier (for example, a network layer identifier, such as an IP address, a transport layer identifier, or an adaptation layer identifier, of the device) allocated by an operation, administration and maintenance (OAM) entity or a donor node DgNB/donor-CU or a core network element (such as a gateway device or a session management function (SMF) unit or a user plane function (UPF) unit) to the device. This is not limited in this embodiment of this application.

For example, the RAN device may be a donor node, or may be a centralized unit CU of a donor node. For example, the RAN device may be the DgNB shown in FIG. 6, or the CU shown in FIG. 7 to FIG. 12.

Optionally, in this embodiment of this application, the RAN device may send the configuration information to the first device by using an F1AP message. When the first device is the DU and the RAN device is the CU, the configuration information to be sent by the RAN device may be carried in an F1AP message and sent to the first device.

When the first device is the first wireless backhaul node, the RAN device may be the CU or the DgNB, and the RAN device may send the configuration information to the first device by using a T1AP message. For example, the RAN device is the CU. In this case, the configuration information is a T1AP message sent by the CU to the first wireless backhaul node. The CU processes and encapsulates the T1AP message at a protocol layer of an F1 interface, and sends the processed and encapsulated T1AP message to the DU. After receiving the processed and encapsulated T1AP message, the DU removes the protocol encapsulation of the F1 interface, to obtain the T1AP message, then processes the T1AP message at a protocol layer of a backhaul link (Un interface), and sends the T1AP message to the first device. Specific processing needs to be understood based on a protocol stack configuration of the CU. Using the protocol stack configured for the CU shown in FIG. 11 as an example, the CU generates a T1AP message to be sent to the first device (for example, an IAB node 2). The T1AP message includes the configuration information to be sent to the first device. The CU performs processing (for example, performs encryption and/or integrity protection at a PDCP layer) on the T1AP message at the PDCP layer, processes and encapsulates the T1AP message at a protocol layer of the F1 interface (for example, sequentially processes and encapsulates the T1AP message at a F1AP layer, an SCTP layer, an IP layer, an L2 layer, and an L1 layer, or sequentially processes and encapsulates the T1AP message at a GTP layer, a UDP layer, an IP layer, an L2 layer, and an L1 layer), and then sends the processed and encapsulated T1AP message to the DU. After receiving the processed and encapsulated T1AP message, the DU removes the protocol encapsulation of the F1 interface, to obtain a PDCP PDU including the T1AP message, the DU processes and encapsulates the PDCP PDU at a protocol layer of the Un interface (for example, processed and encapsulated at an adaptation layer, an RLC layer, a MAC layer, and a PHY layer), and then sends the processed and encapsulated PDCP PDU to the first device through an IAB node 1.

For example, on the one hand, the first wireless backhaul node may be a wireless backhaul node that is in the at least one wireless backhaul node and that is directly connected to the DU or the donor node.

For example, as shown in FIG. 6, the at least one wireless backhaul node includes the IAB node 1 and the IAB node 2. If the IAB node 1 is connected to the donor node, the first wireless backhaul node may be the IAB node 1. On the other hand, the first wireless backhaul node may be a wireless backhaul node that is in the at least one wireless backhaul node and that is indirectly connected to the DU or the donor node. In other words, one or more wireless backhaul nodes may further exist between the first wireless backhaul node and the DU or the donor node. For example, as shown in FIG. 5, the first wireless backhaul node may be the IAB node 3.

The second wireless backhaul node may be a wireless backhaul node that is in the at least one wireless backhaul node and that is directly or indirectly served by the first wireless backhaul node. Alternatively, it may be understood that the second wireless backhaul node may be a child node or a descendant child node of the first wireless backhaul node in the at least one wireless backhaul node. For example, in FIG. 6, the second wireless backhaul node may be the IAB node 2. In FIG. 5, if an IAB node 4 further exists between the IAB node 1 and the IAB node 3, the IAB node 3 is a descendant child node of the IAB node 1. In this way, the second wireless backhaul node may be the IAB node 3.

Optionally, in an IAB network, if the first wireless backhaul node directly provides an access service for a terminal or the first wireless backhaul node is directly connected to a terminal in a wireless manner, the second device may alternatively be the terminal.

For example, as shown in FIG. 4, the first wireless backhaul node is the IAB node 1, and the second device may be the terminal shown in FIG. 4.

Optionally, in an IAB network, if there are a plurality of wireless backhaul nodes between a terminal and the RAN device, the second device may be the terminal that accesses the second wireless backhaul node. In this case, the second wireless backhaul node may be a wireless backhaul node that directly provides an access service for the terminal. Alternatively, it may be understood that the second wireless backhaul node is a wireless backhaul node that is in the at least one wireless backhaul node and that directly provides an access service for the terminal.

Optionally, the routing configuration provided in this embodiment of this application may further include one or more of the following content: an identifier of a next-hop node of the first device on a transmission path between the first device and the second device, an identifier of a next-hop node that is of the first device and that is between the first device and the RAN device, an identifier of a transmission path, and an identifier of a next-hop node corresponding to the identifier of the transmission path.

The identifier of the transmission path is used to determine a transmission path between the RAN device/first device and the second device. For example, the identifier of the transmission path includes identifiers of all nodes on the transmission path between the RAN device/first device and the second device. For example, the first device is the DU, and the second device is the IAB node 3 shown in FIG. 5. In FIG. 5, transmission paths from the DU to the IAB node 3 include: a transmission path 1: the DU→the IAB node 1→the IAB node 3, where in this case, an identifier of the transmission path 1 sequentially includes identifiers representing the three nodes; and a transmission path 2: the DU→the IAB node 2→the IAB node 3, where in this case, an identifier of the transmission path 2 sequentially includes identifiers representing the three nodes. The configuration information sent by the CU to the DU may include the identifier of the transmission path 1 and/or the identifier of the transmission path 2. In another possible example, the identifier of the transmission path does not reflect information about a node on the transmission path. For example, if identifiers of transmission paths are 1 and 2, the configuration information sent by the RAN device to the first device needs to include the identifier of the transmission path, and a next-hop node of the first device corresponding to the identifier of the transmission path. For example, the configuration information sent by the CU to the DU includes the identifier "1" of the transmission path 1 and a corresponding next-hop node being the IAB node 1, and/or the identifier "2" of the transmission path 2 and a corresponding next-hop node being the IAB node 2.

It may be understood that, the foregoing routing configuration is configured for the first device, so that the first device may determine a topology structure of a network in which the first device is located, or determine a routing relationship from the first device to the RAN device or each wireless backhaul node or terminal within a service range of the RAN device. In a data transmission process, if the first device receives a data packet to be sent to an IAB node or a terminal, the first device may find a correct next-hop wireless backhaul node based on the foregoing routing configuration, so that the data packet is forwarded to the correct wireless backhaul node or terminal through the wireless backhaul nodes.

Because the first device varies, the next-hop node of the first device on the transmission path between the first device and the second device changes accordingly. Therefore, in an actual process, an identifier of the next-hop node of the first device needs to be determined based on an actual situation. Referring to FIG. 5, using an example in which the first device is the DU and the second device is the IAB node 3, a next-hop node of the first device is the IAB node 1 or the IAB node 2; using an example in which the first device is the IAB node 1 and the second device is the IAB node 3, a next-hop node of the first device is the IAB node 3.

It may be understood that the first device may be a wireless backhaul node that is directly or indirectly served by the RAN device. When the first device is the wireless backhaul node indirectly served by the RAN device, the RAN device may forward, through a node (which may include a wireless backhaul node and/or a DU) between the RAN device and the first device, the configuration information to be sent to the first device. In this case, in a process in which the RAN device sends the configuration information to the first device, an identifier of the first device may further be carried. In this way, when receiving the configuration information to be sent to the first device, the wireless backhaul node between the RAN device and the first device may determine, based on the identifier of the first device, to send the configuration information to the first device.

For example, as shown in FIG. 6, when the first device is the IAB node 1 and the RAN device is the CU, the CU may first send, to the DU, the configuration information to be sent to the first device and the identifier of the first device, and then the DU sends the configuration information to the first device based on the identifier of the first device.

S102: The first device receives the configuration information sent by the RAN device.

S103: The first device performs the routing configuration.

Optionally, the adaptation layer of the first device has a routing function. A routing mapping table is maintained at the adaptation layer, and the first device determines a routing relationship from the first device to another node based on the routing mapping table, so that the first device may add, in S103 to the routing mapping table maintained by the first device, the routing configuration information sent by the RAN device.

Optionally, the configuration information sent by the RAN device to the first device further includes a QoS configuration used for the first device to perform data transmission on the transmission path.

For example, the QoS configuration includes one or more of the following content; a QoS identifier, a QoS parameter (such as a latency, a guaranteed bit rate, a maximum bit rate, a packet loss rate, or a priority level) corresponding to the QoS identifier, and a QoS mapping relationship. The QoS mapping relationship may be a mapping relationship between the QoS identifier and a radio bearer/an RLC bearer/a logical channel/an RLC channel on a wireless interface of the first device, or a mapping relationship between a radio bearer/an RLC bearer/a logical channel/an RLC channel on a prior-hop wireless interface of the first device and a radio bearer/an RLC bearer/a logical channel/an RLC channel on a next-hop wireless interface. The QoS identifier may be a QFI, a 5QI, a QCI, a DSCP, an identifier of a radio bearer/an RLC bearer/a logical channel/an RLC channel, or the like.

The QoS identifier and the QoS parameter corresponding to the QoS identifier are configured for the first device, so that after receiving a data packet, the first device can provide, based on the QoS identifier carried in the data packet and the QoS parameter corresponding to the QoS identifier, corresponding QoS guarantee when sending the data packet.

The mapping relationship between the radio bearer/RLC bearer/logical channel/RLC channel on the prior-hop wireless interface of the first device and the radio bearer/RLC bearer/logical channel/RLC channel on the next-hop wireless interface may be represented by using a mapping relationship between an identifier of the radio bearer/RLC bearer/logical channel/RLC channel on the prior-hop wireless interface of the first device and an identifier of the radio bearer/RLC bearer/logical channel/RLC channel on the next-hop wireless interface. The mapping relationship between the QoS identifier and the radio bearer/RLC bearer/logical channel/RLC channel on the wireless interface of the first device may be represented by using a mapping relationship between the QoS identifier and an identifier of the radio bearer/RLC bearer/logical channel/RLC channel on the wireless interface of the first device.

The QoS mapping relationship is configured for the first device. In this way, when receiving a data packet, the first device may determine (or select), based on a QoS identifier carried in the data packet or based on a radio bearer/an RLC bearer/a logical channel/an RLC channel for receiving the data packet, a radio bearer/an RLC bearer/a logical channel/an RLC channel that is used to forward the data packet and that is on a wireless interface between the first device and a next-hop node, to forward the data packet based on a QoS requirement of the data packet (or a service corresponding to the data packet).

It may be understood that a prior hop and a next hop in the embodiments of this application are relative concepts. In different transmission scenarios, a prior-hop node and a next-hop node of a same wireless backhaul node are different. As shown in FIG. 6, in an uplink transmission process, for the IAB node 1, a prior hop of the IAB node 1 is the IAB node 2, and a next hop of the IAB node 1 is the donor node. In a downlink transmission process, for the IAB node 1, a prior hop of the IAB node 1 is the donor node, and a next hop of the IAB node 1 is the IAB node 2.

Based on the foregoing descriptions, a prior-hop wireless interface and a next-hop wireless interface also need to be determined after a prior-hop node and a next-hop node of a device are determined. As shown in FIG. 7, for example, during downlink transmission, a prior-hop node of the IAB node 1 is a donor gNB and a next-hop node of the IAB node 1 is the IAB node 2. In this case, a prior-hop wireless interface of the IAB node 1 is a Un interface and a next-hop wireless interface of the IAB node 2 is a Un interface. For example, during downlink transmission, a next-hop node of the IAB node 2 is the UE and a prior-hop node of the IAB node 2 is the IAB node 1. In this case, a next-hop wireless interface of the IAB node 2 is a Uu interface and a prior-hop wireless interface of the IAB node 2 is a Un interface.

Optionally, the radio bearer in this embodiment of this application may be a data radio bearer DRB or a signaling radio bearer SRB. The RLC bearer/logical channel/RLC channel in this embodiment of this application may be an RLC bearer/a logical channel/an RLC channel corresponding to the DRB or the SRB.

It may be understood that, in this embodiment of this application, in an access process of the second device, the RAN device sends the configuration information to the first device. If the second device is the second wireless backhaul node, the routing configuration of the first device on the transmission path may include a routing configuration related to the second wireless backhaul node. For example, the configuration information includes information such as the identifier of the second device and an identifier of a next-hop node on the transmission path between the first device and the second device. If the second device is the terminal, a configuration of the first device on the transmission path may include routing configuration information and QoS configuration information that are related to the terminal. The routing configuration information includes, for example, the identifier of the second device and an identifier of a transmission path from the RAN device to the second device. The QoS configuration information includes, for example, an identifier of a radio bearer/logical channel of the UE, and a mapping relationship between the identifier of the radio bearer/logical channel of the UE and an identifier of a logical channel of the first device on an air interface.

In a possible implementation, after S103, this embodiment of this application may further include the following step:

S104: The first device sends a configuration response to the RAN device. The configuration response is used to notify the RAN device of a configuration result of the first device (for example, the configuration is completed, the configuration is partially completed, or the configuration fails).

For example, when the first device is the DU, the configuration response may be encapsulated in an F1AP message and sent to the RAN device; or when the first device is the wireless backhaul node, the configuration response may be encapsulated in a T1AP message (where in this case, the T1AP message may carry the identifier of the first device and an identifier of the RAN device (the CU/donor node). Using an example in which the RAN device is the CU, the identifier of the first device herein is used to determine that a node that sends the configuration response is the first device, and an identifier of the CU is used to determine that a destination node of the configuration response is the CU) and sent to a next-hop node such as a DU. Then, the DU processes the T1AP message at a protocol layer of an F1 interface, and sends the processed T1AP message to the CU.

According to the configuration method provided in this embodiment of this application, the RAN device configures the routing configuration for the first device. In this way, the first device can determine a descendant node and a child node of the first device based on the configuration information, so that a data packet can be forwarded to a correct next-hop node in a data forwarding process, until the data packet is transferred the destination node.

Figure 14:
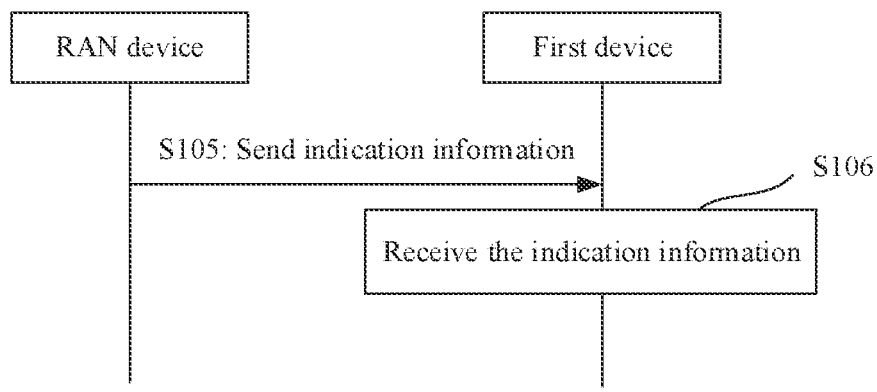
FIG. 14 is a second schematic flowchart of a configuration method according to an embodiment of this application.

Using an example in which the first device is the first wireless backhaul node, in another embodiment provided in this application, as shown in FIG. 14, the method provided in this embodiment of this application further includes the following steps.

S105: The RAN device sends indication information to the first device, where the indication information is used to indicate an automatic repeat request ARQ mode of the first device at a radio link control RLC layer.

Optionally, the indication information may be added by the RAN device to a T1AP message or an RRC message and sent to the first device.

Optionally, the indication information and the configuration information to be sent by the RAN device to the first device may be sent to the first device in a same message. In this way, a quantity of messages between the RAN device and the first device can be reduced.

In an IAB network, a transmission path between a DgNB (or a donor DU) and a terminal includes a plurality of air interface links. For an RLC acknowledged mode (acknowledge mode, AM), the following two working modes of the IAB node at the RLC layer may be used:

Mode 1: In a hop-by-hop (hop-by-hop) ARQ mode, a complete RLC layer function is configured for an RLC entity of each IAB node, an AM RLC entity on a receive side of the IAB node needs to have an RLC status report feedback function, and an AM RLC entity on a transmit side of the IAB node needs to re-send, to a next-hop receive end based on a received RLC status report, an RLC SDU or an RLC SDU segment that is not correctly received by a current receive end. For example, using an uplink as an example, a data packet 1 sent by the terminal to the DU needs to be transmitted through the IAB node 2. If the IAB node 2 does not correctly receive the data packet 1, the IAB node 2 sends an RLC status report to the terminal to notify the terminal that the data packet is not correctly received, to indicate the terminal to retransmit the data packet 1.

Mode 2: In an end-to-end (end-to-end) ARQ mode, some RLC layer functions are configured for an RLC entity of each IAB node; an AM RLC entity on a receive side of the IAB node does not need to have an RLC status report feedback function, and does not need to reassemble received RLC SDU segments, an AM RLC entity on a transmit side of the IAB node does not need to buffer a RLC SDU or an RLC SDU segment that is already sent, and the AM RLC entity on the transmit side of the IAB node may segment the RLC SDU or segment the RLC SDU segment according to an indication of a lower protocol layer (for example, a MAC layer), and add a new RLC header to each obtained RLC SDU segment, to form a new RLC PDU. An RLC status report only needs to be fed back between the UE and the DgNB/donor-DU, and correspondingly, an RLC SDU or an RLC SDU segment that is not correctly received by the DgNB/donor-DU or the UE is also retransmitted by an AM RLC entity on an RLC transmit side of the UE or the DgNB/donor-DU. For example, using an uplink as an example, the UE sends a data packet 1 to the DU, and the data packet 1 needs to be transmitted to the DU through the IAB node 2 and the IAB node 1. The UE segments the data packet 1 and then sends segments of the data packet 1 to the IAB node 2. If the IAB node 2 does not receive some segments of the data packet 1, the IAB node 2 does not send an RLC status report to the UE, but continues to send a remaining segment of the data packet 1 to the DU through the IAB node 1. The DU receives the segment of the data packet 1, and if determining that the complete and correct data packet 1 cannot be restored, the DU sends a retransmission message to the terminal, to indicate the terminal to retransmit the data packet 1 or the lost segments of the data packet 1.

Each terminal served by the IAB node has a transmission path including a plurality of air interface links to the DgNB (or the donor DU). Each transmission path is featured by 1: a quantity of air interface links; and 2: reliability of each air interface link. For different quantities and reliability of air interface links, different ARQ modes of the IAB node at the RLC layer may be configured. For example, when there are a relatively large quantity of air interface links (for example, the quantity of air interface links is greater than or equal to a threshold THN), the hop-by-hop ARQ mode is selected: or when there are a relatively small quantity of air interface links (for example, the quantity of air interface links is less than a threshold THN), the end-to-end ARQ mode is selected, or when link reliability is relatively high (for example, the link reliability is greater than or equal to a threshold THR, or a packet loss ratio on a link is less than or equal to a threshold THD), the end-to-end ARQ mode is selected; or when link reliability is relatively low (for example, the link reliability is less than a threshold THR, or a packet loss ratio on a link is greater than a threshold THD), the hop-by-hop ARQ mode is selected.

It can be learned from the foregoing descriptions that, in the IAB network, the IAB node at the RLC layer may work in the hop-by-hop ARQ mode or the end-to-end ARQ mode. A specific ARQ mode may be configured by the DgNB or the donor CU for the IAB node by using control plane information (for example, a T1AP message or an RRC message). Optionally, after it is determined that the IAB node in the IAB network uses the hop-by-hop ARQ mode or the end-to-end ARQ mode, the donor CU may configure the ARQ mode for the donor DU by using a control plane F1AP message, and the DgNB or the donor CU may further configure the ARQ mode for the terminal by using a control plane message (for example, an RRC message). For example, configuration information related to the ARQ mode may be identified by using 1-bit indication information. If the indication information is "0", it indicates that the end-to-end ARQ mode is used, or if the indication information is "1", it indicates that the hop-by-hop ARQ mode is used. The indication information may be configured for the IAB node after the IAB node accesses a network and sets up a T1 connection to the CU, or may be sent to the IAB node together with a context related configuration of the terminal in a network access procedure of the terminal.

Specifically, in this embodiment of this application, the indication information sent by the RAN device to the first device is specifically used to indicate that the ARQ mode of the first device at the RLC layer is either the hop-by-hop ARQ mode or the end-to-end ARQ mode.

S106: The first device receives the indication information sent by the RAN device.

Optionally, after S106, the first device may determine the automatic repeat request ARQ mode at the RLC layer based on the indication information. For example, if the indication information is used to indicate that the ARQ mode is the hop-by-hop ARQ mode, the first device may determine that the ARQ mode of the first device at the RLC layer is the hop-by-hop ARQ mode; or if the indication information is used to indicate that the ARQ mode is the end-to-end ARQ mode, the first device may determine that the ARQ mode of the first device at the RLC layer is the end-to-end ARQ mode.

Optionally, after S106, the method provided in this embodiment of this application further includes: sending, by the first device, response information to the RAN device. The response information is used to indicate, to the RAN device, a result of the ARQ mode configuration (for example, the configuration is completed, or the configuration is partially completed, or the configuration fails) of the first device at the RLC layer, and the response information may be carried in a T1AP message or an RRC message generated by the first device and sent to the RAN device.

For example, when the first device is the wireless backhaul node, the response information may be encapsulated in an F1AP message (where in this case, the T1AP message may carry the identifier of the first device and the identifier of the RAN device (the CU/donor node). Using an example in which the RAN device is the CU, the identifier of the first device herein is used to determine that a node that sends the configuration response is the first device, and an identifier of the CU is used to determine that a destination node of the configuration response is the CU) and sent to a next-hop node such as the DU. Then, the DU processes the T1AP message at a protocol layer of the F1 interface, and sends the processed T1AP message to the CU.

Optionally, in this embodiment of this application, after S106, the method may further include: sending, by the first device, a feedback message to the RAN device, where the feedback message is used to indicate that the first device has determined the ARQ mode of the first device at the RLC layer.

Figure 15:
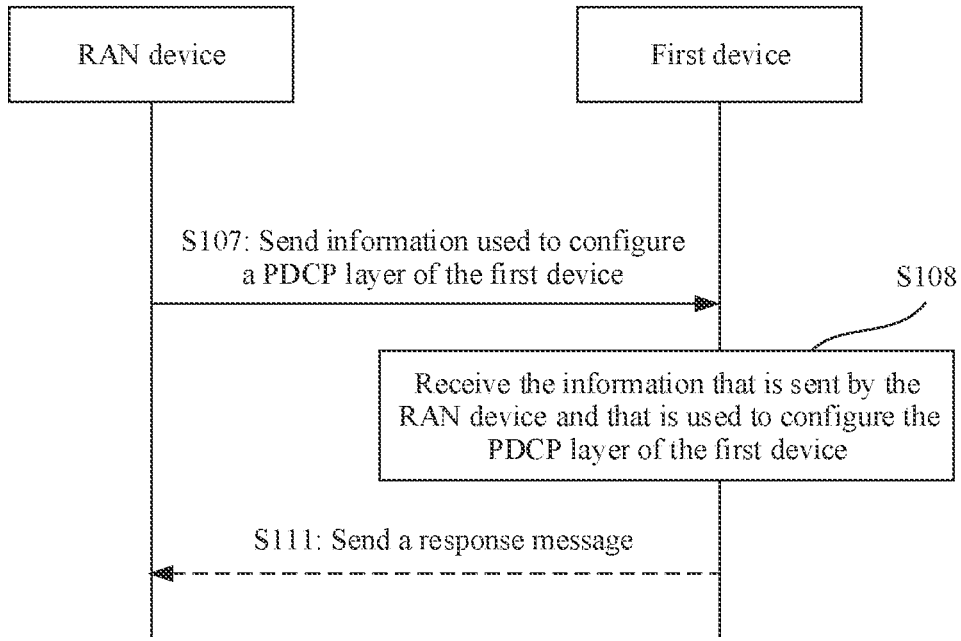
FIG. 15 is a third schematic flowchart of a configuration method according to an embodiment of this application.

Using an example in which the first device is the DU, as shown in FIG. 15, in still another embodiment of this application, the method provided in this embodiment of this application further includes the following steps:

S107: The RAN device sends, to the first device, information used to configure a PDCP layer of the first device, where the PDCP layer of the first device is a peer layer of a PDCP layer of the second wireless backhaul node that serves the terminal.

S108: The first device receives the information that is sent by the RAN device and that is used to configure the PDCP layer of the first device.

Optionally, the information used to configure the PDCP layer of the first device may be information corresponding to a security protection function of the PDCP layer. For example, the information used to configure the PDCP layer of the first device may include encryption/decryption function configuration information (for example, whether an encryption/decryption function is enabled, an encryption/decryption algorithm to be used, or a key required by an encryption algorithm), and integrity protection function configuration information (for example, whether an integrity protection function is enabled, an integrity protection algorithm, or an integrity check algorithm). The information used to configure the packet data convergence protocol PDCP layer of the first device may further include information corresponding to another function, for example, a header compression function, a packet replication function, or a reordering function, of the PDCP layer. This is not limited in this embodiment of this application.

Optionally, the information used to configure the PDCP layer of the first device may be limited to one or more specific radio bearers/RLC bearers/logical channels/RLC channels of the first device on an air interface, for example, limited to a radio bearer/an RLC bearer/a logical channel/an RLC channel that is used by the first device to send a T1AP message to the second wireless backhaul node that serves the terminal, or limited to a radio bearer/an RLC bearer/a logical channel/an RLC channel that is used by the first device to receive a T1AP message sent by the second wireless backhaul node that serves the terminal.

Optionally, after S108, the first device may determine security protection information of the PDCP layer of the first device, to provide necessary security protection for a PDCP SDU (for example, a T1AP message).

Figure 16:
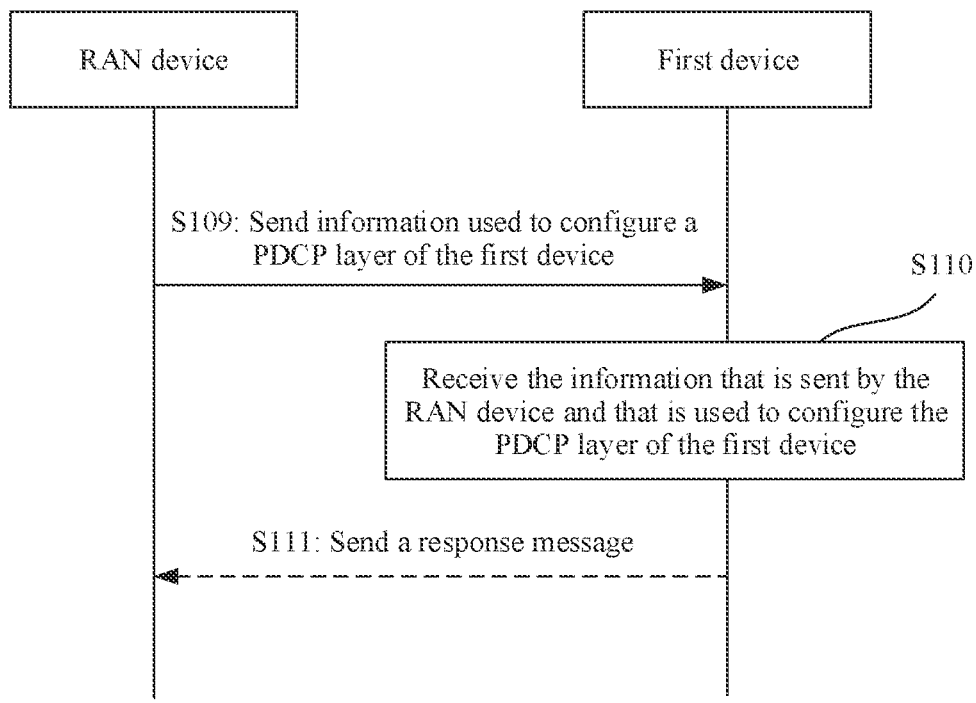
FIG. 16 is a fourth schematic flowchart of a configuration method according to an embodiment of this application.

Using an example in which the RAN device is the centralized unit CU of the donor node or the donor node, and the first device is the first wireless backhaul node, as shown in FIG. 16, in yet another embodiment of this application, the method provided in this embodiment of this application further includes the following steps.

S109: The RAN device sends, to the first device, information used to configure a PDCP layer of the first device, where the PDCP layer of the first device is a peer layer of a PDCP layer of the RAN device or is a peer layer of a PDCP layer of the DU of the donor node.

Optionally, the RAN device sends, to the first device by using a T1AP message or an RRC message, the information used to configure the PDCP layer of the first device.

S110: The first device receives the information that is sent by the RAN device and that is used to configure the PDCP layer of the first device, where the PDCP layer of the first device is the peer layer of the PDCP layer of the RAN device or is the peer layer of the PDCP layer of the DU of the donor node.

Optionally, the information used to configure the PDCP layer of the first device may be information corresponding to a security protection function of the PDCP layer. For example, the information used to configure the PDCP layer of the first device may include encryption/decryption function configuration information (for example, whether an encryption/decryption function is enabled, an encryption/decryption algorithm to be used, or a key required by an encryption algorithm), and integrity protection function configuration information (for example, whether an integrity protection function is enabled, an integrity protection algorithm, or an integrity check algorithm). The information used to configure the PDCP layer of the first device may further include information corresponding to another function, for example, a header compression function, a packet replication function, or a reordering function, of the PDCP layer. This is not limited in this embodiment of this application.

Optionally, the information used to configure the PDCP layer of the first device may be limited to one or more specific radio bearers/RLC bearers/logical channels/RLC channels of the first device on an air interface, for example, limited to a radio bearer/an RLC bearer/a logical channel/an RLC channel that is used by the first device to send a T1AP message to the RAN device or the DU of the donor node, or limited to a radio bearer/an RLC bearer/a logical channel/an RLC channel that is used by the first device to receive a T1AP message sent by the RAN device or the DU of the donor node.

Optionally, after S109, the method provided in this embodiment of this application further includes: The first device may determine security protection information of the PDCP layer of the first device, to provide necessary security protection for a PDCP SDU (for example, a T1AP message).

Optionally, after S110 and S108, the method provided in this embodiment of this application may further include the following step:

S111: The first device sends response information to the RAN device. The response information is used to indicate, to the RAN device, a result of the PDCP layer configuration (for example, the configuration is completed, or the configuration is partially completed, or the configuration fails) of the first device, and may be carried in a T1AP message or an RRC message generated by the first device and sent to the RAN device.

It should be noted that a phase 1 (S101 to S104), a phase 2 (S105 and S106), a phase 3 (S107 and S108), and a phase 4 (S109 to S111) in this embodiment of this application may be four independent phases. Certainly, any two or more of the four phases may be combined for execution. This is not limited in this embodiment of this application. It may be understood that when either the phase 3 or the phase 4 is independently performed, the first device already has the routing configuration. In this case, a manner of obtaining the routing configuration by the first device is not limited in this embodiment of this application. A manner in the phase 1 in this embodiment of this application may be used, or another manner may be used.

It may be understood that, when the foregoing four phases are combined for execution, information (for example, the configuration information, the indication information, and the information used to configure the PDCP layer) to be sent by the RAN device to the first device may be sent to the first device in a same message; or four messages are used to send the information to the first device; or any two or more pieces of information may be carried in a same message and sent to the first device. This is not limited in this embodiment of this application.

Figure 17:
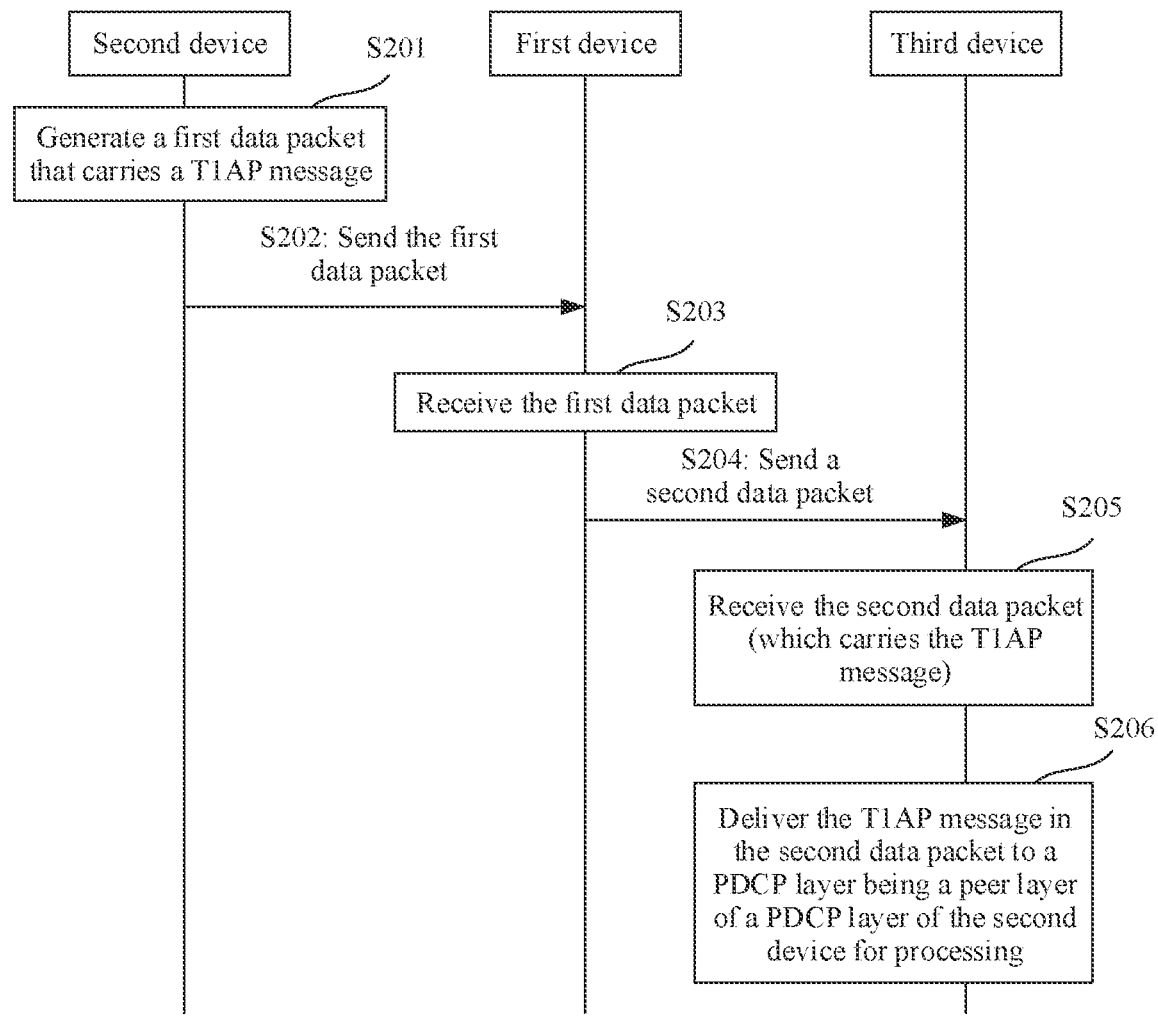
FIG. 17 is a schematic flowchart of an uplink data transmission method according to an embodiment of this application.

FIG. 17 shows an uplink data transmission method according to an embodiment of this application. The method includes the following steps.

S201: A second device generates a first data packet that carries a T1AP message.

For example, the second device may be the IAB node 2 shown in FIG. 6, or a chip in the IAB node 2 shown in FIG. 6.

Optionally, a message (payload) carried in the first data packet may be a T1AP message of the second device (where the T1AP message of the second device may include a control plane message of a child node of the second device, for example, an RRC message of a terminal device that accesses the second device), or an RRC message of the second device, or user plane data of the second device, or user plane data of the child node of the second device. The user plane data of the child node of the second device is user plane data of UE/an MT that accesses the second device (or that accesses a cell served by the second device). The UE/MT may be a terminal or a wireless backhaul node acting as a terminal.

In an example, when a T1 connection needs to be set up between the second device and a RAN device, the second device initiates a process of setting up the T1 connection to a CU. In this case, the T1AP message of the second device carries a T1 connection setup request (T1 setup request), and the first data packet is obtained after security protection processing is performed on the T1AP message at a PDCP layer and processing is performed on the T1AP message at a lower protocol layer.

In another example, in a process in which the terminal shown in FIG. 6 accesses the donor gNodeB through the second device (for example, the IAB node 2), the terminal may send an RRC message (for example, an RRC connection request message) to the second device. In this case, after receiving the RRC message from the terminal, the second device generates a T1AP message. The T1AP message includes a first identifier (for example, an IAB node 2 T1AP UE ID) allocated by the second device to the terminal, and the first data packet is obtained after security protection is performed on the T1AP message at a PDCP layer.

In still another example, when the second device accesses a network as a terminal through a first device, the second device sends an RRC message (for example, an RRC connection request message) to the first device. In this case, the first data packet carries the RRC message of the second device.

Optionally, if the first data packet carries a T1AP message of the second device or carries user plane data of a child node of the second device, the second device may further add, to an adaptation layer header of the first data packet, adaptation information used to route the first data packet (for example, the adaptation information includes an identifier of a source node, namely, an identifier of the second device, used to indicate a device that generates the first data packet; may further include an identifier of a node that generates a message carried in the first data packet, where for example, if the first data packet carries the user plane data of the child node of the second device, the information in the adaptation layer header of the first data packet further includes an identifier of the child node UE/MT of the second device; and may further include an identifier of a destination node, used to indicate a device to which the first data packet is to be transmitted, for example, further include an identifier of the RAN device).

Optionally, the second device may send the first data packet to the first device over a radio bearer (for example, a DRB or an SRB) on an interface between the second device and the first device or an RLC bearer/a logical channel/an RLC bearer corresponding to the radio bearer (for example, an RLC bearer/a logical channel/an RLC bearer corresponding to the DRB/SRB).

S202: The second device sends the first data packet to the first device, where the first data packet includes the identifier of the second device and first indication information, and the first indication information is used to indicate a type of a message carried in the first data packet, where the first device is a first wireless backhaul node in a plurality of wireless backhaul nodes on a transmission path, and the second device is a second wireless backhaul node in the plurality of wireless backhaul nodes on the transmission path; or the first device is a distributed unit DU of a donor node, and the second device is a second wireless backhaul node in at least one wireless backhaul node on a transmission path.

For example, the first device may be the IAB node 1 shown in FIG. 6, and the second device may be the IAB node 2 shown in FIG. 6.

Optionally, the first indication information is used to indicate that the type of the message carried in the first data packet may be any one of the following: a T1AP message (namely, a T1AP message of a wireless backhaul node, for example, a T1AP message of the second device), an RRC message of the second device, user plane data of the second device, and user plane data of a child node of the second device.

Optionally, the first indication information may be carried in header information added at an adaptation layer, an RLC layer, or a MAC layer. For example, the following plurality of cases may be included:

Example 1: If the second device uses a same SRB (or an RLC bearer/a logical channel/an RLC channel corresponding to the SRB) to carry (send/receive) the T1AP message of the second device and the RRC message of the second device, the first indication information may be carried in the header information added at the RLC layer, the first indication information has at least two possible values, and two of the values indicate that the type of the message carried in the first data packet is the T1AP message and the RRC message of the second device.

Example 2: If the second device uses a same DRB (or an RLC bearer/a logical channel/an RLC channel corresponding to the DRB) to carry (send/receive) the T1AP message of the second device and the user plane data of the child node of the second device, the first indication information may be carried in the header information added at the adaptation layer, the first indication information has at least two possible values, and two of the values indicate that the type of the message carried in the first data packet is the T1AP message, and the user plane data of the child node of the second device.

Example 3: If the second device uses a same DRB (or an RLC bearer/a logical channel/an RLC channel corresponding to the DRB) to carry (send/receive) the T1AP message of the second device, the user plane data of the second device, and the user plane data of the child node of the second device, the first indication information may be carried in the header information added at the RLC layer, the first indication information has at least three possible values, and three of the values correspondingly indicate that the type of the message carried in the first data packet is the T1AP message, the user plane data of the second device, and the user plane data of the child node of the second device.

Example 4: If the second device uses a same DRB (or an RLC bearer/a logical channel/an RLC channel corresponding to the DRB) to carry (send/receive) the user plane data of the second device and the user plane data of the child node of the second device, the first indication information may be carried in the header information added at the RLC layer, the first indication information has at least two possible values, and two of the values correspondingly indicate that the type of the message carried in the first data packet is the user plane data of the second device and the user plane data of the child node of the second device.

Example 5: If the second device uses a dedicated radio bearer (a DRB/an SRB, or an RLC bearer/a logical channel/an RLC channel corresponding to the dedicated DRB/SRB) to carry (send/receive) the T1AP message of the second device, the first indication information may be an identifier of the dedicated radio bearer or an identifier of the RLC bearer/RLC channel corresponding to the dedicated radio bearer, where the identifier is carried in the header information added at the adaptation layer, or the first indication information may be an identifier LCID of the logical channel corresponding to the dedicated radio bearer, where the identifier is carried in the header information added at the MAC layer.

S203: The first device receives the first data packet sent by the second device.

For example, on the one hand, the first device may directly receive the first data packet sent by the second device. In this case, the second device is a child node of the first device. For example, in FIG. 6, the first device is the IAB node 1 and the second device is the IAB node 2. On the other hand, the first device may alternatively receive the first data packet through an intermediate node between the first device and the second device.

It may be understood that, when the second device is not the child node of the first device, the first data packet received by the first device is a data packet that carries the T1AP message and that is forwarded by the intermediate node between the first device and the second device.

S204: The first device sends, to a third device, a second data packet that carries the T1AP message, where the second data packet includes the identifier of the second device and second indication information, and the second indication information is used to indicate a type of a message carried in the second data packet.

Optionally, the second data packet may further carry a T1AP message of the first device that is generated after the first device receives the first data packet. The first data packet is encapsulated in the T1AP message of the first device.

For example, the first device is the first wireless backhaul node of the plurality of wireless backhaul nodes on the transmission path, the second device is the second wireless backhaul node in the plurality of wireless backhaul nodes on the transmission path, and the third device is a CU or a DU that is of a donor node and that has a T1AP layer being a peer layer of a T1AP layer of the second device, or a donor node. For another example, the first device is the distributed unit DU of the donor node, the second device is the second wireless backhaul node in the at least one wireless backhaul node on the transmission path, and the third device is a centralized unit CU that is of the donor node and that has a T1AP layer being a peer layer of a T1AP layer of the second device. Optionally, the third device has the T1AP layer being the peer layer of the T1AP layer of the second device.

Optionally, a message (payload) carried in the second data packet is the message (payload) carried in the first data packet.

For example, the first device may be the IAB node 1 shown in FIG. 6, the second device may be the IAB node 2 shown in FIG. 6, and the third device may be the DgNB shown in FIG. 6.

Optionally, the second indication information is used to indicate that the type of the message carried in the second data packet may be any one of the following: a T1AP message (namely, a T1AP message of a wireless backhaul node, for example, a T1AP message of the first device or a child node of the first device), an RRC message of the first device, user plane data of the first device, and user plane data of a child node of the first device or a descendant child node of the first device. The user plane data of the descendant child node of the first device is user plane data of UE/an MT that is connected to the first device through n (n>2) air interface links. The UE/MT may be a terminal device, or a wireless backhaul node acting as a terminal.

Optionally, if the first device is the wireless backhaul node, the identifier of the second device may be carried in the header information added at the adaptation layer, and the second indication information may be carried in the header information added at the adaptation layer, the RLC layer, or the MAC layer. For example, the following plurality of cases may be included:

Example 1: If the first device uses a same SRB (or an RLC bearer/a logical channel/an RLC channel corresponding to the SRB) to carry (send/receive) the T1AP message and the RRC message of the first device, the second indication information may be carried in the header information added at the RLC layer, the second indication information has at least two possible values, and two of the values indicate that the type of the message carried in the second data packet is the T1AP message and the RRC message of the first device.

Example 2: If the first device uses a same DRB (or an RLC bearer/a logical channel/an RLC channel corresponding to the DRB) to carry (send/receive) the T1AP message and the user plane data of the child node of the first device or the descendant child node of the first device, the second indication information may be carried in the header information added at the adaptation layer, the second indication information has at least two possible values, and two of the values indicate that the type of the message carried in the second data packet is the T1AP message, and the user plane data of the child node of the first device or the descendant child node of the first device.

Example 3: If the first device uses a same DRB (or an RLC bearer/a logical channel/an RLC channel corresponding to the DRB) to carry (send/receive) the T1AP message, the user plane data of the first device, and the user plane data of the child node of the first device or the descendant child node of the first device, the second indication information may be carried in the header information added at the RLC layer, the second indication information has at least three possible values, and three of the values correspondingly indicate that the type of the message carried in the second data packet is the T1AP message, the user plane data of the first device, and the user plane data of the child node of the first device or the descendant child node of the first device.

Example 4: If the first device uses a same DRB (or an RLC bearer/a logical channel/an RLC channel corresponding to the DRB) to carry (send/receive) the user plane data of the first device and the user plane data of the child node of the first device or the descendant child node of the first device, the second indication information may be carried in the header information added at the RLC layer, the second indication information has at least two possible values, and two of the values correspondingly indicate that the type of the message carried in the second data packet is the user plane data of the first device and the user plane data of the child node of the first device or the descendant child node of the first device.

Example 5: If the first device uses a dedicated radio bearer (a DRB/an SRB, or an RLC bearer/a logical channel/an RLC channel corresponding to the dedicated DRB/SRB) to carry (send/receive) the T1AP message, the second indication information may be an identifier of the dedicated radio bearer or an identifier of the RLC bearer/RLC channel corresponding to the dedicated radio bearer, where the identifier is carried in the header information added at the adaptation layer, or the second indication information may be an identifier LCID of the logical channel corresponding to the dedicated radio bearer, where the identifier is carried in the header information added at the MAC layer.

Optionally, if the first device is the DU of the donor node, the identifier of the second device and the second indication information may be carried in header information added at a protocol layer (for example, an F1AP layer, an SCTP layer, an IP layer, an L2 layer, or an L1 layer; or a GTP layer, a UDP layer, an IP layer, an L2 layer, or an L layer; or an adaptation layer) of an F1 interface between the DU and the CU. For example, the following plurality of cases may be included:

Example 6: If the first device sends the second data packet to the third device through a user plane of the F1 interface, the identifier of the second device may be carried in an extension header field at the GTP layer or may be represented by using a TEID that is at the GTP layer and that corresponds to the second device, and the second indication information is carried in the extension header field at the GTP layer.

Example 7 If the first device sends the second data packet to the third device through a control plane of the F1 interface, the identifier of the second device may be carried in an F1AP message generated by the first device, and the second indication information may further be carried in the F1AP message of the first device. Alternatively, a specific type of F1AP message may be defined, and a special message type field is used to indicate that the F1AP message carries an uplink T1AP message of the wireless backhaul node. A special message type is the second indication information.

Example 8: If the F1 interface between the first device and the third device has peer adaptation layers, the identifier of the second device and the second indication information may alternatively be carried in the header information added to the adaptation layer.

S205: The third device receives the second data packet sent by the first device.

S206: The third device delivers the message (payload) carried in the second data packet to a protocol layer being a peer layer of a protocol layer of a node that generates the message (payload) for receiving processing.

For example, if the third device determines, based on the identifier of the second device and the second indication information that are carried in the second data packet, that the message carried in the second data packet is a T1AP message of the second device, the third device delivers the T1AP message to the T1AP layer being the peer layer of the T1AP layer of the second device for receiving processing.

Optionally, before S204, the method provided in this embodiment of this application further includes: determining, by the first device, the type of the message carried in the first data packet.

For example, when the type of the message carried in the first data packet is the T1AP message, in a possible implementation, that the first device determines that the type of the message carried in the first data packet is the T1AP message may be implemented in the following manner: If the first device determines that the first indication information is used to indicate that the type of the message carried in the first data packet is the T1AP message, the first device determines that the type of the message carried in the first data packet is the T1AP message. In another possible implementation, that the first device determines that the type of the message carried in the first data packet is the T1AP message may be implemented in the following manner: If the first data packet receives the first data packet over a dedicated radio bearer (or an RLC bearer/a logical channel/ an RLC channel corresponding to the dedicated radio bearer), the first device determines that the type of the message carried in the first data packet is the T1AP message.

It may be understood that, after S206, an example in which the T1AP message sent by the second device includes an RRC message of the second device is used. After receiving the second data packet that carries the T1AP message, the first device parses the second data packet to obtain the T1AP message. After performing security processing on the T1AP message at a PDCP layer being a peer layer of a PDCP layer of the third device, the first device performs receiving processing on the processed T1AP message at the F1AP layer being the peer layer of the F1AP layer of the third device, and then sends the T1AP message to the third device by using an F1AP message. Then, the third device parses the F1AP message sent by the first device to obtain the T1AP message, and further parses the T1AP message to obtain the RRC message carried in the T1AP message. The third device may determine, based on the identifier of second device in routing information, that the RRC message is from the second device, and perform access control.

Figure 18:
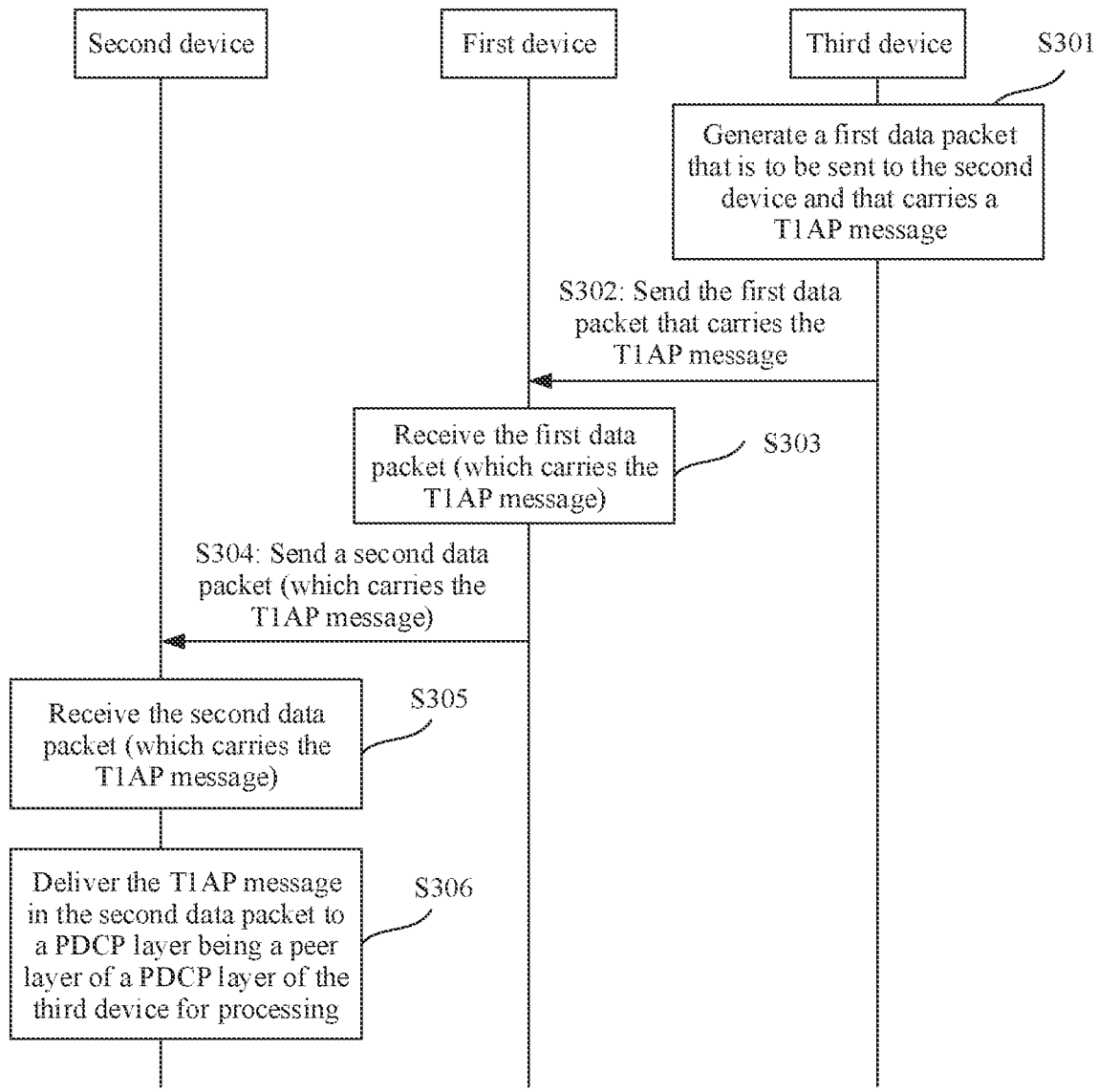
FIG. 18 is a schematic flowchart of a downlink data transmission method according to an embodiment of this application.

In another embodiment of this application, FIG. 18 shows a downlink data transmission method according to an embodiment of this application. The method includes the following steps.

S301: A third device generates a first data packet.

For example, the third device may be the donor gNodeB shown in FIG. 6 or a chip applied to the donor gNodeB: or may be a CU of the donor gNodeB, or a chip applied to the CU of the donor gNodeB.

Optionally, a message (payload) carried in the first data packet may be a T1AP message to be sent to a second device (where the T1AP message of the second device may include a response message for a control plane message of a child node of the second device, for example, a response message for an RRC message of a terminal that accesses the second device); or an RRC message to be sent to the second device (for example, an RRC Connection Setup message to be sent to the second device); or user plane data to be sent to the second device: or user plane data to be sent to a child node of the second device. The user plane data to be sent to the child node of the second device is user plane data of UE that accesses the second device (or that accesses a cell served by the second device). The UE may be a terminal or a wireless backhaul node acting as a terminal.

For example, the second device sends an RRC connection request message to the third device through a first device. After the third device allows access of the second device, the third device generates a T1AP message to be sent to the first device. The T1AP message to be sent to the first device includes a payload 1 (where the payload 1 includes the RRC message to be sent to the second device (where the RRC message herein is a response message, for example, an RRC Connection Setup message for an RRC message sent by the second device)). The third device may process, at a PDCP layer being a peer layer of a PDCP layer of the second device, the T1AP message to be sent to the second device. The T1AP message processed at the PDCP layer is considered as a payload 2 and is carried in the first data packet.

Optionally, if the first data packet carries the T1AP message of the second device or carries the user plane data of the child node of the second device, the third device may further add, to the first data packet, adaptation information used to route the first data packet (for example, the adaptation information used to route the first data packet includes an identifier of a source node, namely, an identifier of the third device, used to indicate a device that generates the first data packet; the adaptation information used to route the first data packet may further include an identifier of a destination node of the message carried in the first data packet, for example, if the first data packet carries the user plane data of the child node of the second device, the information in the adaptation layer header of the first data packet further includes an identifier of the child node UE of the second device; and the adaptation information used to route the first data packet may further include an identifier of a destination node of the T1AP message, used to indicate a device to which the first data packet is to be transmitted, for example, further include an identifier of the second device).

S302: The third device sends the first data packet to the first device. The first data packet carries the identifier of the second device and first indication information.

The first indication information is used to indicate a type of a message carried in the first data packet.

The first device is a first wireless backhaul node in a plurality of wireless backhaul nodes on a transmission path, the second device is a second wireless backhaul node in the plurality of wireless backhaul nodes on the transmission path, and the third device is a DU that is of a donor node and that has a T1AP layer being a peer layer of a T1AP layer of the second device, or a donor node. Alternatively, the first device is a DU of a donor node, the second device is a second wireless backhaul node in at least one wireless backhaul node on a transmission path, and the third device is a CU that is of the donor node and that has a T1AP layer being a peer layer of a T1AP layer of the second device.

For example, the first device may be the IAB node 1 shown in FIG. 6 or a chip applied to the IAB node 1.

Optionally, the first indication information is used to indicate that the type of the message carried in the first data packet may be any one of the following: a T1AP message (namely, a T1AP message of a wireless backhaul node, for example, a T1AP message of the first device or the second device), an RRC message of the first device, user plane data of the first device, and user plane data of a child node of the first device.

Optionally, if the first device is the wireless backhaul node, the identifier of the second device may be carried in header information added at an adaptation layer, and the first indication information may be carried in header information added at the adaptation layer, an RLC layer, or a MAC layer. For example, the following plurality of cases may be included.

Example 1: If the third device uses a same SRB (or an RLC bearer/a logical channel/an RLC channel corresponding to the SRB) to carry (send/receive) the T1AP message of the second device and the RRC message of the first device, the first indication information may be carried in the header information added at the RLC layer, the first indication information has at least two possible values, and two of the values indicate that the type of the message carried in the first data packet is the T1AP message, and the RRC message of the first device.

Example 2: If the third device uses a same DRB (or an RLC bearer/a logical channel/an RLC channel corresponding to the DRB) to carry (send/receive) the T1AP message and the user plane data of the child node of the first device, the first indication information may be carried in the header information added at the adaptation layer, the first indication information has at least two possible values, and two of the values indicate that the type of the message carried in the first data packet is the T1AP message, and the user plane data of the child node of the first device.

Example 3: If the third device uses a same DRB (or an RLC bearer/a logical channel/an RLC channel corresponding to the DRB) to carry (send/receive) the T1AP message, the user plane data of the first device, and the user plane data of the child node of the first device, the first indication information may be carried in the header information added at the RLC layer, the first indication information has at least three possible values, and three of the values correspondingly indicate that the type of the message carried in the first data packet is the T1AP message, the user plane data of the first device, and the user plane data of the child node of the first device.

Example 4: If the third device uses a same DRB (or an RLC bearer/a logical channel/an RLC channel corresponding to the DRB) to carry (send/receive) the user plane data of the first device and the user plane data of the child node of the first device, the first indication information may be carried in the header information added at the RLC layer, the first indication information has at least two possible values, and two of the values correspondingly indicate that the type of the message carried in the first data packet is the user plane data of the first device and the user plane data of the child node of the first device.

Example 5: If the third device uses a dedicated radio bearer (a DRB/an SRB, or an RLC bearer/a logical channel/ an RLC channel corresponding to the dedicated DRB/SRB) to carry (send/receive) the T1AP message, the first indication information may be an identifier of the dedicated radio bearer or an identifier of the RLC bearer/RLC channel corresponding to the dedicated radio bearer, where the identifier is carried in the header information added at the adaptation layer, or the first indication information may be an identifier LCID of the logical channel corresponding to the dedicated radio bearer, where the identifier is carried in the header information added at the MAC layer.

Optionally, if the third device is the CU and the first device is the DU of the donor node, the identifier of the second device and the second indication information may be carried in header information added at a protocol layer (for example, an F1AP layer, an SCTP layer, an IP layer, an L2 layer, or an L1 layer: or a GTP layer, a UDP layer, an IP layer, an L2 layer, or an L1 layer; or an adaptation layer) of an F1 interface between the DU and the CU. For example, the following plurality of cases may be included:

Example 6: If the third device sends the first data packet to the first device through a user plane of the F1 interface, the identifier of the second device may be carried in an extension header field at the GTP layer or may be represented by using a TEID that is at the GTP layer and that corresponds to the second device, and the first indication information is carried in the extension header field at the GTP layer.

Example 7: If the third device sends the first data packet to the first device through a control plane of the F1 interface, the identifier of the second device may be carried in an F1AP message generated by the first device, and the first indication information may further be carried in the F1AP message of the first device. Alternatively, a specific type of F1AP message may be defined, and a special message type field is used to indicate that the F1AP message carries an uplink T1AP message of the wireless backhaul node. A special message type is the first indication information.

Example 8: If the F1 interface between the third device and the first device has peer adaptation layers, the identifier of the second device and the first indication information may further be carried in the header information added at the adaptation layer. Alternatively, the identifier of the second device is in the header information added at the adaptation layer, and the first indication information is carried in processing at another protocol layer (for example, the F1AP layer or the GTP layer) of the F1 interface.

S303: The first device receives the first data packet sent by the third device.

For example, the first device may directly receive the first data packet sent by the third device. In this case, the first device is a child node of the third device. For example, the third device is the CU, and the first device may be the DU. The DU obtains the payload 2 from the F1AP message through parsing based on the type of the F1AP message. The DU adds the adaptation information in the F1AP message to the adaptation information other than the payload 2.

For another example, the third device may be the DU, and the first device may be the IAB node 1 shown in FIG. 6.

For example, the first device may directly receive the first data packet sent by the third device. In this case, the first device is a descendant child node of the third device. The third device is the CU, and for example, the first device may be the IAB node 1 shown in FIG. 6.

S304: The first device sends a second data packet to the second device. The second data packet includes the identifier of the second device and second indication information, and the second indication information is used to indicate a type of a message carried in the second data packet.

Specifically, for a manner in which the first device sends the second data packet to the second device, refer to the process in which the second device sends the first data packet to the first device in the foregoing embodiment. Details are not described herein again in this embodiment of this application.

Optionally, the second indication information is used to indicate that the type of the message carried in the second data packet may be any one of the following: a T1AP message (namely, a T1AP message of a wireless backhaul node, for example, a T1AP message of the second device), an RRC message of the second device, user plane data of the second device, and user plane data of a child node of the second device or a descendant child node of the second device.

Optionally, the identifier of the second device may be carried in the header information added at the adaptation layer, and the second indication information may be carried in the header information added at the adaptation layer, the RLC layer, or the MAC layer. For example, there may be the following plurality of cases for a manner of carrying the second indication information:

Example 1: If the first device uses a same SRB (or an RLC bearer/a logical channel/an RLC channel corresponding to the SRB) to carry (send/receive) the T1AP message of the second device and the RRC message of the second device, the second indication information may be carried in the header information added at the RLC layer, the second indication information has at least two possible values, and two of the values indicate that the type of the message carried in the second data packet is the T1AP message and the RRC message of the second device.

Example 2: If the first device uses a same DRB (or an RLC bearer/a logical channel/an RLC channel corresponding to the DRB) to carry (send/receive) the T1AP message of the second device and the user plane data of the child node of the second device, the second indication information may be carried in the header information added at the adaptation layer, the second indication information has at least two possible values, and two of the values indicate that the type of the message carried in the second data packet is the T1AP message, and the user plane data of the child node of the second device.

Example 3: if the second device uses a same DRB (or an RLC bearer/a logical channel/an RLC channel corresponding to the DRB) to carry (send/receive) the T1AP message of the second device, the user plane data of the second device, and the user plane data of the child node of the second device, the second indication information may be carried in the header information added at the RLC layer, the second indication information has at least three possible values, and three of the values correspondingly indicate that the type of the message carried in the second data packet is the T1AP message, the user plane data of the second device, and the user plane data of the child node of the second device.

Example 4: If the first device uses a same DRB (or an RLC bearer/a logical channel/an RLC channel corresponding to the DRB) to carry (send/receive) the user plane data of the second device and the user plane data of the child node of the second device, the second indication information may be carried in the header information added at the RLC layer, the second indication information has at least two possible values, and two of the values correspondingly indicate that the type of the message carried in the second data packet is the user plane data of the second device and the user plane data of the child node of the second device.

Example 5: If the first device uses a dedicated radio bearer (a DRB/an SRB, or an RLC bearer/a logical channel/an RLC channel corresponding to the dedicated DRB/SRB) to carry (send/receive) the T1AP message of the second device, the second indication information may be an identifier of the dedicated radio bearer or an identifier of the RLC bearer/RLC channel corresponding to the dedicated radio bearer, where the identifier is carried in the header information that is included in the second data packet and that is added at the adaptation layer, or the second indication information may be an identifier LCID of the logical channel corresponding to the dedicated radio bearer, where the identifier is carried in the header information added at the MAC layer.

For example, after receiving the F1AP message, the first device extracts the T1AP message from the F1AP message, and further extracts, from the T1AP message, the payload 1 (namely, a part into which the RRC message sent by the CU to the IAB node 2 is encapsulated) and an identifier that is included in the T1AP message and that is allocated by the first device to the second device on a T1 connection between the second device and the third device, to determine that the payload 1 needs to be sent to the second device.

S305: The second device receives the second data packet sent by the first device.

S306: The second device delivers the message (payload) carried in the second data packet to a protocol layer being a peer layer of a protocol layer of a node that generates the message (payload) for receiving processing.

For example, if the second device determines, based on the identifier of the second device and the second indication information that are carried in the second data packet, that the message carried in the second data packet is the T1AP message of the second device, the second device delivers the T1AP message to the T1AP layer being the peer layer of the T1AP layer of the third device for receiving processing.

Optionally, before S304, the method provided in this embodiment of this application further includes: determining, by the first device, the type of the message carried in the first data packet. Specifically, for a manner of determining, by the first device, the type of the message carried in the first data packet, refer to the solution described in the foregoing uplink data transmission process. Details are not described herein again in this embodiment of this application.

Figure 19A:
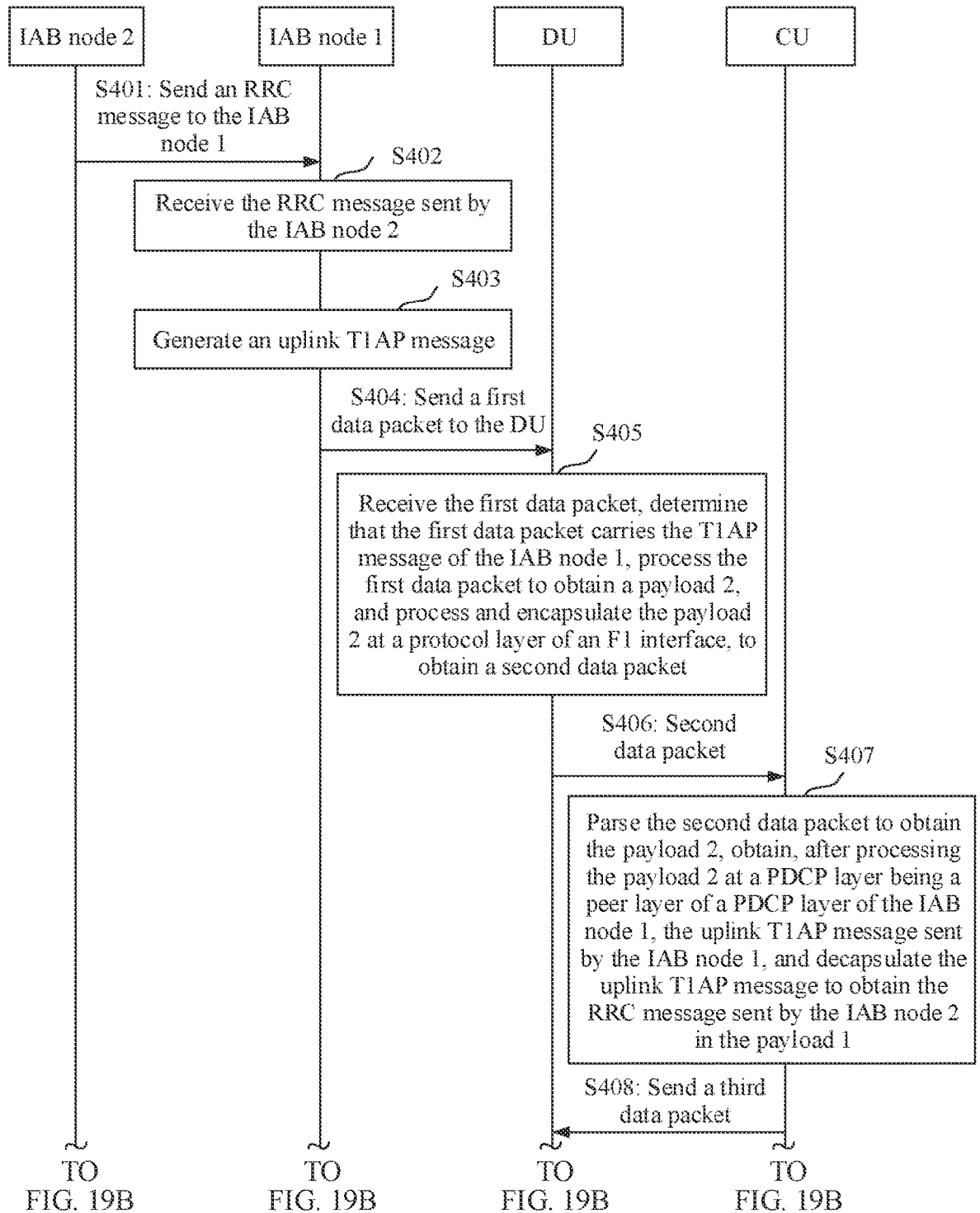
FIG. 19A, FIG. 19B, and FIG. 19C are a first schematic flowchart of a communication method according to an embodiment of this application.
Figure 19B:
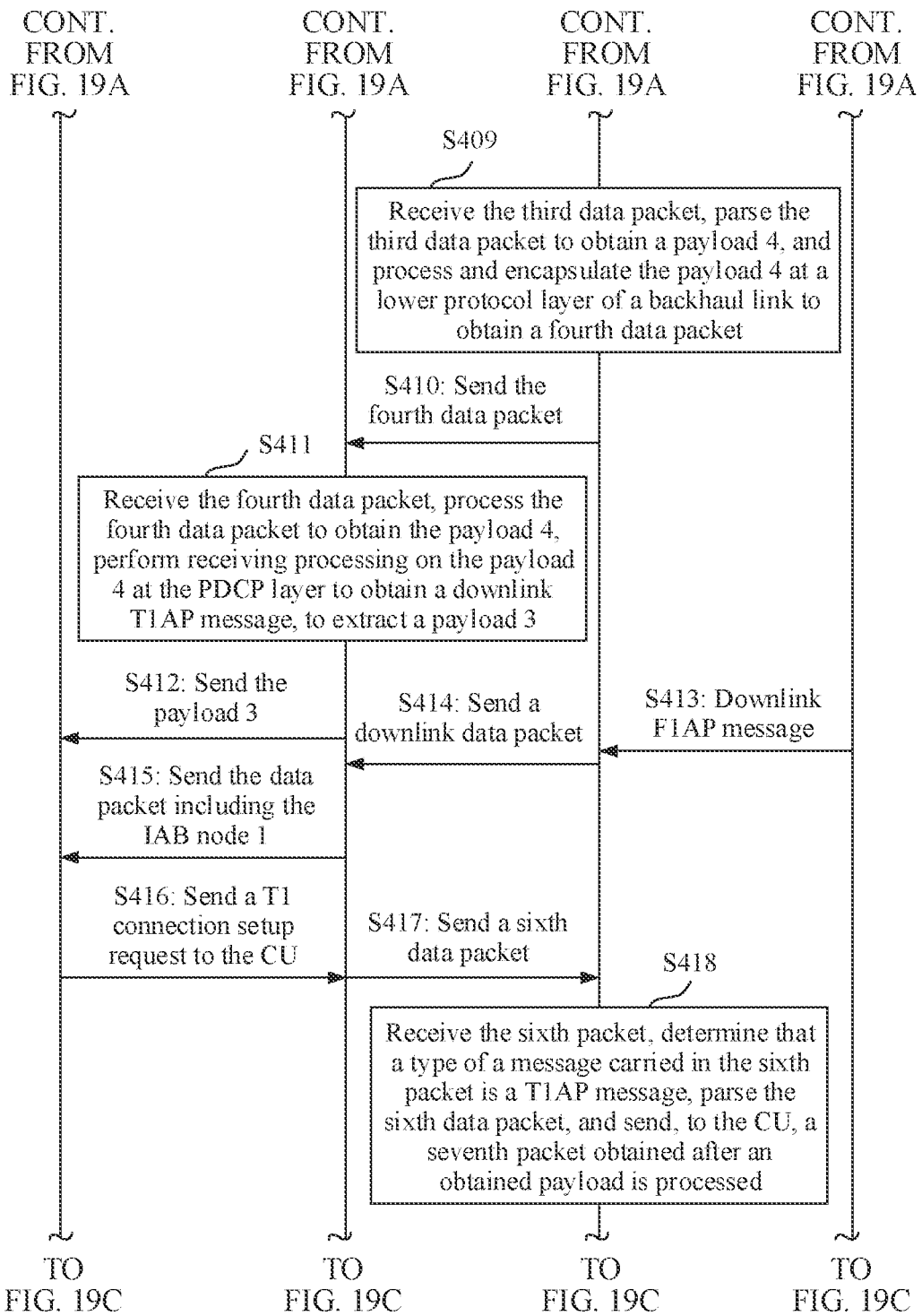
Figure 19C:
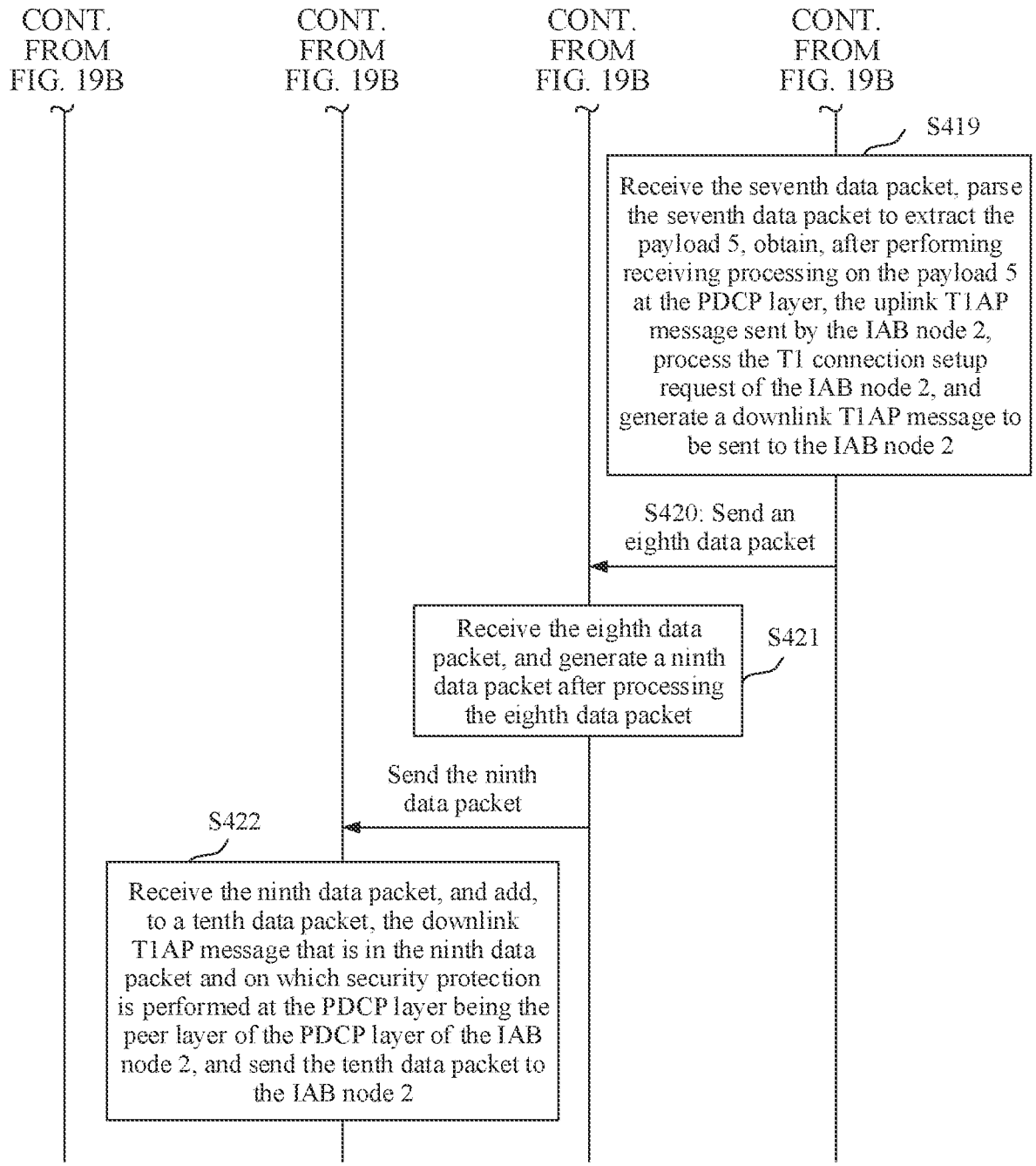

In the following embodiment, an example in which an IAB node 2 accesses a network based on the network topology shown in FIG. 6 and the protocol stack architectures shown in FIG. 9 to FIG. 12 is used to describe a network access procedure of an IAB node and a process in which a CU configures an adaptation layer of an IAB node 1 and an adaptation layer of a DU. As shown in FIG. 19A, FIG. 19B, and FIG. 19C. A method provided in this application includes the following steps.

S401: The IAB node 2 sends an RRC message to the IAB node 1.

For example, the RRC message may be an RRC connection setup request message.

S402: The IAB node 1 receives the RRC message sent by the IAB node 2.

S403: The IAB node 1 generates an uplink T1AP message, where the uplink T1AP message includes a payload (payload 1), and the payload 1 includes the RRC message of the IAB node 2.

Optionally, a message type of the uplink T1AP message into which an RRC message of a child node of the IAB node 1 is encapsulated may be, for example, uplink RRC transfer (UL RRC transfer) or initial uplink RRC transfer (initial UL RRC transfer).

Optionally, the uplink T1AP message includes a first identifier, for example, an IAB node T1AP IAB node 2 ID, allocated by the IAB node 1 to the IAB node 2 on a T1 connection between the IAB node 1 and the CU.

Optionally, the uplink T1AP message includes the first identifier (for example, an IAB node 1 T1AP IAB node 2 ID) allocated by the IAB node 1 to the IAB node 2, and the first identifier is used to identify the IAB node 2 on a T1 interface between the IAB node 1 and the CU. After processing (for example, performing encryption and integrity protection) on the uplink T1AP message at a PDCP layer, the IAB node 1 obtains a payload 2 (payload 2), and then delivers the payload 2 to the adaptation layer to add adaptation layer header information. The adaptation layer header information includes routing information. The routing information includes, for example, an identifier of the IAB node 1 and an identifier of the CU. The identifier of the IAB node 1 is used to indicate that a source node of the uplink T1AP message is the IAB node 1. The identifier of the CU is used to indicate that a destination node of the uplink T1AP message is the CU. S404: The IAB node 1 sends a first data packet to the DU over an SRB, where the first data packet carries the payload 2 of the uplink T1AP message.

The first data packet further includes the identifier of the IAB node 1. Optionally, the first data packet further includes the identifier of the CU.

The first data packet further includes first indication information, and the first indication information is used to indicate that a type of a message carried in the data packet is a T1AP message. A manner in which the first data packet carries the first indication information may be one of the following manners: Manner example 1: If the IAB node 1 uses a same SRB (or an RLC bearer/a logical channel/an RLC channel corresponding to the SRB) to carry (send/receive) a T1AP message and an RRC message of the IAB node 1, the first indication information may be carried in header information that is of the first data packet and that is added at an RLC layer.

Manner example 2: If the IAB node 1 uses a same DRB (or an RLC bearer/a logical channel/an RLC channel corresponding to the DRB) to carry (send/receive) a T1AP message and user plane data of a child node of the IAB node 1, the first indication information may be carried in header information that is of the first data packet and that is added at the adaptation layer.

Manner example 3: If the IAB node 1 uses a same DRB (or an RLC bearer/a logical channel/an RLC channel corresponding to the DRB) to carry (send/receive) a T1AP message, user plane data of the IAB node 1, and user plane data of a child node of the IAB node 1, the first indication information may be carried in header information that is of the first data packet and that is added at an RLC layer.

Manner example 4: If the IAB node 1 uses a dedicated radio bearer (a DRB/an SRB, or an RLC bearer/a logical channel/an RLC channel corresponding to the dedicated DRB/SRB) to carry (send/receive) a T1AP message, the first indication information may be an identifier of the dedicated radio bearer or an identifier of the RLC bearer/RLC channel corresponding to the dedicated radio bearer, where the identifier is carried in header information that is of the first data packet and that is added at the adaptation layer, or the first indication information may be an identifier LCID of the logical channel corresponding to the dedicated radio bearer, where the identifier is carried in header information that is of the first data packet and that is added at a MAC layer.

S404: The IAB node 1 sends the first data packet to the DU.

S405: The DU receives the first data packet sent by the IAB node 1, and determines, based on the identifier of the IAB node 1 and the first indication information that are carried in the first data packet, that the first data packet carries the T1AP message of the IAB node 1. Then, the DU processes the first data packet to obtain the payload 2, and processes and encapsulates the payload 2 at a protocol layer of an F1 interface, to obtain a second data packet. The DU may process and encapsulate the payload 2 at the protocol layer of the F1 interface in one of the following possible manners:

Manner option 1: Using the protocol stack architecture shown in FIG. 11 as an example, a control plane of the F1 interface includes an F1AP layer, an SCTP layer, an IP layer, an L2 layer, and an L1 layer. The DU generates, through processing at the F1AP layer, an uplink F1AP message to be sent to the CU, where the uplink F1AP message carries the payload 2, the identifier of the IAB node 1, and second indication information, and the second indication information is used to indicate that the F1AP message carries a T1AP message of a wireless backhaul node. For example, the uplink F1AP message that is generated by the DU and into which the payload 2 is encapsulated may be a newly defined uplink F1AP message type (for example, the newly defined uplink F1AP message type may be uplink IAB T1AP transfer (UL IAB T1AP transfer)), and is used to carry an uplink T1AP message of an IAB node, and content filled in a message type (message type) field included in the F1AP message is the second indication information. Optionally, the uplink F1AP message that is generated by the DU and that is to be sent to the CU may further carry the identifier of the CU. Optionally, the second indication information and the identifier of the IAB node 1 may further be carried in header information of another protocol layer (a protocol layer other than the F1AP layer) of the F1 interface.

Manner option 2: Using the protocol stack architecture shown in FIG. 11 as an example, a user plane of the F1 interface includes a GTP layer, a UDP layer, an IP layer, an L2 layer, and an L1 layer. The DU generates, through processing at the GTP layer, an uplink GTP PDU to be sent to the CU. The uplink GTP PDU carries the payload 2. Second indication information may further be carried in the GTP PDU (for example, the second indication information is carried in a GTP extension header field), and the second indication information is used to indicate that the GTP PDU carries a T1AP message of a wireless backhaul node. The GTP PDU may further carry the identifier of the IAB node 1 (for example, the identifier of the IAB node 1 is carried in the GTP extension header field). Alternatively, if a TEID in a GTP header field is uniquely mapped to a DRB of the IAB node 1, the identifier of the IAB node 1 does not need to be additionally carried in the GTP PDU, that is, the IAB node 1 can be represented by using the TEID. Optionally, in the uplink GTP PDU that is generated by the DU and that is to be sent to the CU, the identifier of the CU may further be carried in, for example, the GTP extension header field. Optionally, the second indication information and the identifier of the IAB node 1 may further be carried in header information of another protocol layer (a protocol layer other than the GTP layer) of the F1 interface.

Manner option 3: Using the protocol stack architecture shown in FIG. 12 as an example, because the DU serves as a proxy node of a control plane message between the IAB node and the CU, the DU needs to perform conversion between a T1AP message and an F1AP message. In this architecture, the DU first performs receiving processing (for example, decryption and integrity check) on the payload 2 at a PDCP layer being a peer layer of a PDCP layer of the IAB node 1, to obtain a T1AP message, then encapsulates content of the T1AP message into an uplink F1AP message generated by the DU, and sends the uplink F1AP message to the CU. Optionally, the F1AP message generated by the DU may include the identifier of the IAB node 1, and may further include second indication information. Optionally, the uplink F1AP message that is generated by the DU and that is to be sent to the CU may further carry the identifier of the CU. Optionally, the second indication information and the identifier of the IAB node 1 may further be carried in header information of another protocol layer (a protocol layer other than an F1AP layer) of the F1 interface.

Optionally, in the manner option 3, the DU serves as the proxy node. For a UE-related T1AP message, the DU allocates a first UE identifier (for example, a DU T1AP UE ID) to UE, to represent the UE on a T1 interface between the DU and the IAB node, and the first UE identifier may be carried in the T1AP message to identify the UE. The DU further allocates a second UE identifier (for example, a DU F1AP UE ID) to the UE, to represent the UE on the F1 interface between the DU and the CU. The second UE identifier may be carried in the F1AP message to identify the UE. The donor DU maintains a correspondence between the first UE identifier and the second UE identifier, and a correspondence between the UE and an IAB node that provides an access service for the UE. For a UE-independent T1AP message, an identifier of an IAB node is correspondingly carried in the F1AP message between the DU and the CU, and is used to indicate an IAB node from or to which content included in the F1AP message comes or needs to be sent.

Manner option 4: Using a protocol stack architecture shown in FIG. 22 as an example, if the F1 interface between the DU and the CU has peer adaptation layers, the DU first processes the payload 2 at the adaptation layer, and then sequentially processes the payload 2 at an F1AP layer, an SCTP layer, an IP layer, an L2 layer, and an L1 layer, or sequentially processes the payload 2 at a GTP layer, a UDP layer, an IP layer, an L2 layer, and an L layer. The DU may add the identifier of the IAB node 1 and second indication information to header information of the adaptation layer. Alternatively, the DU includes the identifier of the IAB node 1 in header information of the adaptation layer, encapsulates, into an uplink F1AP message, an Adapt PDU obtained through processing at the adaptation layer, and sends the uplink F1AP message to the CU, where the uplink F1AP message carries second indication information. Alternatively, the DU includes the identifier of the IAB node 1 in header information of the adaptation layer, encapsulates, into an uplink GTP PDU, an Adapt PDU obtained through processing at the adaptation layer, and sends the uplink GTP PDU to the CU, where the uplink GTP PDU (for example, a GTP extension header field) carries second indication information. Optionally, the DU may further include the identifier of the CU in the header information of the adaptation layer. Optionally, the second indication information and the identifier of the IAB node 1 may further be carried in header information of another protocol layer (a protocol layer other than the F1AP layer, the GTP layer, and the adaptation layer) of the F1 interface.

Manner option 5: Using a protocol stack architecture shown in FIG. 24 as an example, control plane protocol layers (including an F1AP layer, an SCTP layer, an IP layer, an L2 layer, and an L1 layer) of the F1 interface are used between the DU and the CU. The DU may encapsulate, into an uplink F1AP message, an Adapt PDU that is obtained through processing at the adaptation layer of the IAB node 1 and that includes the payload 2, and send the uplink F1AP message to the CU, where the uplink F1AP message carries second indication information. Alternatively, user plane protocol layers (including a GTP layer, a UDP layer, an IP layer, an L2 layer, and an L1 layer) of the F1 interface are used. The DU may encapsulate, into an uplink GTP PDU, an Adapt PDU that is obtained through processing at the adaptation layer of the IAB node 1 and that includes the payload 2, and send the uplink GTP PDU to the CU, where the uplink GTP PDU (for example, a GTP extension header field) carries second indication information. Optionally, the adaptation layer of the IAB node 1 may include the identifier of the IAB node 1 or the identifier of the CU in adaptation layer header information added after the payload 2 is processed at the adaptation layer of the IAB node 1.

S406: The DU sends, to the CU, the second data packet into which the payload 2 is encapsulated.

S407: The CU parses the second data packet to obtain the payload 2. After processing the payload 2 at the PDCP layer being the peer layer of the PDCP layer of the IAB node 1, the CU obtains the uplink T1AP message sent by the IAB node 1, and further decapsulates the uplink T1AP message to obtain the RRC message sent by the IAB node 2 in the payload 1.

The second data packet carries the identifier of the IAB node 1 and the second indication information. In this way, after receiving the second data packet sent by the DU, the CU determines that the second data packet carries the T1AP message of the IAB node 1, and after parsing the payload 1 in the T1AP message, the CU may further determine that the IAB node 2 accesses the network through the IAB node 1.

Optionally, the CU may perform access control on the IAB node 2 with reference to the T1AP message of the IAB node 1, to determine whether access of the IAB node 2 is allowed. For example, the IAB node 1 notifies, by using the uplink T1AP message, the CU of an IAB node 2 admission control result (for example, similar to a case between the DU and the CU, initial UL RRC message transfer generated by the IAB node 1 does not include an IAB node 1 to CU RRC message). If the F1AP message sent by the IAB node 1 indicates that the IAB node 1 rejects access of the IAB node 2, the CU may generate an RRC message for rejecting connection setup, and send the RRC message to the IAB node 2 through the IAB node 1. After the CU determines that access of the IAB node 2 is allowed, the CU may generate an RRC message for indicating the IAB node 2 to set up an RRC connection, and send the RRC message to the IAB node 2 through the IAB node 1.

The CU may generate a downlink T1AP message to be sent to the IAB node 1. The downlink T1AP message includes the RRC message (for example, an RRC connection setup message, RRC Connection Setup) sent to the IAB node 2, and the RRC message may be used as a payload 3 after being processed at peer PDCP layers of the CU and the IAB node 2. The downlink T1AP message further includes a second identifier allocated by the CU to the IAB node 2 (for example, the second identifier is a CU T1AP IAB2 ID) and the first identifier allocated by the IAB node 1 to the IAB node 2. The second identifier is used by the CU to identify the IAB node 2 on a T1 interface (or a T1 connection) between the CU and the IAB node 1. The CU may perform sending processing (for example, encryption and integrity protection) on the downlink (DL) T1AP message at the PDCP layer being the peer layer of the PDCP layer of the IAB node 1, and then use the downlink T1AP message processed at the PDCP layer as a payload 4. Alternatively, referring to the protocol stack architecture shown in FIG. 12, the CU uses an F1AP message to be sent to the DU as a payload 4, and the F1AP message is converted, at the DU, into a T1AP message to be sent to the IAB node 1.

The CU performs processes and encapsulates the payload 4 at another lower protocol layer (for example, a protocol layer of the F1 interface), to obtain a third data packet. The CU may process and encapsulate the payload 4 at the another protocol layer in one of the following possible manners:

Manner option 1: Using the protocol stack architecture shown in FIG. 11 as an example, the control plane of the F1 interface includes the F1AP layer, the SCTP layer, the IP layer, the L2 layer, and the L1 layer. The CU generates, through processing at the F1AP layer, an uplink F1AP message to be sent to the DU. The uplink F1AP message carries the payload 4, the identifier of the IAB node 1, and third indication information, and the third indication information is used to indicate that the F1AP message carries a T1AP message of a wireless backhaul node. For example, the downlink F1AP message that is generated by the CU and into which the payload 4 is encapsulated may be a newly defined downlink F1AP message type (for example, the newly defined downlink F1AP message type may be downlink IAB T1AP transfer (DL IAB T1AP transfer)), and is used to carry a downlink T1AP message of an IAB node, and content filled in a message type field included in the F1AP message is the third indication information. Optionally, the downlink F1AP message that is generated by the CU and that is to be sent to the DU may further carry the identifier of the CU. Optionally, the third indication information and the identifier of the IAB node 1 may further be carried in header information of another protocol layer (a protocol layer other than the F1AP layer) of the F1 interface.

Manner option 2: Using the protocol stack architecture shown in FIG. 11 as an example, the user plane of the F1 interface includes the GTP layer, the UDP layer, the IP layer, the L2 layer, and the L1 layer. The CU generates, through processing at the GTP layer, a downlink GTP PDU to be sent to the DU. The downlink GTP PDU carries the payload 4. Third indication information may further be carried in the GTP PDU (for example, the third indication information is carried in a GTP extension header field), and the third indication information is used to indicate that the GTP PDU carries a T1AP message of a wireless backhaul node. The GTP PDU may further carry the identifier of the IAB node 1 (for example, the identifier of the IAB node 1 is carried in the GTP extension header field). Alternatively, if a TEID in a GTP header field is uniquely mapped to a DRB of the IAB node 1, the identifier of the IAB node 1 does not need to be additionally carried in the GTP PDU, that is, the IAB node 1 can be represented by using the TEID. Optionally, in the downlink GTP PDU that is generated by the CU and that is to be sent to the DU, the identifier of the CU may further be carried in, for example, the GTP extension header field. Optionally, the third indication information and the identifier of the IAB node 1 may further be carried in header information of another protocol layer (a protocol layer other than the GTP layer) of the F1 interface.

Manner option 3: Using the protocol stack architecture shown in FIG. 12 as an example, the CU sends the payload 4 as a downlink F1AP message to the DU. Optionally, the F1AP message generated by the CU may include the identifier of the IAB node 1, and may further include third indication information. Optionally, the downlink F1AP message may further carry the identifier of the CU. Optionally, the third indication information and the identifier of the IAB node 1 may further be carried in header information of another protocol layer (a protocol layer other than the F1AP layer) of the F1 interface.

Manner option 4: Using the protocol stack architecture shown in FIG. 22 as an example, if the F1 interface between the DU and the CU has the peer adaptation layers, the CU first processes the payload 4 at the adaptation layer, and then sequentially processes the payload 4 at the F1AP layer, the SCTP layer, the IP layer, the L2 layer, and the L1 layer, or sequentially processes the payload 4 at the GTP layer, the UDP layer, the IP layer, the L2 layer, and the L1 layer. The CU may include the identifier of the IAB node 1 and third indication information in header information of the adaptation layer. Alternatively, the CU includes the identifier of the IAB node 1 in header information of the adaptation layer, encapsulates, into a downlink F1AP message, an Adapt PDU obtained through processing at the adaptation layer, and sends the downlink F1AP message to the DU, where the downlink F1AP message carries third indication information. Alternatively, the CU includes the identifier of the IAB node 1 in header information of the adaptation layer, encapsulates, into a downlink GTP PDU, an Adapt PDU obtained through processing at the adaptation layer, and sends the downlink GTP PDU to the DU, where the downlink GTP PDU (for example, a GTP extension header field) carries third indication information. Optionally, the CU may further include the identifier of the CU in the header information of the adaptation layer. Optionally, the third indication information and the identifier of the IAB node 1 may further be carried in header information of another protocol layer (a protocol layer other than the F1AP layer, the GTP layer, and the adaptation layer) of the F1 interface.

Manner option 5: Using the protocol stack architecture shown in FIG. 24 as an example, the control plane protocol layers (including the F1AP layer, the SCTP layer, the IP layer, the L2 layer, and the L1 layer) of the F1 interface are used between the DU and the CU. The CU may encapsulate, into a downlink F1AP message, an Adapt PDU that is obtained through processing at the adaptation layer of the IAB node 1 and that includes the payload 4, and send the downlink F1AP message to the DU, where the downlink F1AP message carries third indication information. Alternatively, the user plane protocol layers (including the GTP layer, the UDP layer, the IP layer, the L2 layer, and the L1 layer) of the F1 interface are used. The CU may encapsulate, into a downlink GTP PDU, an Adapt PDU that is obtained through processing at the adaptation layer and that includes the payload 4, and send the downlink GTP PDU to the DU, where the downlink GTP PDU (for example, a GTP extension header field) carries third indication information. Optionally, an adaptation layer of the CU may include the identifier of the IAB node 1 or the identifier of the CU in adaptation layer header information added after the payload 2 is processed at the adaptation layer of the CU.

It may be understood that, for a format of the message sent by the CU to the DU, refer to a format of the message sent by the DU to the CU in S406 for understanding.

S408: The CU sends, to the DU, the third data packet into which the payload 4 is encapsulated.

S409: The DU receives the third data packet, and parses the third data packet to obtain the payload 4 (or the Adapt PDU including the payload 4). The DU processes and encapsulates the payload 4 at a lower protocol layer of a backhaul link to obtain a fourth data packet.

The fourth data packet further includes the identifier of the IAB node 1. Optionally, the fourth data packet further includes the identifier of the CU.

The fourth data packet further includes fourth indication information, and the fourth indication information is used to indicate that a type of a message carried in the data packet is a T1AP message. A manner in which the fourth data packet carries the fourth indication information may be one of the following manners:

Manner example 1: If the DU uses a same SRB (or an RLC bearer/a logical channel/an RLC channel corresponding to the SRB) to carry (send/receive) a T1AP message and an RRC message of a child node of the DU, the fourth indication information may be carried in header information that is of the fourth data packet and that is added at the RLC layer.

Manner example 2: If the DU uses a same DRB (or an RLC bearer/a logical channel/an RLC channel corresponding to the DRB) to carry (send/receive) a T1AP message and user plane data of a descendant child node of the DU, the fourth indication information may be carried in header information that is of the fourth data packet and that is added at the adaptation layer.

Manner example 3: If the DU uses a same DRB (or an RLC bearer/a logical channel/an RLC channel corresponding to the DRB) to carry (send/receive) a T1AP message, user plane data of a child node of the DU, and user plane data of a descendant child node of the DU, the fourth indication information may be carried in header information that is of the fourth data packet and that is added at the RLC layer.

Manner example 4: If the DU uses a dedicated radio bearer (a DRB/an SRB, or an RLC bearer/a logical channel/an RLC channel corresponding to the dedicated DRB/SRB) to carry (send/receive) a T1AP message, the fourth indication information may be an identifier of the dedicated radio bearer or an identifier of the RLC bearer/RLC channel corresponding the dedicated radio bearer, where the identifier is carried in the header information that is of the fourth data packet and that is added at the adaptation layer, or the fourth indication information may be an identifier LCID of the logical channel corresponding to the dedicated radio bearer, where the identifier is carried in the header information that is of the fourth data packet and that is added at the MAC layer.

S410: The DU sends, to the IAB node 1, the fourth data packet into which the payload 4 is encapsulated.

Specifically, for a manner in which the DU sends the fourth data packet to the IAB node 1, refer to the sending manners in the four manner examples in S409 for understanding.

S411: The IAB node 1 receives the fourth data packet, removes the encapsulation at the lower protocol layer to obtain the payload 4, and performs receiving processing (for example, decryption and integrity check) on the payload 4 at the PDCP layer to obtain the downlink T1AP message, and further extracts the payload 3 (where the RRC message sent by the CU to the IAB node 2 is encapsulated into the payload 3) from the downlink T1AP message, where the downlink T1AP message includes the first identifier allocated by the IAB node 1 to the IAB node 2 and the second identifier allocated by the CU to the IAB node 2, so that the IAB node 1 can determine that the payload 3 needs to be sent to the IAB node 2.

S412: The IAB node 1 sends the payload 3 to the IAB node 2. The payload 3 includes an RRC message (for example, RRC connection setup) generated by the CU.

It may be understood that after S212, the IAB node 2 continues to perform subsequent procedures as a MT, and completes access of the IAB node 2 to the network to set up a PDU session for communication with an OAM.

The subsequent procedures include: sending, by the IAB node 2, RRC connection setup complete, authentication and/or authorization between the IAB node 2 and the network, setup of a PDU session of the IAB node 2, a security mode configuration of the IAB node 2 and a RAN device (the CU or a donor node), an air interface bearer setup process of the IAB node 2, an IAB node 2-related context configuration for the IAB node 1 and the RAN device, and the like. For a transmission process of the RRC message of the IAB node 2 and a transmission process of the T1AP message of the IAB node 1 in the subsequent procedures, refer to the foregoing transmission processes in S201 to S211 for understanding. Details are not described.

Then, the IAB node 2 obtains IAB-related configuration information from the OAM and/or the CU. For example, the IAB-related configuration information includes cell information of the IAB node 2, routing information (including, for example, an identifier of the IAB node 2, the identifier of the CU, and a routing mapping relationship between the IAB node 2 and the CU) required by the IAB node 2 at an adaptation layer of an interface (for example, Un) between the IAB node 2 and the IAB node 1, a configuration of a dedicated bearer used to carry a T1AP message of the IAB node 2, and configuration information of a PDCP layer (where a peer protocol layer of the PDCP layer is located in the CU, the DU, or a DgNB) used to perform security protection on the T1AP message of the IAB node 2.

If the protocol stack architecture shown in FIG. 12 is used, the CU may further send the configuration information of the PDCP layer to the DU by using an F1AP message. The configuration information is used to configure the PDCP layer that is of the DU and that is the peer layer of the PDCP layer of the IAB node 2. The PDCP layer may be used to provide security protection for a T1AP message.

It should be noted that, if the IAB node 2 obtains the IAB-related configuration information from the OAM, the IAB node 2, acting as an MT, obtains the IAB-related configuration information through a connection between the user plane and the OAM. For a manner of encapsulating a user plane data packet by an intermediate node between the IAB node 2 and the OAM, refer to the protocol stacks shown in FIG. 9 to FIG. 12 for understanding. In addition, the IAB node 2 may report, to the CU by using an RRC message, a part or all of the IAB-related configuration information obtained from the OAM. If the IAB node 2 obtains a part or all of the IAB-related configuration information from the CU, the IAB node 2, acting as an MT, receives, through a control plane connection, namely, an RRC connection, between the IAB node 2 and the CU, an RRC message (for example, RRC reconfiguration) sent by the CU, to obtain the IAB-related configuration information.

It should be noted that, after a PDCP layer security parameter is negotiated between the IAB node 2 and the CU, a transmit end (the IAB node 2 or the CU) may perform security protection, for example, encryption and integrity protection operations, on an uplink RRC message, a downlink RRC message, an uplink F1AP message, and a downlink F1AP message that are subsequently transmitted between the IAB node 2 and the CU, at the peer PDCP layers between the IAB node 2 and the CU, and then the processed messages are transferred between the IAB node 2 and the CU through the IAB node 1 and the DU as payloads. For a processing and transferring process of an intermediate node between the IAB node 2 and the CU, refer to corresponding descriptions of the foregoing steps for understanding.

In another embodiment of this application, still with reference to FIG. 19A, FIG. 19B, and FIG. 19C, optionally, after the IAB node 2 accesses the network, a process in which the CU or the base station configures a routing configuration for an intermediate node (for example, the DU or the IAB node 1) between the IAB node 2 and the CU or the base station may be further included.

S413: The CU sends a downlink F1AP message to the DU, where the downlink F1AP message carries a routing configuration configured for the DU. For example, the routing configuration includes the identifier of the IAB node 2.

Optionally, the routing configuration configured for the DU further includes an identifier of a next-hop node (for example, the identifier of the IAB node 1 shown in FIG. 6) on a transmission path from the DU to the IAB node 2; or the routing configuration configured for the DU further includes an identifier of a transmission path from the DU or the CU to the IAB node 2; or the routing configuration configured for the DU further includes an identifier of a transmission path from the DU or the CU to the IAB node 2 and an identifier of a next-hop node on the transmission path associated with the identifier corresponding to the transmission path.

In this embodiment of this application, the identifier of the transmission path is used to determine a transmission path from a source node to a destination node. For example, as shown in FIG. 6, the CU may configure, for the source node (for example, the DU), the following transmission path to the destination node (for example, the IAB node 2): a transmission path 1: the DU→the IAB node 1→the IAB node 2; or the CU may configure, for the source node (for example, the DU), the following transmission path to the destination node (for example, the UE): a transmission path 2: the DU→the IAB node 1→the IAB node 2→the UE. In this way, the DU can determine a connection relationship between the UE and a wireless backhaul node accessing the DU, and can forward, to a correct next-hop node, a data packet that needs to be forwarded. It should be noted that identifiers of next-hop nodes of source nodes on different transmission paths may be the same or may be different. This is not limited in this application. For example, identifiers of next-hop nodes on the transmission path 1 and the transmission path 2 that are configured for the DU are both the IAB node 1.

Optionally, if the control plane protocol stack shown in FIG. 12 is used, the CU further needs to send, to the DU by using an F1AP message, configuration information (including, for example, encryption/decryption function configuration information and integrity protection function configuration information) for the peer PDCP layers of the DU and the IAB node 2. The configuration information for the peer PDCP layers of the DU and the IAB node 2 and the routing configuration configured for the DU may be sent to the DU by using a same downlink F1AP message. Alternatively, the CU may send, to the DU by using separate downlink F1AP messages, the routing configuration configured for the DU and the configuration information for the peer PDCP layers of the DU and the IAB node 2. Correspondingly, the configuration information for the peer PDCP layers of the DU and the IAB node 2 further needs to be sent by the CU to the IAB node 2 by using, for example, an RRC message. For a sending manner of the RRC message, refer to the sending manner in S401 to S411.

S414: The CU sends a downlink data packet to the DU, where the downlink data packet includes a downlink T1AP message to be sent to the IAB node 1. The downlink T1AP message of the IAB node 1 includes a routing configuration for the IAB node 1 (for example, the routing configuration for the IAB node 1 may include the identifier of the IAB node 2). For information carried in the downlink data packet, refer to S407. The downlink F1AP message carries routing information (routing info). For example, the routing information is the identifier of the IAB node 1 and the identifier of the CU. The DU may add adaptation layer information to the downlink T1AP message of the IAB node 1 based on the routing information, and encapsulate and process the downlink T1AP message of the IAB node 1 at a lower protocol layer to obtain a data packet to be sent to the IAB node 1. The DU encapsulates and processes the downlink T1AP message of the IAB node 1 at the lower protocol layer. For the encapsulation and the processing and content carried in the downlink T1AP message, refer to the descriptions of S409 for understanding.

Optionally, the downlink F1AP messages in S413 and S414 may be a same downlink F1AP message, so that a quantity of messages sent by the CU to the DU is reduced.

Optionally, the routing configuration for the IAB node 1 further includes the identifier of the next-hop node of the IAB node 1 (for example, the identifier of the IAB node 2 shown in FIG. 6) on the transmission path from the IAB node 1 to the IAB node 2; or the routing configuration for the IAB node 1 further includes the identifier of the transmission path from the CU/IAB node 1 to the IAB node 2 and the identifier of the next-hop node (for example, the IAB node 1) on the transmission path associated with the identifier of the transmission path from the CU/IAB node 1 to the IAB node 2.

S415: The DU sends the data packet including the IAB node 1 to the IAB node 1.

It should be noted that, a routing configuration process described in S413 to S415 is a process in which the CU configures the routing configuration for the DU and the routing configuration for the IAB node 1. It may be understood that, in an actual process, if there are a plurality of IAB nodes between a newly accessed node and the CU, for a process in which the CU configures a routing configuration for each of the plurality of IAB nodes, refer to S414 and S415. Details are not described herein again in this embodiment of this application.

Optionally, after the DU or the IAB node 1 completes the routing configuration, the DU or the IAB node 1 may further separately return a first message to the CU. The first message is used to indicate that the DU or the IAB node 1 has completed the routing configuration.

In still another embodiment in the embodiments of this application, after S415 is performed, the following phase in which a T1 interface (or a T1 connection) is set up between the IAB node 2 and the CU is further included.

S416: The IAB node 2 sends a T1 connection setup request to the CU. The IAB node 2 sends a generated uplink T1AP message, namely, a T1 connection setup request (T1 setup request), to the CU. The IAB node 2 processes the uplink T1AP message at the PDCP layer to obtain a payload 5. The IAB node 2 adds, at an adaptation layer of the payload 5, adaptation information (for example, an identifier of a source node being the IAB node 2, and an identifier of a destination node being the CU) used to route the payload 5, and then sends a fifth data packet to the IAB node 1 over a radio bearer (or an RLC bearer/a logical channel/an RLC channel corresponding to the radio bearer) on an interface (for example. Un) between the IAB node 2 and the IAB node 1. The fifth data packet includes the payload 5, and the payload 5 carries the uplink T1AP message. Optionally, the fifth data packet further includes fifth indication information, used to indicate that the fifth data packet carries the T1AP message.

For a sending manner in which the IAB node 2 sends the fifth data packet including the payload 5 to the IAB node 1, refer to the foregoing sending manner in which the IAB node 1 sends the first data packet including the T1AP message to the DU in S204 for understanding.

S417: After receiving the fifth data packet that includes the payload 5 and that is sent by the IAB node 2, the IAB node 1 determines, based on the adaptation information that is used for routing and that is included in the fifth data packet and a routing mapping relationship maintained in a prior routing configuration, to encapsulate the payload 5 into a sixth data packet and send the sixth data packet to the DU. The sixth data packet may carry the identifier of the IAB node 2 and the first indication information. For a sending manner in which the IAB node 1 sends the sixth data packet including the payload 5 to the DU, refer to the foregoing sending manner in which the IAB node 1 sends the first data packet including the T1AP message to the DU in S204 for understanding. During understanding, it should be noted that, different from the identifier of the IAB node 1 that is carried in the first data packet, the sixth data packet needs to carry the identifier of the IAB node 2.

S418: The DU receives the sixth data packet that includes the payload 5 and that is forwarded by the IAB node 1, and determines that a type of a message in the payload 5 carried in the sixth data packet is a T1AP message of an IAB node, so that after processing the payload 5 obtained by parsing the sixth data packet, the DU obtains a seventh data packet and sends the seventh data packet to the CU.

For a processing process in which the DU generates the seventh data packet and a sending manner of the seventh data packet, refer to the foregoing manner in which the DU sends the second data packet to the CU for understanding. During understanding, it should be noted that, different from the identifier of the IAB node 1 that is carried in the second data packet, the seventh data packet needs to carry the identifier of the IAB node 2.

Specifically, for a manner of determining, in S218, that the type of the message in the payload 5 carried in the data packet is the T1AP message of the IAB node, refer to the descriptions of S405. Details are not described herein again in this embodiment of this application.

S419: The CU receives the seventh data packet sent by the DU, parses the seventh data packet to extract the payload 5, obtains the uplink T1AP message sent by the IAB node 2 from the payload 5 after performing receiving processing (for example, decryption and integrity check) on the payload 5 at the PDCP layer, processes the T1 connection setup request of the IAB node 2, and then generates a downlink T1AP message, for example, a T1 connection setup response, to be sent to the IAB node 2, to notify the IAB node 2 of information related to setup of the T1 connection. A payload 6 may be obtained after the downlink T1AP message is processed at the peer PDCP layers of the CU and the IAB node 2. Alternatively, corresponding to the protocol architecture shown in FIG. 12, the T1AP message is an F1AP message sent by the CU to the DU, the F1AP message needs to be processed by the DU as a proxy to obtain the T1AP message to be sent to the IAB node 2, and the CU uses the F1AP message as a payload 6.

S420: The CU sends an eighth data packet to the DU, where the eighth data packet includes the payload 6 sent by the CU to the IAB node 2.

Optionally, the eighth data packet sent by the CU to the DU further carries routing information. For example, the routing information includes an identifier of a source node being the CU, and an identifier of a destination node being the IAB node 2. Alternatively, the routing information includes the identifier of the transmission path from the CU to the IAB node 2.

For a manner in which the CU processes and sends the eighth data packet, refer to the foregoing manner in which the CU processes the third data packet and sends the third data packet to the DU in the foregoing steps for understanding. During understanding, it should be noted that, different from the identifier of the IAB node 1 that is carried in the third data packet, the eighth data packet needs to carry the identifier of the IAB node 2.

S421: The DU receives the eighth data packet, and generates, based on the routing information and the third indication information that are carried in the eighth data packet, a ninth data packet that includes a T1AP message to be sent to the IAB node 2, and sends the ninth data packet to the IAB node 1.

The ninth data packet includes the identifier of the IAB node 2 and indication information used to indicate that the ninth data packet includes the T1AP message.

For a manner in which the DU processes and sends the ninth data packet, refer to the foregoing manner in which the DU processes the fourth data packet and sends the fourth data packet to the IAB node 1 in the foregoing steps for understanding. During understanding, it should be noted that, different from the identifier of the IAB node 1 that is carried in the fourth data packet, the ninth data packet needs to carry the identifier of the IAB node 2.

S422: The IAB node 1 receives the ninth data packet, and includes, in a tenth data packet, the downlink T1AP message that is in the ninth data packet and on which security protection is performed at the PDCP layer being the peer layer of the PDCP layer of the IAB node 2, and sends the tenth data packet to the IAB node 2.

The tenth data packet includes the identifier of the IAB node 2 and indication information used to indicate that the tenth data packet includes the T1AP message.

It should be noted that the IAB node 2 and the CU may exchange another T1AP message in a manner similar to that in the forwarding process described in S216 to S222, to maintain and update the T1 connection between the IAB node 2 and the CU (for example, a CU configuration update, an IAB node 2 configuration update, and a connection reset). Specific interaction processes are not listed one by one in this embodiment of this application.

It should be noted that the identifier of the IAB node in this embodiment of this application may be, for example, an identity (such as a C-RNTI, an IMSI, or a TMSI) of the IAB node serving as UE, a MAC layer identifier of the IAB node, or an identifier (for example, a network layer identifier, such as an IP address or an adaptation layer identifier, of a device) allocated by an OAM, a donor node DgNB/donor-CU, or a core network element (such as an SMF or a UPF) to the IAB node device. This is not limited in this embodiment of this application.

Figure 20A:
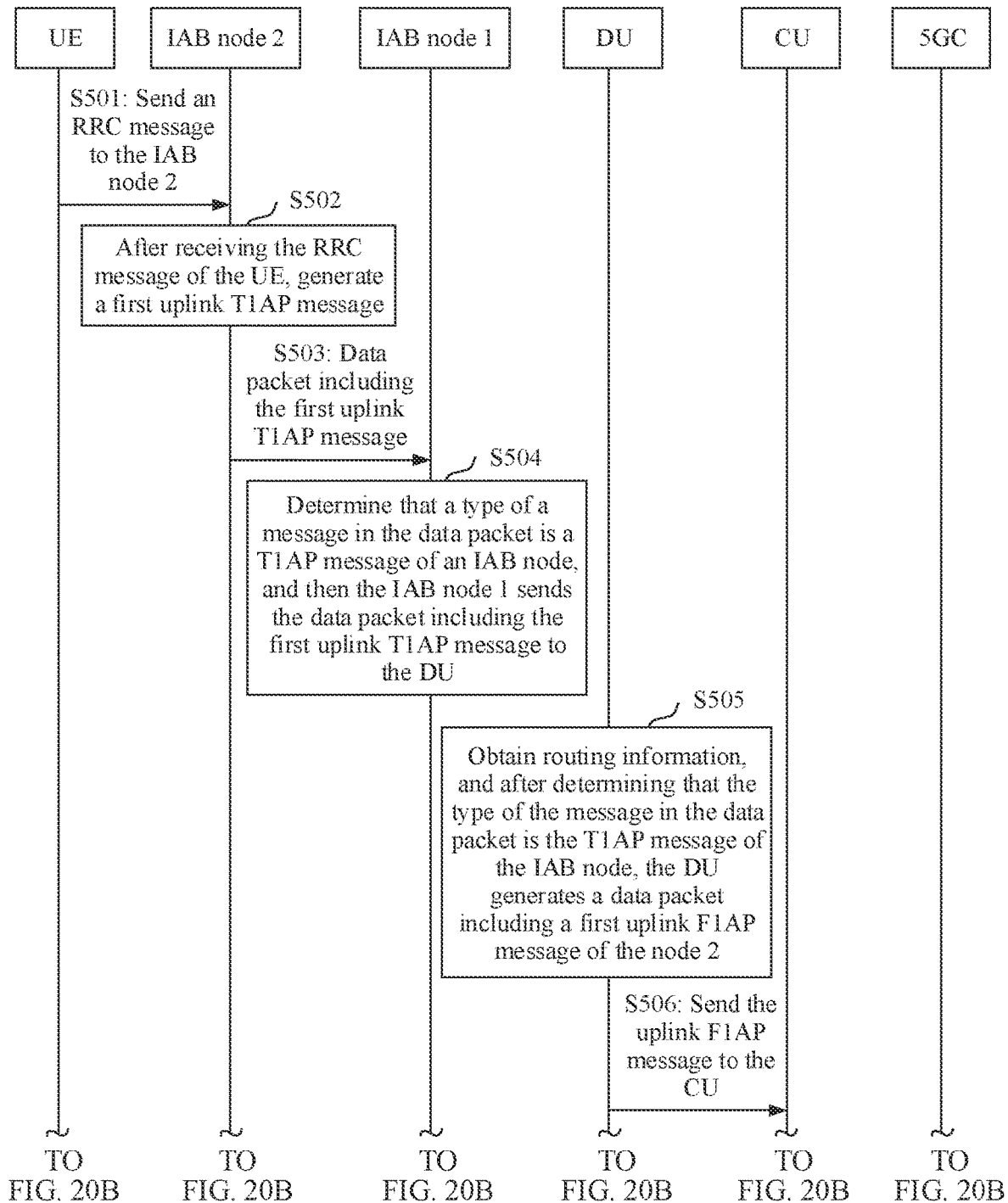
FIG. 20A, FIG. 20B, and FIG. 20C are a second schematic flowchart of a communication method according to an embodiment of this application.
Figure 20B:
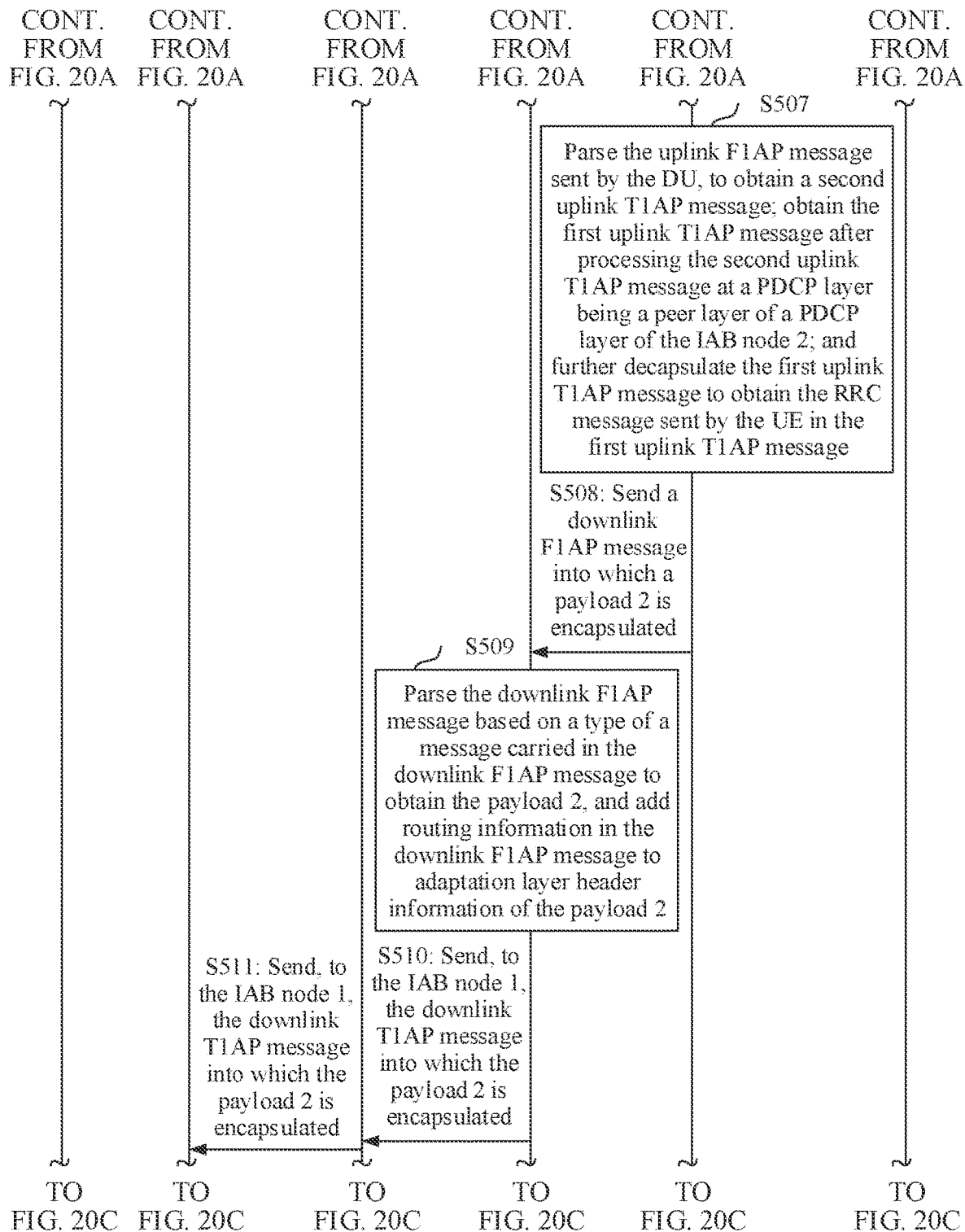
Figure 20C:
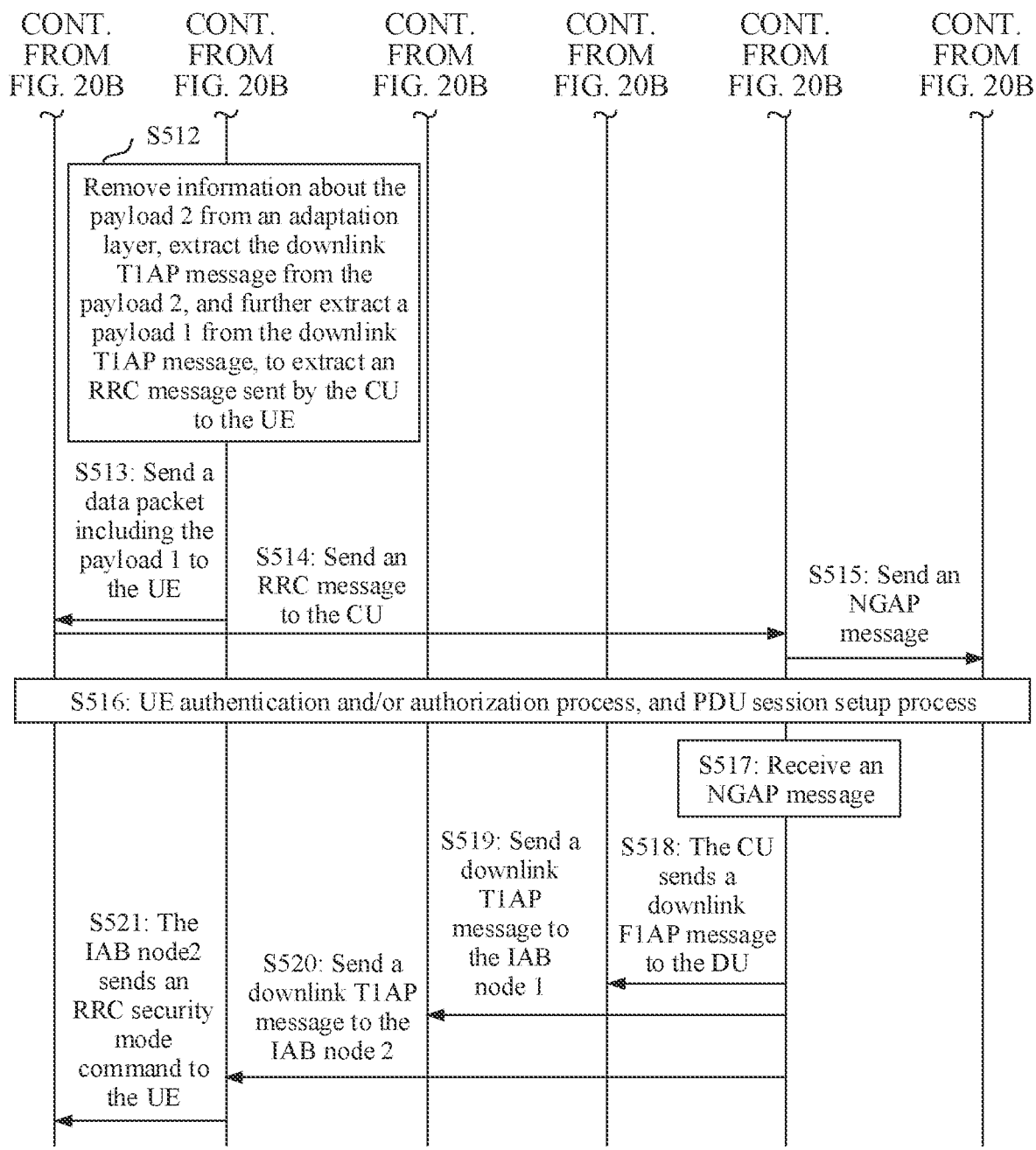

As shown in FIG. 20A, FIG. 20B, and FIG. 20C, an example in which UE is connected to a network through an IAB node 2 is used in FIG. 20A, FIG. 20B, and FIG. 20C. As shown in FIG. 20A, FIG. 20B, and FIG. 20C, a method provided in this application includes the following steps.

S501: The UE sends an RRC message to the IAB node 2.

For example, the RRC message may be an RRC connection request message.

S502: After receiving the RRC message of the UE, the IAB node 2 generates a first uplink T1AP message. The first uplink T1AP message includes a third identifier (for example, an IAB node 2 T1AP UE ID) allocated by the IAB node 2 to the UE. After processing the uplink T1AP message at a PDCP layer, the IAB node 2 adds adaptation layer information (including routing information, for example, an identifier of a source node being an identifier of the IAB node 2, and an identifier of a destination node being an identifier of a CU).

Optionally, the RRC message sent by the UE is encapsulated into the first uplink T1AP message.

S503: The IAB node 2 sends a data packet including the first uplink T1AP message to an IAB node 1.

For a manner in which the IAB node 2 processes and sends the data packet including the first uplink T1AP message, refer to the foregoing manner in which the second device sends the first data packet to the first device in S202 for understanding.

S504: The IAB node 1 determines that a type of a message in the received data packet is a T1AP message of an IAB node, and determines, based on adaptation information included in the data packet, that a next-hop node of the IAB node 1 on a transmission path from the IAB node 1 to the CU is a DU. Then, the IAB node 1 sends the data packet including the first uplink T1AP message to the DU.

Specifically, for a manner in which the IAB node 1 determines that the type of the message in the received data packet is the T1AP message of the IAB node in S504, refer to the descriptions of S404 in the foregoing embodiment. Details are not described herein again in this application.

For a manner in which the IAB node 1 sends the data packet including the first uplink T1AP message to the DU and specific information included in the data packet, refer to the descriptions about sending the second data packet by the first device to the third device in S204 in the foregoing embodiment for understanding. During understanding, it should be noted that in this step, the corresponding first device is the IAB node 1, the third device is the DU, and the second device is the IAB node 2.

S505: The DU obtains routing information from the adaptation information of the received data packet. After determining that the type of the message in the data packet is the T1AP message of the IAB node, the DU generates a data packet including the first uplink F1AP message of the node 2.

S506: The DU sends the data packet including the uplink F1AP message to the CU.

For details, refer to the descriptions about sending the second data packet by the first device to the third device in S204 in the foregoing embodiment for understanding. It should be noted that herein, the corresponding first device is the DU, the third device is the CU, and the second device is the IAB node 2.

S507: The CU parses the data packet including the uplink F1AP message and sent by the DU, obtains the first uplink T1AP message of the IAB node 2 after receiving processing, and further decapsulates the first uplink T1AP message to obtain the RRC message sent by the UE in the first uplink T1AP message.

Optionally, the CU may perform access control on the UE (for details, refer to the foregoing manner of performing access control on the IAB node 2), and after the CU allows access, the CU may generate a downlink T1AP message to be sent to the IAB node 2. The downlink T1AP message to be sent to the IAB node 2 includes a payload 1. The downlink T1AP message to be sent to the IAB node 2 further includes a fourth identifier (for example, a CU T1AP UE ID) allocated by the CU to the UE on a T1 connection between the CU and the IAB node 2 and a third identifier allocated by the IAB node 2 to the UE. The payload 1 includes an RRC message (for example, RRC Connection Setup) sent by the CU to the IAB node 2. The CU may process the downlink T1AP message at a PDCP layer being a peer layer of the PDCP layer of the IAB node 2, and the downlink T1AP message processed at the PDCP layer is considered as a payload 2. Alternatively, corresponding to the protocol architecture shown in FIG. 12, the CU uses, as a payload 2, an F1AP message that needs to be converted into a T1AP message by the DU. The CU processes and encapsulates the payload 2.

S508: The CU sends, to the DU, a downlink data packet into which the payload 2 is encapsulated.

The downlink data packet carries routing-related information (for example, the identifier of the CU, the identifier of the IAB node 2, or an identifier of a transmission path from the DU to the IAB node 2).

For details, refer to the descriptions about sending the data packet including the T1AP message by the third device to the first device in S302 in the foregoing embodiment for understanding. During understanding, it should be noted that herein, the corresponding first device is the DU, the third device is the CU, and the second device is the IAB node 2.

S509: The DU receives the downlink data packet sent by the CU, parses the downlink data packet based on a type of a message carried in the packet to obtain the payload 2, and adds, to adaptation layer header information that is generated by the DU and into which the payload 2 is encapsulated, the routing-related information (for example, the identifier of the CU, the identifier of the IAB node 2, or the identifier of the transmission path from the DU to the IAB node 2) carried in the downlink data packet.

S510: The DU sends, to the IAB node 1, the downlink data packet that is generated by the DU and into which the payload 2 is encapsulated.

It may be understood that, in S508 and S509, the DU may serve as a proxy node of a control plane message between the IAB node and the CU, and perform conversion between a T1AP message and an F1AP message between the two connections.

S511: The IAB node 1 generates a downlink data packet including the payload 2, and sends the downlink data packet to the IAB node 2.

The IAB node 1 may carry, over a dedicated SRB or an SRB shared with other types of messages, the downlink T1AP message into which the payload 2 is encapsulated.

S512: The IAB node 2 removes information about the payload 2 from an adaptation layer, extracts the downlink T1AP message from the payload 2, and further extracts the payload 1 from the downlink T1AP message, to extract an RRC message sent by the CU to the UE. The IAB node 2 may determine, based on the third identifier that is included in the downlink T1AP message and that is allocated by the IAB node 2 to the UE on the T1 connection between the IAB node 2 and the CU, that the RRC message needs to be sent to the UE.

S513: The IAB node 2 sends a data packet including the payload 1 to the UE, where the payload 1 includes the RRC message (for example, RRC connection setup) generated by the CU.

S514: The UE returns an RRC message (for example, an RRC connection setup complete message, RRC connection setup complete) to the CU.

It may be understood that the RRC message is also transmitted to the CU through the IAB node 2, the IAB node 1, and the DU in sequence. For specific transmission and processing processes of the IAB node 2, the IAB node 1, and the DU, refer to the corresponding descriptions of S301 to S306 for understanding.

S515: The CU sends an NGAP message, for example, initial UE information (initial UE message) to a core network element (for example, an access management function unit (AMF)), for a subsequent authentication and/or authorization process and a PDU session setup process of the UE.

S516: The authentication and/or authorization process is performed between the UE and a core network, and the process of setting up a PDU session of the UE between core network elements is performed. For a specific process, refer to the prior art for understanding. For a message that needs to be transferred between the CU and the UE, refer to the processing process of the information sent by the UE to the CU described in S501 to S506 and the process of sending the information by the CU to the UE described in S308 to S313 for understanding.

S517: The CU receives an NGAP message, for example, an initial UE context setup request, sent by the core network element AMF.

S518: The CU sends a downlink F1AP message (for example, UE context configuration information) to the DU, where the downlink F1AP message may be used to perform a UE-related configuration on the DU. The UE-related configuration includes: an identifier of the UE (for example, a CU F1AP UE ID allocated by the CU to the UE on an F1 interface, an identifier that is allocated by the CU to the UE and that can be identified at the adaptation layer, an international mobile subscriber identity (IMSI) of the UE, a temporary mobile subscriber identity (TMSI) of the UE, or a cell radio network temporary identifier (C-RNTI) of the UE), an identifier of a radio bearer of the UE, a QoS parameter corresponding to the radio bearer of the UE, an ARQ mode corresponding to the UE at an RLC layer or an ARQ mode corresponding to the radio bearer at an RLC layer, a QoS identifier (for example, a 5QI, a QFI, a QCI, or a DSCP) corresponding to a service of the UE, and a QoS parameter corresponding to the QoS identifier. Optionally, the UE-related configuration may further include a QoS mapping rule of the data packet on the DU (for example, a mapping rule from a QoS label or an F1AP message type carried in the data packet on the F1 interface to the radio bearer of the UE or a radio bearer between the DU and the IAB node 1, where the radio bearer may be a DRB or an SRB).

S519: The CU sends a downlink T1AP message to the IAB node 1 through the DU. The downlink T1AP message may be used to perform a UE-related adaptation layer configuration on the IAB node 1. The UE-related adaptation layer configuration includes: the identifier of the UE (for example, the identifier that is allocated by the CU to the UE and that can be identified at the adaptation layer, the IMSI of the UE, the TMSI of the UE, or the C-RNTI of the UE), the identifier of the radio bearer of the UE, the QoS parameter corresponding to the radio bearer of the UE, the ARQ mode corresponding to the radio bearer of the UE at the RLC layer, the QoS identifier (for example, the 5QI, the QFI, the QCI, or the DSCP) corresponding to the service of the UE, and the QoS parameter corresponding to the QoS identifier. Optionally, the UE-related adaptation layer configuration may further include: a QoS mapping rule of the data packet on the IAB node 1 (for example, a mapping relationship between the QoS label/the identifier of the radio bearer of the UE/a data type indication (for example, first indication information) or an identifier of a radio bearer/a logical channel for the received data packet and a radio bearer used by a next hop to send the data packet), and the like. The radio bearer herein may be a DRB or an SRB.

It may be understood that the downlink T1AP message in S519 is encapsulated into a downlink data packet and sent to the DU, and then the DU sends the downlink data packet to the IAB node 1 in S519.

S520: The CU sends a downlink T1AP message to the IAB node 2 through the DU and the IAB node 1, where the downlink T1AP message may be used to perform a UE-related configuration on the IAB node 2. The UE-related configuration performed on the IAB node 2 includes: the identifier of the UE (for example, a fifth identifier (for example, a CU T1AP UE ID) allocated by the CU to the UE on a T1 interface between the CU and the IAB node 2, a sixth identifier that is allocated by the CU to the UE and that can be identified at the adaptation layer, the IMSI of the UE, the TMSI of the UE, or the C-RNTI of the UE), the identifier of the radio bearer of the UE, the QoS parameter corresponding to the radio bearer of the UE, the ARQ mode corresponding to the radio bearer of the UE at the RLC layer, the QoS identifier (for example, the 5QI, the QFI, the QCI, or the DSCP) corresponding to the service of the UE, and the QoS parameter corresponding to the QoS identifier. Optionally, the UE-related configuration performed on the IAB node 2 may further include: a QoS mapping rule of the data packet on the IAB node 1 (for example, a mapping relationship between the QoS label/the identifier of the radio bearer of the UE/the data type indication (for example, the first indication information) or an identifier of a radio bearer/logical channel used by a prior hop to receive the data packet and an identifier of a radio bearer used by a next hop to send the data packet), and the like. The radio bearer herein may be a DRB or an SRB. The downlink T1AP message in S320 is encapsulated into a downlink data packet on the F1 interface and sent to the DU, the DU parses and extracts the downlink T1AP message, and sends the downlink T1AP message to the IAB node 1, and then the IAB node 1 sends the downlink T1AP message to the IAB node 2.

Optionally, the downlink T1AP message in S320 may further include: an RRC message (for example, an RRC security mode command, namely, an RRC security mode command) sent by the CU to the UE, or the security mode command message may be sent by the CU to the UE by using a separate RRC message.

S521: Configure a UE security mode. The configuration includes: sending, by the IAB node 2, an RRC security mode command to the UE, and returning, by the UE, an RRC security mode configuration complete message (RRC security mode complete) to the IAB node 2. For specific content, refer the prior art. Details are not described in this embodiment.

It should be noted that, after all the nodes (for example, the IAB node 2, the IAB node 1, and the DU) between the CU and the UE complete the UE-related configuration, each node may send, to the CU, a configuration complete response message (which is used to notify the CU of configuration content executed by each node for the UE, for example, may include an identifier, namely, an IAB node 2 T1AP UE ID, of the UE allocated by the IAB node 2 to the UE on the T1 interface between the CU and the IAB node 2), and subsequently, the CU performs an RRC reconfiguration on the UE (for example, the CU sends, to the UE, an RRC message used to set up a DRB of the UE, and a response message of the UE). Specifically, for content of a message fed back by each node, refer to the prior art. For a specific sending process, refer to the foregoing sending of the RRC message, the T1AP message, and the F1AP message of the UE for understanding. Details are not described herein again.

It may be understood that, after a PDCP layer security parameter (namely, the security mode command in S521) is negotiated between the UE and the CU, a transmit end (the UE or the CU) may perform security protection, for example, encryption and integrity protection operations, on an RRC message subsequently sent between the UE and the CU, at peer PDCP layers of the UE and the CU, and then the processed RRC message is transferred between the UE and the CU through the IAB node 2, the IAB node 1, and the DU as the payload 1. For a processing and transfer process of the intermediate node, refer to corresponding descriptions of the foregoing steps for understanding.

It should be noted that, with reference to the foregoing descriptions of the difference, a format of a data packet in a node transmission process adaptively varies with a specific used protocol stack architecture.

Figure 21:
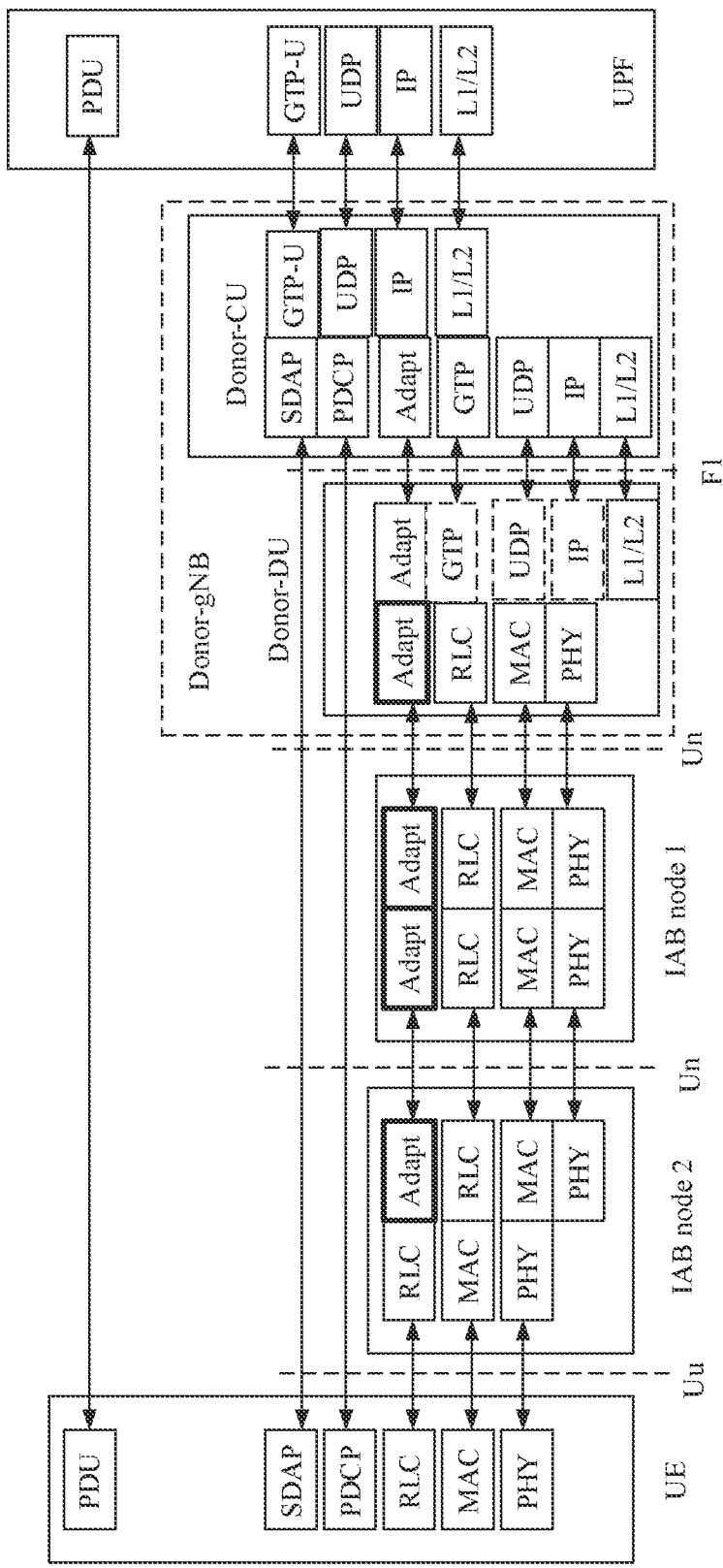
FIG. 21 is a seventh schematic architectural diagram of a protocol stack according to an embodiment of this application.
Figure 22:
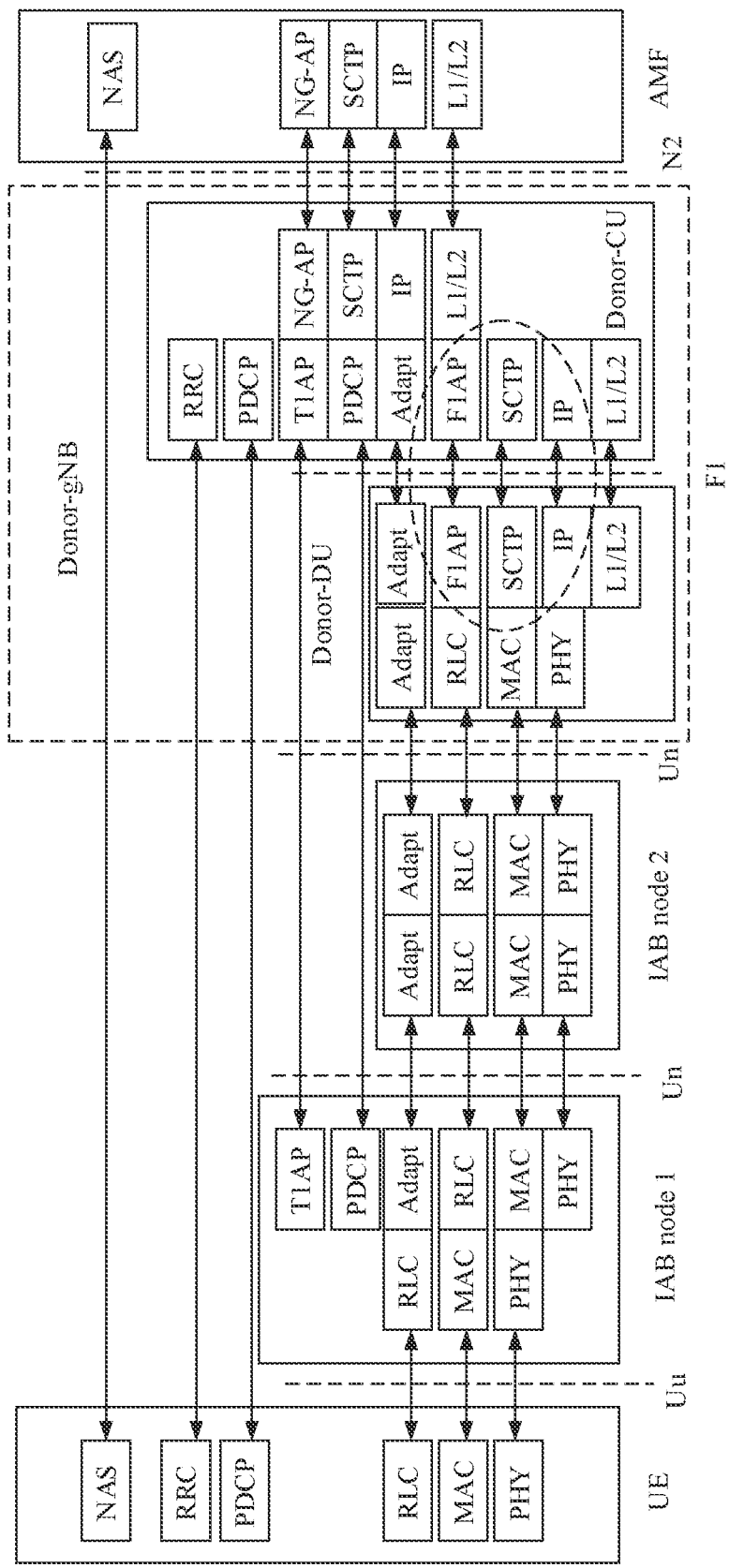
FIG. 22 is an eighth schematic architectural diagram of a protocol stack according to an embodiment of this application.

Each of FIG. 21 and FIG. 22 show another protocol stack architecture according to an embodiment of this application. In a user plane multi-hop protocol architecture shown in FIG. 21, related nodes include UE, an IAB node 2, an IAB node 1, a DU, a CU, and a user plane network element (for example, a UPF). A protocol stack of the UE includes, in sequence from top to bottom, a PDU layer being a peer layer of a PDU layer of the UPF, an SDAP layer being a peer layer of an SDAP layer of the CU, a PDCP layer being a peer layer of a PDCP layer of the CU, an RLC layer being a peer layer of an RLC layer of the IAB node 2, a MAC layer being a peer layer of a MAC layer of the IAB node 2, and a PHY layer being a peer layer of a PHY layer of the IAB node 2. A protocol stack of the IAB node 2 includes a protocol stack for communication with the UE and a protocol stack for communication with the IAB node 1. The protocol stack for communication with the UE includes, in sequence from top to bottom, the RLC layer being the peer layer of the RLC layer of the UE, the MAC layer being the peer layer of the MAC layer of the UE, and the PHY layer being the peer layer of the PHY layer of the UE. The protocol stack for communication with the IAB node 1 includes, in sequence from top to bottom, an Adapt layer being a peer layer of an Adapt layer of the IAB node 1, an RLC layer being a peer layer of an RLC layer of the IAB node 1, a MAC layer being a peer layer of a MAC layer of the IAB node 1, and a PHY layer being a peer layer of a PHY layer of the IAB node 1. A protocol stack of the IAB node 1 includes a protocol stack for communication with the IAB node 2 and a protocol stack for communication with the DU. The protocol stack for communication with the IAB node 2 includes, in sequence from top to bottom, the Adapt layer being the peer layer of the Adapt layer of the IAB node 2, the RLC layer being the peer layer of the RLC layer of the IAB node 2, the MAC layer being the peer layer of the MAC layer of the IAB node 2, and the PHY layer being the peer layer of the PHY layer of the IAB node 2. The protocol stack for communication with the DU includes, in sequence from top to bottom, an Adapt layer being a peer layer of an Adapt layer of the DU, an RLC layer being a peer layer of an RLC layer of the DU, a MAC layer being a peer layer of a MAC layer of the DU, and a PHY layer being a peer layer of a PHY layer of the DU. A protocol stack of the DU includes a protocol stack for communication with the IAB node 1 and a protocol stack for communication with the CU. The protocol stack for communication with the IAB node 1 includes, in sequence from top to bottom, the Adapt layer being the peer layer of the Adapt layer of the IAB node 1, the RLC layer being the peer layer of the RLC layer of the IAB node 1, the MAC layer being the peer layer of the MAC layer of the IAB node 1, and the PHY layer being the peer layer of the PHY layer of the IAB node 1. The protocol stack for communication with the CU includes, in sequence from top to bottom, an Adapt layer being a peer layer of an Adapt layer of the CU, a GTP layer being a peer layer of a GTP layer of the CU, a UDP layer being a peer layer of a UDP layer of the CU, an IP layer being a peer layer of an IP layer of the CU, and an L1/L2 layer being a peer layer of an L1/L2 layer of the CU. A protocol stack of the CU includes a protocol stack for communication with the DU and a protocol stack for communication with the UPF. The protocol stack for communication with the DU includes, in sequence from top to bottom, the SDAP layer being the peer layer of the SDAP layer of the UE, the PDCP layer being the peer layer of the PDCP layer of the UE, the Adapt layer being the peer layer of the Adapt layer of the DU, the GTP layer being the peer layer of the GTP layer of the DU, the UDP layer being the peer layer of the UDP layer of the DU, the IP layer being the peer layer of the IP layer of the DU, and the L1/L2 layer being the peer layer of the L1/L2 layer of the DU. The protocol stack for communication with the UPF includes a GTP-U layer, a UDP layer, an IP layer, and an L1/L2 layer in sequence from top to bottom. A protocol stack of the UPF includes, in sequence from top to bottom, the PDU layer being the peer layer of the PDU layer of the UE, the GTP-U layer being the peer layer of the GTP-U layer of the CU, the UDP layer being the peer layer of the UDP layer of the CU, the IP layer being the peer layer of the IP layer of the CU, and the L1/L2 layer being the peer layer of the L1/L2 layer of the CU.

In a control plane multi-hop protocol architecture shown in FIG. 22, related network elements include UE, an IAB node 2, an IAB node 1, a DU, a CU, and a control plane network element (for example, an AMF). A protocol stack of the UE includes a NAS layer, an RRC layer, a PDCP layer, an RLC layer, a MAC layer, and a PHY layer in sequence from top to bottom. A protocol stack of the IAB node 2 includes a protocol stack for communication with the UE and a protocol stack for communication with the IAB node 1. The protocol stack for communication with the UE includes, in sequence from top to bottom, an RLC layer being a peer layer of the RLC layer of the UE, a MAC layer being a peer layer of the MAC layer of the UE, and a PHY layer being a peer layer of the PHY layer of the UE. The protocol stack for communication with the IAB node 1 includes a T1AP layer, a PDCP layer, an Adapt layer, an RLC layer, a MAC layer, and a PHY layer in sequence from top to bottom. The T1AP layer is a peer layer of a T1AP layer of the CU. A protocol stack of the IAB node 1 includes a protocol stack being a peer protocol stack of the protocol stack of the IAB node 2 and a protocol stack being a peer protocol stack of a protocol stack of the DU. The protocol stack being the peer protocol stack of the protocol stack of the IAB node 2 includes an Adapt layer, an RLC layer, a MAC layer, and a PHY layer in sequence from top to bottom. The protocol stack being the peer protocol stack of the protocol stack of the DU includes an Adapt layer, an RLC layer, a MAC layer, and a PHY layer in sequence from top to bottom. The protocol stack of the DU includes the protocol stack being the peer protocol stack of the protocol stack of the IAB node 1 and a protocol stack being a peer protocol stack of a protocol stack of the CU. The protocol stack being the peer protocol stack of the protocol stack of the IAB node 1 includes an Adapt layer, an RLC layer, a MAC layer, and a PHY layer in sequence from top to bottom. The protocol stack being the peer protocol stack of the protocol stack of the CU includes an Adapt layer, an F1AP layer, an SCTP layer, an IP layer, and an L1/L2 layer in sequence from top to bottom. A protocol stack of the CU includes a protocol stack for communication with the UE, the IAB node, and the DU, and a protocol stack for communication with the AMF. The protocol stack for communication with the UE, the IAB node, and the DU includes, from top to bottom, an RRC layer being a peer layer of the RRC layer of the UE, a PDCP layer being a peer layer of the PDCP layer of the UE, a T1AP layer being a peer layer of the T1AP layer of the IAB node 2, a PDCP layer being a peer layer of the PDCP layer of the IAB node 2, an Adapt layer being a peer layer of the Adapt layer of the DU, an F1AP layer being a peer layer of the F1AP layer of the DU, an SCTP layer being a peer layer of the SCTP layer of the DU, an IP layer being a peer layer of the IP layer of the DU, and an L1/L2 layer being a peer layer of the L1/L2 layer of the DU. The protocol stack for communication with the AMF includes an NGAP layer, an SCTP layer, an IP layer, and an L1/L2 layer in sequence from top to bottom. A protocol stack of the AMF includes, in sequence from top to bottom, a NAS layer being a peer layer of the NAS layer of the UE, an NGAP layer being a peer layer of an NGAP layer of the DU, an SCTP layer being a peer layer of the SCTP layer of the DU, an IP layer being a peer layer of the IP layer of the DU, and an L1/L2 layer being a peer layer of the L1/L2 layer of the DU.

Based on the protocol stack architectures shown in FIG. 21 and FIG. 22, in still another embodiment of this application, an adaptation layer of a downlink data packet (a user plane data packet or a control plane data packet) is added by the CU. For the DU, an adaptation layer being a peer layer of an adaptation layer of the CU may be configured on an F1 interface, and an adaptation layer being a peer layer of an adaptation layer of the IAB node 1 is configured on a Un interface. In FIG. 21, the GTP layer, the UDP layer, and the IP layer that are shown in dashed-line boxes and that are on the F1 interface between the CU and the DU are optional protocol layers. That is, the GTP layer, UDP layer, and IP layer may not be configured on the F1 interface between the CU and the DU. Alternatively, some protocol layers of the GTP layer/UDP layer/IP layer are not configured on the F1 interface between the CU and the DU (for example, the GTP layer and the UDP layer are not configured on the F1 interface between the CU and the DU, and the IP layer is configured on the F1 interface between the CU and the DU). Optionally, based on the protocol architecture shown in FIG. 21, there may be another changed protocol architecture. For example, peer GTP layers may further be configured on an interface between the IAB node 2 and the CU (for example, below the GTP layers, there may further be peer UDP layers and peer IP layers, and optionally, the UDP layer and the IP layer are optional protocol layers, that is, the UDP layer and the IP layer may not be configured). Corresponding to a DRB of the UE, the GTP layer of the IAB node 2 is located above the Adapt layer. The GTP layer of the CU is located between the PDCP layer and the Adapt layer. For details, refer to the peer GTP layers of the IAB node 2 and the CU in FIG. 9 for understanding.

In this embodiment of this application, the adaptation layer may be directly added by the CU. Therefore, additional information (for example, an identifier of the IAB node, and indication information used to indicate a type of a message of a payload carried in a data packet) of the data packet on the F1 interface described in the solutions described in FIG. 19A, FIG. 19B, FIG. 19C, FIG. 20A. FIG. 20B, and FIG. 20C may be directly carried by the adaptation layer, and does not need to be modified at a protocol layer such as the GTP layer or the F1AP layer of the existing F1 interface.

In the protocol stacks shown in FIG. 21 and FIG. 22, for a transmission manner of a user plane data packet, refer to the solutions described in FIG. 19A, FIG. 19B, FIG. 19C, FIG. 20A, FIG. 20B, and FIG. 20C. For a transmission manner of a control plane data packet, refer to the solutions described in FIG. 19A, FIG. 19B, FIG. 19C, FIG. 20A, FIG. 20B, and FIG. 20C and the foregoing embodiments. In the protocol stacks shown in FIG. 21 and FIG. 22, processes of adding the adaptation layer of the downlink data packet and removing an adaptation layer from an uplink data packet are performed at the CU. For another process, refer to the solutions described in FIG. 19A, FIG. 19B, FIG. 19C, FIG. 20A, FIG. 20B, and FIG. 20C. This is not limited in this application.

Figure 23:
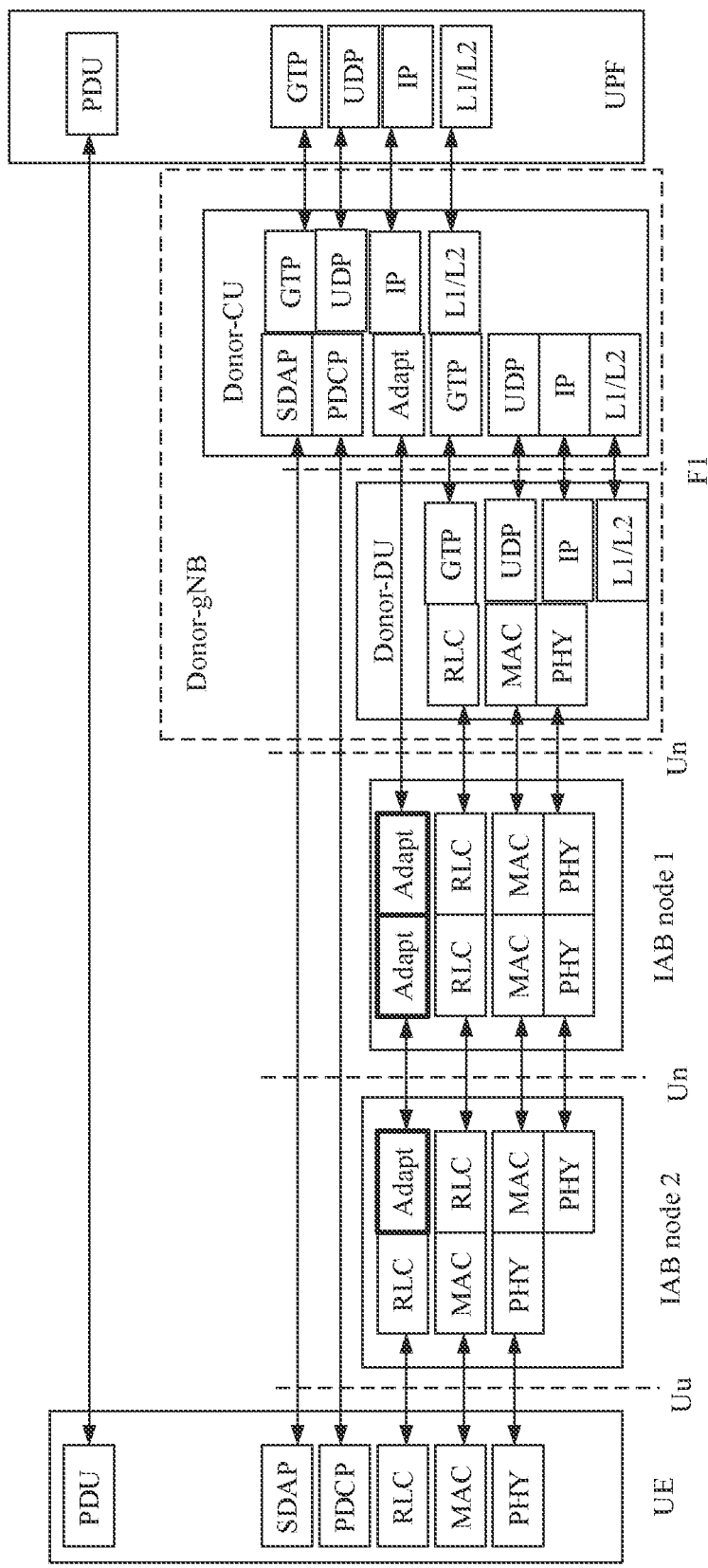
FIG. 23 is a ninth schematic architectural diagram of a protocol stack according to an embodiment of this application.

FIG. 23 shows another user plane multi-hop protocol architecture according to an embodiment of this application. A difference between the protocol stack architecture shown in FIG. 23 and the protocol stack architecture shown in FIG. 21 lies in that: In FIG. 23, neither a protocol stack that is included in the DU and that is a peer protocol stack of a protocol stack of the IAB node 1 nor a protocol stack that is included in the DU and that is for communication with the CU has an Adapt layer.

Figure 24:
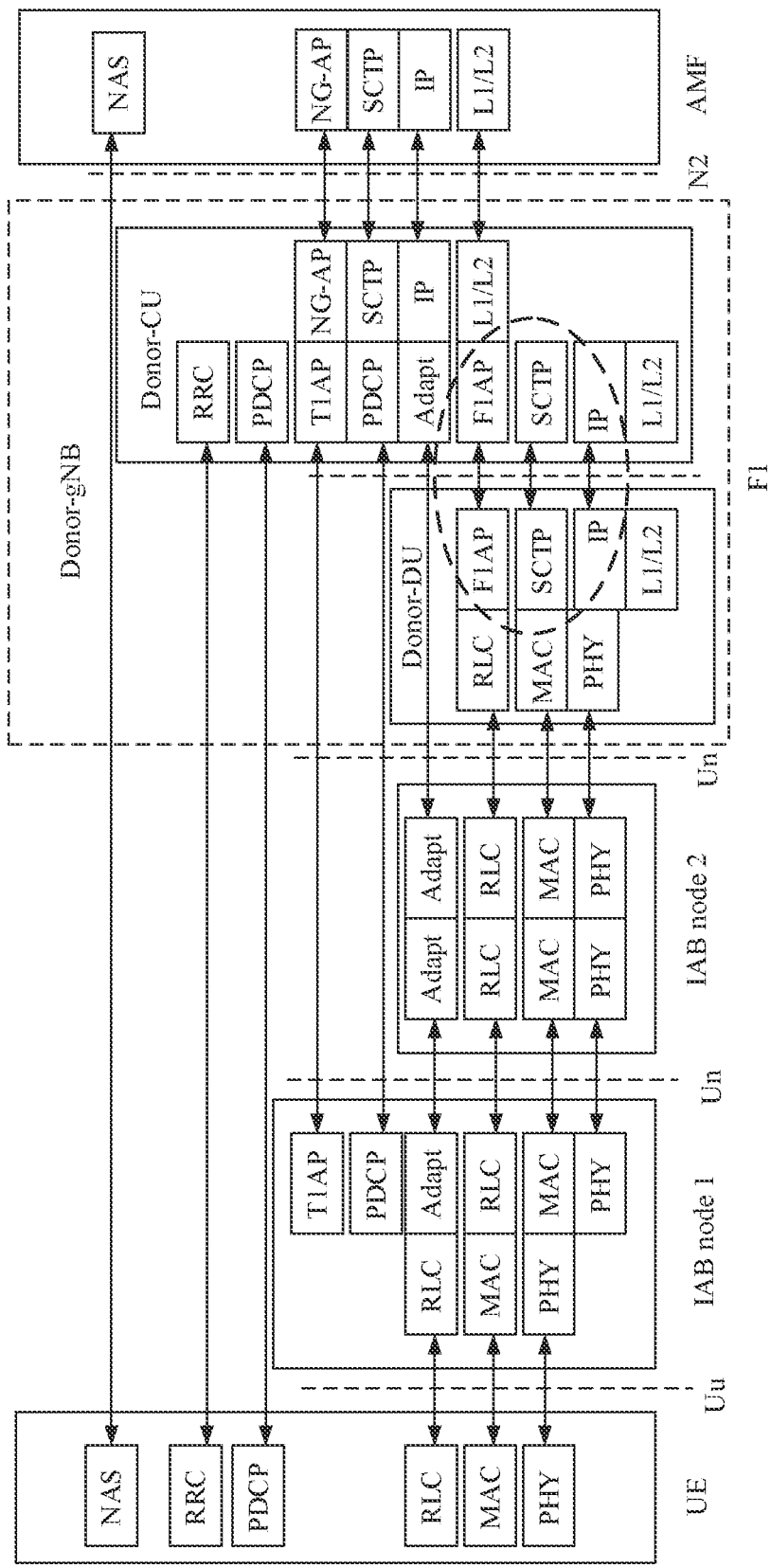
FIG. 24 is a tenth schematic architectural diagram of a protocol stack according to an embodiment of this application.

FIG. 24 shows another control plane multi-hop protocol architecture according to an embodiment of this application. A difference between the protocol stack shown in FIG. 24 and the control plane protocol stack shown in FIG. 22 lies in that: A protocol stack of the DU does not include an Adapt layer being a peer layer of an Adapt layer of the IAB node 1, and does not include an Adapt layer being a peer layer of an Adapt layer of the CU either.

Based on FIG. 23 and FIG. 24, an embodiment of this application further provides another configuration method. In FIG. 23, a GTP layer, a UDP layer, and an IP layer that are shown on an F1 interface between the CU and the DU are optional protocol layers. That is, the GTP layer, the UDP layer, and the IP layer may not be configured on the F1 interface between the CU and the DU. Alternatively, some protocol layers of the GTP layer, the UDP layer, and the IP layer are not configured (for example, the GTP layer and the UDP layer are not configured on the F1 interface between the CU and the DU, and the IP layer is configured on the F1 interface between the CU and the DU).

Optionally, based on the protocol architecture shown in FIG. 23, there may be another changed protocol architecture. For example, peer GTP layers may further be configured for the IAB node 2 and the CU (below the GTP layer, there may be peer UDP layers and peer IP layers, and optionally, the UDP layer and the IP layer are also optional protocol layers, that is, the UDP layer and the IP layer may not be configured for the IAB node 2 and the CU). Corresponding to a DRB of the UE, the GTP layer of the IAB node 2 is located above the Adapt layer, and the GTP layer of the CU is located between the PDCP layer and the Adapt layer. For details, refer to the peer GTP layers of the IAB node 2 and the CU in FIG. 9 for understanding.

Based on the protocol stacks shown in FIG. 23 and FIG. 24, an adaptation layer of a downlink data packet (a user plane data packet or a control plane data packet) is added by the CU. For a specific process of obtaining adaptation information on the IAB node and the DU, refer to the descriptions in the embodiments shown in FIG. 21 and FIG. 22.

It should be noted that a difference between the embodiments shown in FIG. 23 and FIG. 24 and the embodiments shown in FIG. 21 and FIG. 22 lies in that: No adaptation layer may be configured for the DU, that is, the DU does not parse information in a data packet at the adaptation layer, but needs to send a user plane or control plane data packet to the IAB node 1 on the Un interface between the DU and the IAB node 1 over a specified SRB or DRB based on information carried in a data packet on the F1 interface. Therefore, for indication information that is used to indicate a type of a message carried in the data packet and that needs to be carried in the data packet on the F1 interface, refer to the solutions in FIG. 19A, FIG. 19B, FIG. 19C, FIG. 20A, FIG. 20B, and FIG. 20C for understanding.

It may be understood that, with reference to the foregoing descriptions of the difference, a format of a data packet in a node transmission process, especially a format of the data packet on the F1 interface, adaptively varies with the protocol stacks in FIG. 23 and FIG. 24.

It should be noted that, in the embodiments of this application, for a donor gNodeB in a CU-DU split form, the adaptation information added to the DU may be notified by the CU to the DU. Specifically, the CU may notify the DU in the following manner:

Case 1: The CU directly adds adaptation information to a data packet to be sent to the UE or the IAB node.

In the protocol stack architectures shown in FIG. 7 to FIG. 10, for a data packet transmitted through a user plane, adaptation information may be carried in a processing process of the peer GTP protocol layers of the CU and the DU on the F1 interface. For example, a GTP tunnel on the F1 interface corresponds one-to-one to a DRB of UE. The DU may learn of UE corresponding to the data packet and a DRB of the UE by using a TEID in GTP header information. In addition, the CU may further include other adaptation information in the GTP header information. Alternatively, a GTP tunnel on the F1 interface corresponds one-to-one to a DRB of a child node (namely, a first-level child node directly connected to the DU, which may be UE or an IAB node directly connected to the DU) of the DU, and a part or all of the adaptation information may be carried in a GTP header.

For another example, in the protocol architectures shown in FIG. 11 and FIG. 12, for a control plane data packet, adaptation information may be carried in a processing process of the peer F1AP protocol layers of the CU and the DU on the F1 interface.

Alternatively, adaptation information is carried in a processing process of the peer IP protocol layers of the CU and the DU on the F1 interface (for example, a DSCP of the data packet is carried in IP header information, and other adaptation information may further be carried at the IP layer).

Alternatively, on the F1 interface, if there are further peer Adapt layers of the DU and the CU, the CU carries adaptation information by using the Adapt layer.

In this case, the DU may add, to an adaptation layer of the user plane data packet or the control plane data packet to be sent by the DU to the IAB node, the adaptation information included by the CU in the data packet, and send, based on routing configuration and QoS mapping-related information that are included in the adaptation information, the data packet to a correct next-hop node. The DU may receive, in advance by using a control plane F1AP message, routing configuration sent by the CU. A configuration process may be understood with reference to FIG. 19A, FIG. 19B, and FIG. 19C. On the other hand, the DU may further receive, by using a control plane F1AP message sent by the CU, QoS mapping-related configuration information. A configuration process may be understood with reference to FIG. 20A, FIG. 20B, and FIG. 20C.

Case 2: The adaptation layer is configured by using a control plane message. A data packet sent by the CU to the UE or the IAB node carries an index, and the index is used by the DU to determine, based on previously received configuration information, adaptation information associated with the index. After the adaptation information associated with the index is determined, the adaptation information is added to the data packet in a processing process of the adaptation layer.

A same part between Case 1 and Case 2 is that adaptation information that needs to be added by the DU to a data packet also needs to be preconfigured by the CU for the DU by using a control plane message. Some adaptation information (for example, routing-related information such as identifiers of a child node and a descendant child node of each node, a transmission path identifier, and a next-hop node identifier) is configured for the DU and the IAB node when the IAB node accesses a network. The other part UE-related adaptation information needs to be configured for the IAB node and the DU by using a control plane message when the UE accesses the network and sets up a PDU session. The control plane message may be, for example, an F1AP message sent by the CU to the DU, and an RRC message or a T1AP message sent by the CU to the IAB node.

For example, FIG. 7 to FIG. 12 and FIG. 21 to FIG. 24 are schematic architectural diagrams of user plane and control plane protocol stacks in a networking scenario of two IAB nodes. Certainly, in actual application, there may be any quantity of IAB nodes, a user can be expanded to a networking scenario of a single IAB node or any quantity of IAB nodes. For example, if the IAB node 1 in FIG. 7 to FIG. 12 and FIG. 21 to FIG. 24 is removed, a single IAB node networking scenario is formed. Alternatively, in actual application, any quantity of other IAB nodes may be added between the IAB node 2 and the IAB node 1, to expand to a networking scenario of more than two IAB nodes. For protocol stack on an interface between the newly added IAB node and the IAB node 1 or the IAB node 2, refer to the protocol stacks of the IAB node 1 and the IAB node 2 for understanding.

It should be noted that, in FIG. 11, FIG. 22, and FIG. 24 in the embodiments of this application, if an IAB node uses a DRB for transmission through a backhaul link, the F1AP layers, the SCTP layers, and the IP layers on the F1 interface between the CU and the DU may be replaced with GTP layers, UDP layers, and IP layers. In this case, a T1AP message of the IAB node is transmitted through a user plane transmission channel on the F1 interface.

The foregoing mainly describes the solutions in the embodiments of this application from a perspective of interaction between the network elements. It may be understood that, to implement the foregoing functions, each network element such as the uplink data transmission apparatus, the downlink data transmission apparatus, or the configuration apparatus includes a corresponding hardware structure and/or software module for performing each function. A person skilled in the art should easily be aware that, in combination with units and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the uplink data transmission apparatus, the downlink data transmission apparatus, and the configuration apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, the division into the units is an example, and is merely a logical function division. In an actual implementation, another division manner may be used.

Figure 25:
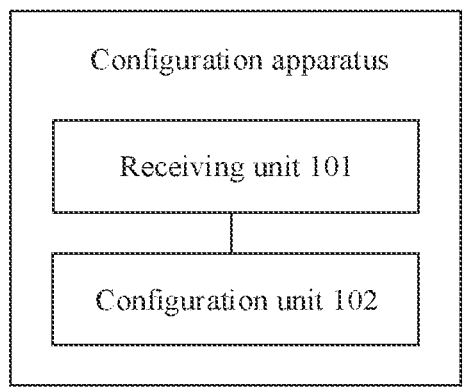
FIG. 25 is a first schematic structural diagram of a configuration apparatus according to an embodiment of this application.

When an integrated unit is used, FIG. 25 is a schematic diagram of a possible structure of the configuration apparatus in the foregoing embodiments. The configuration apparatus may be a first device or a chip in a first device. The configuration apparatus includes a receiving unit 101 and a configuration unit 102. The receiving unit 101 is configured to support the configuration apparatus in performing S102 in the foregoing embodiment. The configuration unit 102 is configured to support the configuration apparatus in performing S103 in the foregoing embodiment.

In an optional implementation, the receiving unit 101 is further configured to support the configuration apparatus in performing S106, S108, and S110 in the foregoing embodiment.

Optionally, the first device may further include a sending unit 103, configured to support the configuration apparatus unit in performing S104 in the foregoing embodiment. All related content of the steps in the foregoing method embodiments may be cited in function descriptions of the corresponding functional modules, and details are not described herein again.

Figure 26:
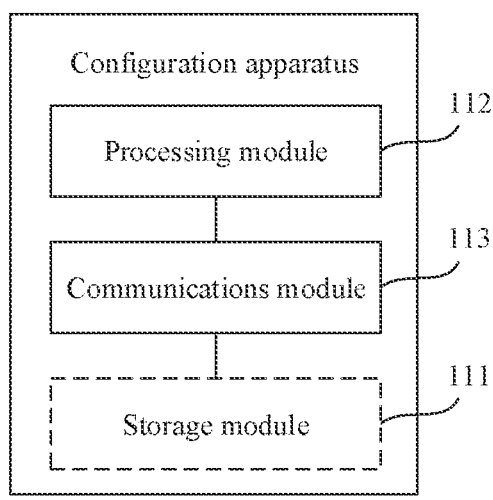
FIG. 26 is a second schematic structural diagram of a configuration apparatus according to an embodiment of this application.

When an integrated unit is used, FIG. 26 is a schematic diagram of a possible logical structure of the configuration apparatus in the foregoing embodiments. The configuration apparatus may be the first device in the foregoing embodiments, or may be a chip applied to the first device. The configuration apparatus includes a processing module 112 and a communications module 113. The processing module 112 is configured to control and manage an action of the configuration apparatus.

For example, the processing module 112 is configured to perform a step of processing a message or data on a side of the configuration apparatus, for example, support the configuration apparatus in performing S103 in the foregoing embodiment. The communications module 113 is configured to support the configuration apparatus in performing S102 in the foregoing embodiment.

In an optional implementation, the communications module 113 is further configured to support the configuration apparatus in performing S104, S106, S108, and S110 in the foregoing embodiment, and/or another process that is used for the technology described in this specification and that is performed by the configuration apparatus.

Optionally, the configuration apparatus may further include a storage module 111, configured to store program code and data that are of the configuration apparatus.

The processing module 112 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 112 may implement or execute various example logical blocks, modules, and circuits described with reference to content disclosed in this application. Alternatively, the processing module 112 may be a combination of processors implementing a computing function, for example, a combination of one or more microprocessors or a combination of the digital signal processor and a microprocessor. The communications module 113 may be a transceiver, a transceiver circuit, a communications interface, or the like. The storage module 111 may be a memory.

Figure 27:
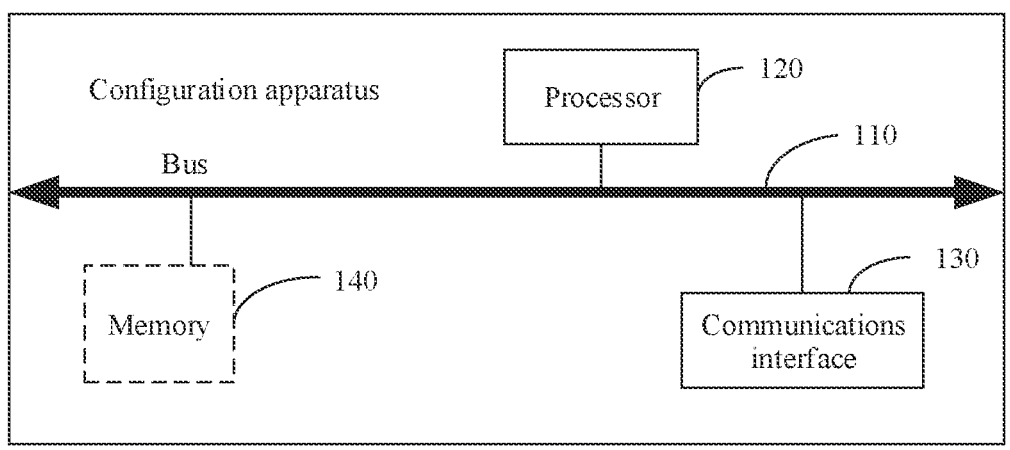
FIG. 27 is a third schematic structural diagram of a configuration apparatus according to an embodiment of this application.

When the processing module 112 is a processor 120, the communications module 113 is a communications interface 130 or a transceiver, and the storage module 111 is a memory 140, the configuration apparatus in this application may be a device shown in FIG. 27.

The communications interface 130, one or more (including two) processors 120, and the memory 140 are connected to each other through a bus 110. The bus 110 may be a PCI bus, an EISA bus, or the like. The bus may be classified into an address bus, a data bus, a control bus, and the like. For ease of representation, only one thick line is used to represent the bus in FIG. 27, but this does not mean that there is only one bus or only one type of bus. The memory 140 is configured to store the program code and the data that are of the configuration apparatus. The communications interface 130 is configured to support the configuration apparatus in communicating with another device (for example, a second device). The processor 120 is configured to support the configuration apparatus in executing the program code and the data that are stored in the memory 140, to implement S102, S103, S104, S106, S108, and S110 provided in this application.

Figure 28:
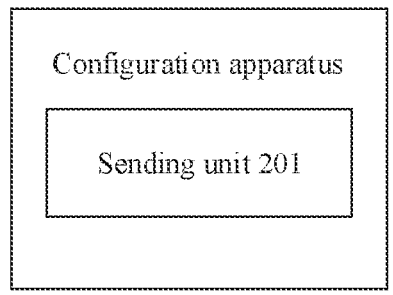
FIG. 28 is a fourth schematic structural diagram of a configuration apparatus according to an embodiment of this application.

When an integrated unit is used, FIG. 28 is a schematic diagram of a possible structure of the configuration apparatus in the foregoing embodiments. The configuration apparatus may be a RAN device or a chip in a RAN device. The configuration apparatus includes a sending unit 201. The sending unit 201 is configured to support the configuration apparatus in performing S101 in the foregoing embodiment. In an optional implementation, the sending unit 201 is further configured to support the configuration apparatus in performing S105, S107, and S109 in the foregoing embodiment. All related content of the steps in the foregoing method embodiments may be cited in function descriptions of the corresponding functional modules, and details are not described herein again.

Figure 29:
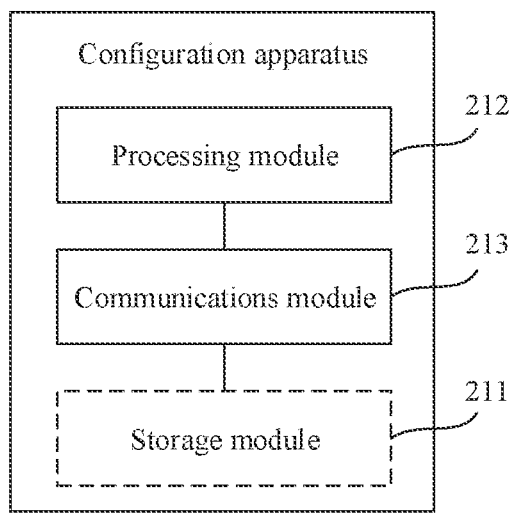
FIG. 29 is a fifth schematic structural diagram of a configuration apparatus according to an embodiment of this application.

When an integrated unit is used, FIG. 29 is a schematic diagram of a possible logical structure of the configuration apparatus in the foregoing embodiments. The configuration apparatus may be the RAN device in the foregoing embodiments, or may be a chip applied to the RAN device. The configuration apparatus includes a processing module 212 and a communications module 213. The processing module 212 is configured to control and manage an action of the configuration apparatus. For example, the processing module 212 is configured to perform a step of performing message or data processing on a side of the configuration apparatus. The communications module 213 is configured to support the configuration apparatus in performing S101 in the foregoing embodiment. In an optional implementation, the communications module 213 is further configured to support the configuration apparatus in performing S105, S107, and S109 in the foregoing embodiment, and/or another process that is used for the technology described in this specification and that is performed by the configuration apparatus.

Optionally, the configuration apparatus may further include a storage module 211, configured to store program code and data that are of the configuration apparatus.

The processing module 212 may be a processor or controller, for example, may be a central processing unit, a general purpose processor, a digital signal processor, an application-specific integrated circuit, a field programmable gate array or another programmable logic device, a transistor logic device, a hardware component, or any combination thereof. The processing module 212 may implement or execute various example logical blocks, modules, and circuits described with reference to content disclosed in this application. Alternatively, the processing module 212 may be a combination of processors implementing a computing function, for example, a combination of one or more microprocessors or a combination of a digital signal processor and a microprocessor. The communications module 213 may be a transceiver, a transceiver circuit, a communications interface, or the like. The storage module 211 may be a memory.

Figure 30:
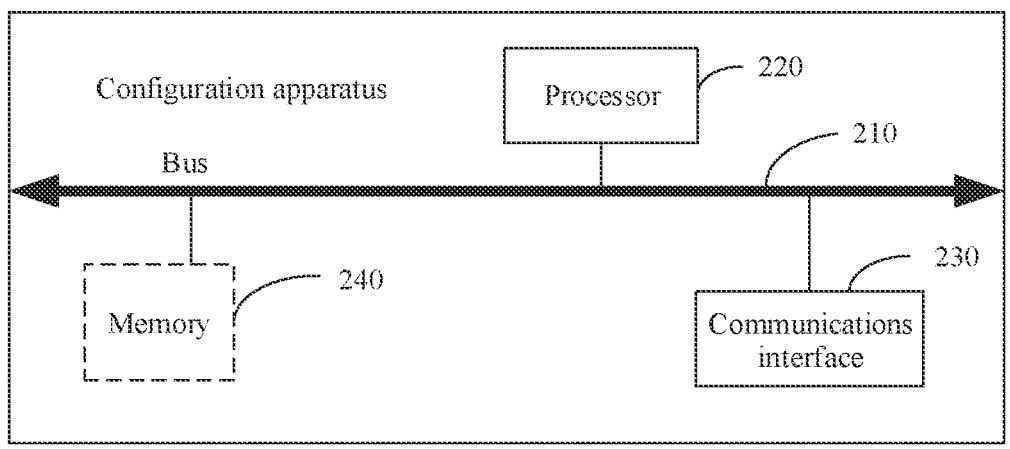
FIG. 30 is a sixth schematic structural diagram of a configuration apparatus according to an embodiment of this application.

When the processing module 212 is a processor 220, the communications module 213 is a communications interface 230 or a transceiver, and the storage module 211 is a memory 240, the configuration apparatus in this application may be a device shown in FIG. 30.

The communications interface 230, one or more (including two) processors 220, and the memory 240 are connected to each other through a bus 210. The bus 210 may be a PCI bus, an EISA bus, or the like. The bus may be classified into an address bus, a data bus, a control bus, and the like. For ease of representation, only one thick line is used to represent the bus in FIG. 30, but this does not mean that there is only one bus or only one type of bus. The memory 240 is configured to store the program code and the data that are of the configuration apparatus. The communications interface 230 is configured to support the configuration apparatus in communicating with another device (for example, a second device). The processor 220 is configured to support the configuration apparatus in executing the program code and the data that are stored in the memory 240, to implement S101 provided in this application. In an optional implementation, the processor 220 is further configured to support the configuration apparatus in executing the program code and the data that are stored in the memory 240, to implement S105, S107, and S109 provided in this application.

Figure 31:
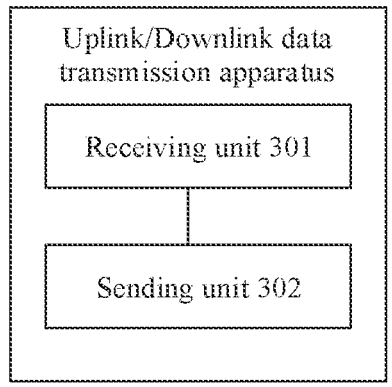
FIG. 31 is a first schematic structural diagram of an uplink/downlink data transmission apparatus according to an embodiment of this application.

When an integrated unit is used, FIG. 31 is a schematic diagram of a possible structure of the uplink/downlink data transmission apparatus in the foregoing embodiments. The uplink/downlink data transmission apparatus may be a first device or a chip in a first device. The uplink/downlink data transmission apparatus includes a receiving unit 301 and a sending unit 302. The receiving unit 301 is configured to support the uplink/downlink data transmission apparatus in performing S203 and S303 in the foregoing embodiments. The sending unit 302 is configured to support the uplink/downlink data transmission apparatus in performing S204 and S304 in the foregoing embodiments. All related content of the steps in the foregoing method embodiments may be cited in function descriptions of the corresponding functional modules, and details are not described herein again.

Figure 32:
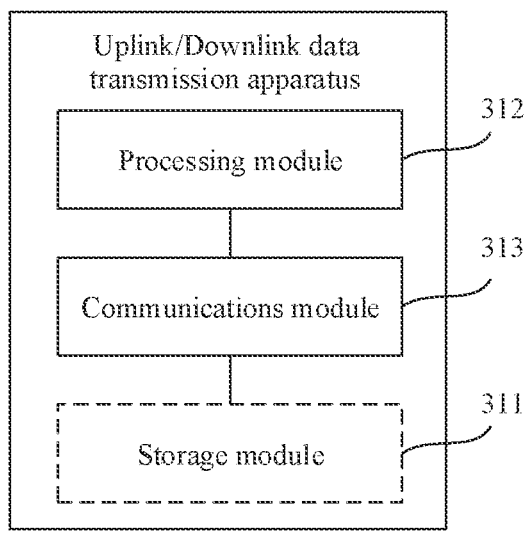
FIG. 32 is a second schematic structural diagram of an uplink/downlink data transmission apparatus according to an embodiment of this application.

When an integrated unit is used, FIG. 32 is a schematic diagram of a possible logical structure of the uplink/downlink data transmission apparatus in the foregoing embodiments. The uplink/downlink data transmission apparatus may be the first device in the foregoing embodiments, or may be a chip applied to the first device. The uplink/downlink data transmission apparatus includes a processing module 312 and a communications module 313. The processing module 312 is configured to control and manage an action of the uplink/downlink data transmission apparatus. For example, the processing module 312 is configured to perform a step of performing message or data processing on a side of the uplink/downlink data transmission apparatus, for example, support the uplink/downlink data transmission apparatus in performing S203 and S303 in the foregoing embodiments. The communications unit 313 is configured to support the uplink/downlink data transmission apparatus in performing S204 and S304 in the foregoing embodiments, and/or another process that is used for the technology described in this specification and that is performed by the uplink/downlink data transmission apparatus.

Optionally, the uplink/downlink data transmission apparatus may further include a storage module 311, configured to store program code and data that are of the uplink/downlink data transmission apparatus.

The processing module 312 may be a processor or controller, for example, may be a central processing unit, a general purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in this application. Alternatively, the processing module 312 may be a combination of processors implementing a computing function, for example, a combination of one or more microprocessors or a combination of a digital signal processor and a microprocessor. The communications module 313 may be a transceiver, a transceiver circuit, a communications interface, or the like. The storage module 311 may be a memory.

Figure 33:
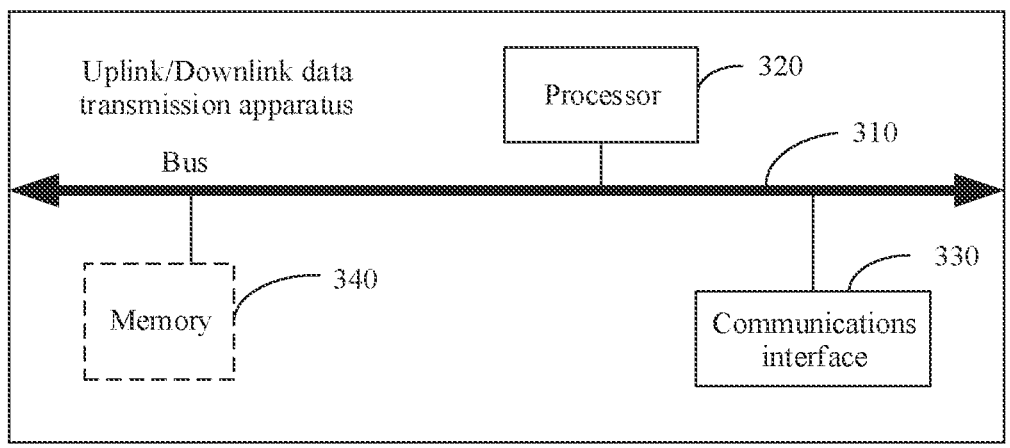
FIG. 33 is a third schematic structural diagram of an uplink/downlink data transmission apparatus according to an embodiment of this application.

When the processing module 312 is a processor 320, the communications module 313 is a communications interface 330 or a transceiver, and the storage module 311 is a memory 340, the uplink/downlink data transmission apparatus in this application may be a device shown in FIG. 33.

The communications interface 330, one or more (including two) processors 320, and the memory 340 are connected to each other through a bus 310. The bus 310 may be a PCI bus, an EISA bus, or the like. The bus may be classified into an address bus, a data bus, a control bus, and the like. For ease of representation, only one thick line is used to represent the bus in FIG. 33, but this does not mean that there is only one bus or only one type of bus. The memory 340 is configured to store the program code and the data that are of the uplink/downlink data transmission apparatus. The communications interface 330 is configured to support the uplink/downlink data transmission apparatus in communicating with another device (for example, a third device or a second device). The processor 320 is configured to support the configuration apparatus in executing the program code and the data that are stored in the memory 340, to implement S203, S204, S303, and S304 provided in this application.

Figure 34:
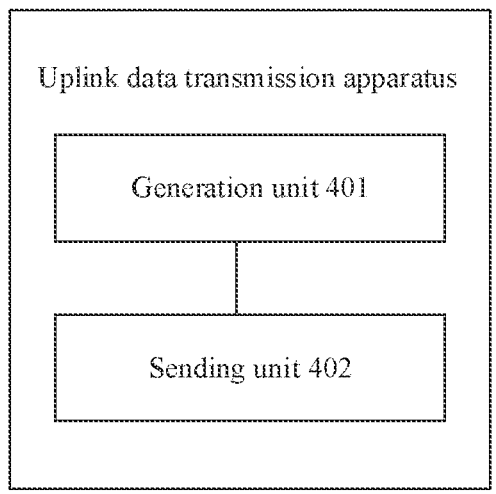
FIG. 34 is a first schematic structural diagram of an uplink data transmission apparatus according to an embodiment of this application.

When an integrated unit is used, FIG. 34 is a schematic diagram of a possible structure of the uplink data transmission apparatus in the foregoing embodiments. The uplink data transmission apparatus may be a second device or a chip in a second device. The uplink data transmission apparatus includes a generation unit 401 and a sending unit 402. The generation unit 401 is configured to support the uplink data transmission apparatus in performing S201 in the foregoing embodiment. The sending unit 402 is configured to support the uplink data transmission apparatus in performing S202 in the foregoing embodiment. All related content of the steps in the foregoing method embodiments may be cited in function descriptions of the corresponding functional modules, and details are not described herein again.

Figure 35:
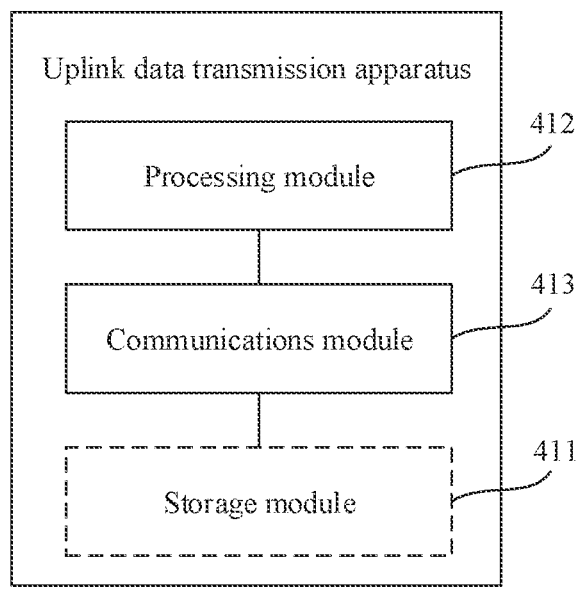
FIG. 35 is a second schematic structural diagram of an uplink data transmission apparatus according to an embodiment of this application.

When an integrated unit is used, FIG. 35 is a schematic diagram of a possible logical structure of the uplink data transmission apparatus in the foregoing embodiments. The uplink data transmission apparatus may be the second device in the foregoing embodiments, or may be a chip applied to the second device. The uplink data transmission apparatus includes a processing module 412 and a communications module 413. The processing module 412 is configured to control and manage an action of the uplink data transmission apparatus. For example, the processing module 412 is configured to perform a step of performing message or data processing on a side of the uplink data transmission apparatus, for example, support the uplink data transmission apparatus in performing S201 in the foregoing embodiment. The communications module 413 is configured to support the uplink data transmission apparatus in performing S202 in the foregoing embodiment, and/or another process that is used for the technology described in this specification and that is performed by the uplink data transmission apparatus.

Optionally, the uplink data transmission apparatus may further include a storage module 411, configured to store program code and data that are of the uplink data transmission apparatus.

The processing module 412 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 412 may implement or execute various example logical blocks, modules, and circuits described with reference to content disclosed in this application. Alternatively, the processing module 412 may be a combination of processors implementing a computing function, for example, a combination of one or more microprocessors or a combination of a digital signal processor and a microprocessor. The communications module 413 may be a transceiver, a transceiver circuit, a communications interface, or the like. The storage module 411 may be a memory.

Figure 36:
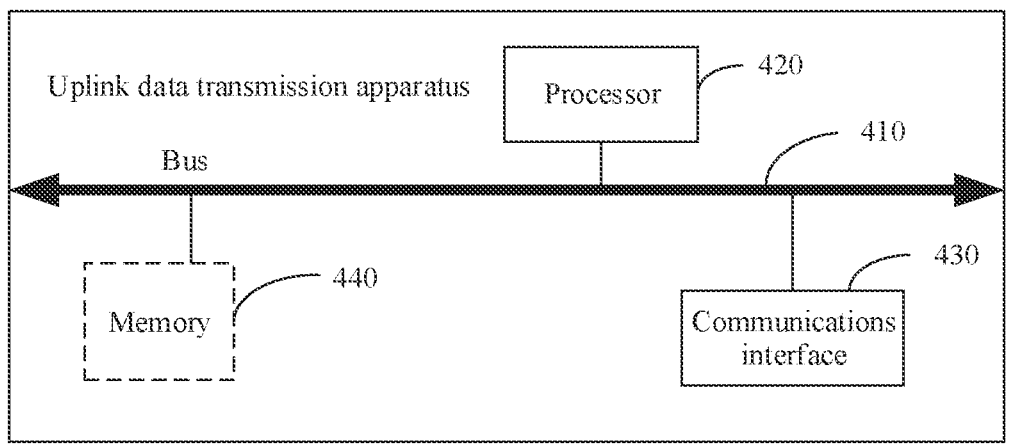
FIG. 36 is a third schematic structural diagram of an uplink data transmission apparatus according to an embodiment of this application.

When the processing module 412 is a processor 420, the communications module 413 is a communications interface 430 or a transceiver, and the storage module 411 is a memory 440, the uplink data transmission apparatus in this application may be a device shown in FIG. 36.

The communications interface 430, one or more (including two) processors 420, and the memory 440 are connected to each other through a bus 410. The bus 410 may be a PCI bus, an EISA bus, or the like. The bus may be classified into an address bus, a data bus, a control bus, and the like. For ease of representation, only one thick line is used to represent the bus in FIG. 36, but this does not mean that there is only one bus or only one type of bus. The memory 440 is configured to store the program code and the data that are of the uplink data transmission apparatus. The communications interface 430 is configured to support the uplink data transmission apparatus in communicating with another device (for example, a first device). The processor 420 is configured to support the uplink data transmission apparatus in executing the program code and the data that are stored in the memory 440, to implement S201 and S202 provided in this application.

Figure 37:
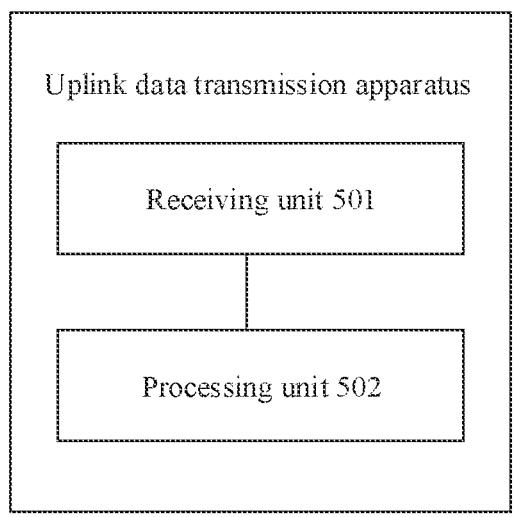
FIG. 37 is a fourth schematic structural diagram of an uplink data transmission apparatus according to an embodiment of this application.

When an integrated unit is used, FIG. 37 is a schematic diagram of a possible structure of the uplink data transmission apparatus in the foregoing embodiments. The uplink data transmission apparatus may be a third device or a chip in a third device. The uplink data transmission apparatus includes a receiving unit 501 and a sending unit 502. The receiving unit 501 is configured to support the uplink data transmission apparatus in performing S205 in the foregoing embodiment. The processing unit 502 is configured to support the uplink data transmission apparatus in performing S206 in the foregoing embodiment. All related content of the steps in the foregoing method embodiments may be cited in function descriptions of the corresponding functional modules, and details are not described herein again.

Figure 38:
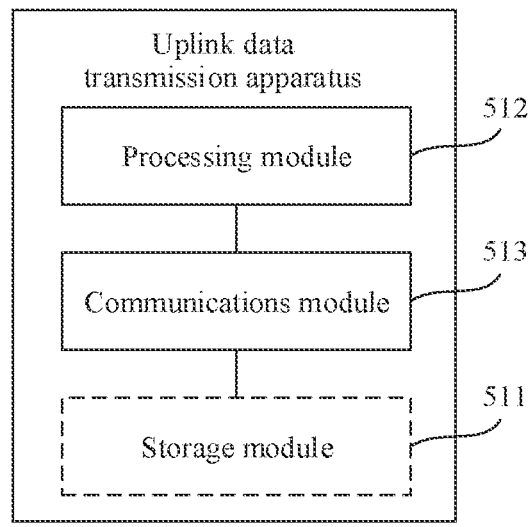
FIG. 38 is a fifth schematic structural diagram of an uplink data transmission apparatus according to an embodiment of this application.

When an integrated unit is used, FIG. 38 is a schematic diagram of a possible logical structure of the uplink data transmission apparatus in the foregoing embodiments. The uplink data transmission apparatus may be the third device in the foregoing embodiments, or may be a chip applied to the third device. The uplink data transmission apparatus includes a processing module 512 and a communications module 513. The processing module 512 is configured to control and manage an action of the uplink data transmission apparatus. For example, the processing module 512 is configured to perform a step of performing message or data processing on a side of the uplink data transmission apparatus, for example, support the uplink data transmission apparatus in performing S206 in the foregoing embodiment. The communications module 513 is configured to support the uplink data transmission apparatus in performing S205 in the foregoing embodiment, and/or another process that is used for the technology described in this specification and that is performed by the uplink data transmission apparatus.

Optionally, the uplink data transmission apparatus may further include a storage module 511, configured to store program code and data that are of the uplink data transmission apparatus.

The processing module 512 may be a processor or controller, for example, may be a central processing unit, a general purpose processor, a digital signal processor, an application-specific integrated circuit, a field programmable gate array or another programmable logic device, a transistor logic device, a hardware component, or any combination thereof. The processing module 512 may implement or execute various example logical blocks, modules, and circuits described with reference to content disclosed in this application. Alternatively, the processing module 512 may be a combination of processors implementing a computing function, for example, a combination of one or more microprocessors or a combination of a digital signal processor and a microprocessor. The communications module 513 may be a transceiver, a transceiver circuit, a communications interface, or the like. The storage module 511 may be a memory.

Figure 39:
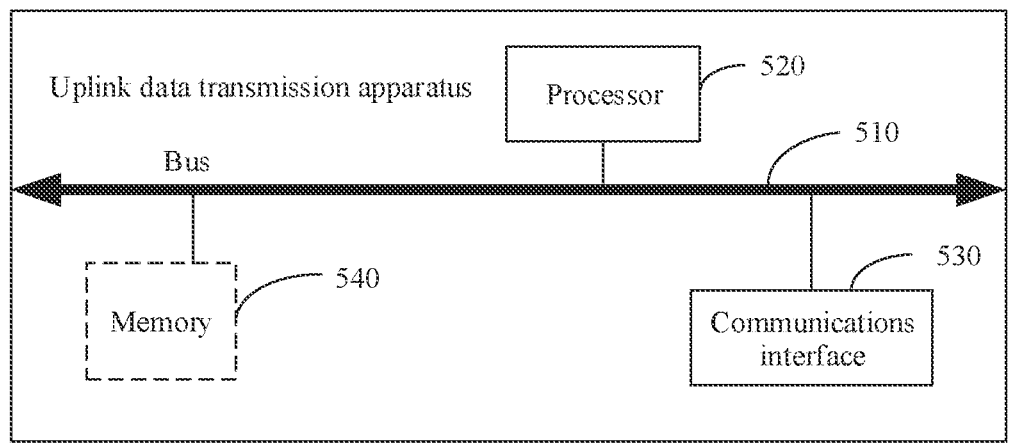
FIG. 39 is a sixth schematic structural diagram of an uplink data transmission apparatus according to an embodiment of this application.

When the processing module 512 is a processor 520, the communications module 513 is a communications interface 530 or a transceiver, and the storage module 511 is a memory 540, the uplink data transmission apparatus in this application may be a device shown in FIG. 39.

The communications interface 530, one or more (including two) processors 520, and the memory 540 are connected to each other through a bus 510. The bus 510 may be a PCI bus, an EISA bus, or the like. The bus may be classified into an address bus, a data bus, a control bus, and the like. For ease of representation, only one thick line is used to represent the bus in FIG. 39, but this does not mean that there is only one bus or only one type of bus. The memory 540 is configured to store the program code and the data that are of the uplink data transmission apparatus. The communications interface 530 is configured to support the uplink data transmission apparatus in communicating with another device (for example, a second device). The processor 520 is configured to support the uplink data transmission apparatus in executing the program code and the data that are stored in the memory 540, to implement S205 and S206 provided in this application.

Figure 40:
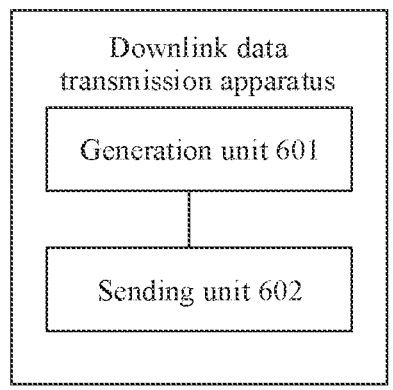
FIG. 40 is a first schematic structural diagram of a downlink data transmission apparatus according to an embodiment of this application.

When an integrated unit is used, FIG. 40 is a schematic diagram of a possible structure of the downlink data transmission apparatus in the foregoing embodiments. The downlink data transmission apparatus may be a third device or a chip in a third device. The downlink data transmission apparatus includes a generation unit 601 and a sending unit 602. The generation unit 601 is configured to support the downlink data transmission apparatus in performing S301 in the foregoing embodiment. The sending unit 602 is configured to support the downlink data transmission apparatus in performing S302 in the foregoing embodiment. All related content of the steps in the foregoing method embodiments may be cited in function descriptions of the corresponding functional modules, and details are not described herein again.

Figure 41:
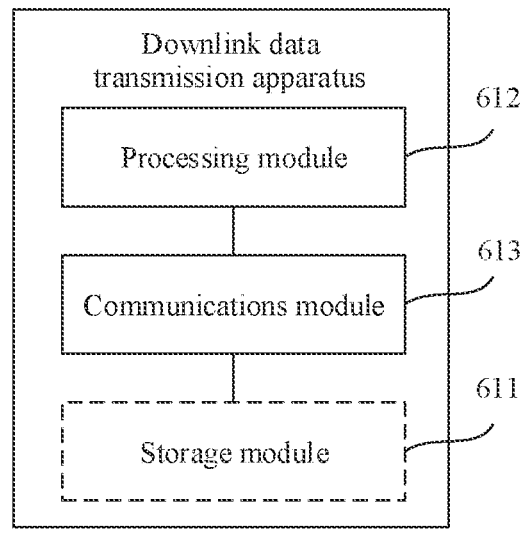
FIG. 41 is a second schematic structural diagram of a downlink data transmission apparatus according to an embodiment of this application.

When an integrated unit is used, FIG. 41 is a schematic diagram of a possible logical structure of the downlink data transmission apparatus in the foregoing embodiments. The downlink data transmission apparatus may be the third device in the foregoing embodiments, or may be a chip applied to the third device. The downlink data transmission apparatus includes a processing module 612 and a communications module 613. The processing module 612 is configured to control and manage an action of the downlink data transmission apparatus. For example, the processing module 612 is configured to perform a step of performing message or data processing on a side of the downlink data transmission apparatus, for example, support the downlink data transmission apparatus in performing S301 in the foregoing embodiment. The communications module 613 is configured to support the downlink data transmission apparatus in performing S302 in the foregoing embodiment, and/or another process that is used for the technology described in this specification and that is performed by the downlink data transmission apparatus.

Optionally, the downlink data transmission apparatus may further include a storage module 611, configured to store program code and data that are of the downlink data transmission apparatus.

The processing module 612 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 612 may implement or execute various example logical blocks, modules, and circuits described with reference to content disclosed in this application. Alternatively, the processing module 612 may be a combination of processors implementing a computing function, for example, a combination of one or more microprocessors or a combination of a digital signal processor and a microprocessor. The communications module 613 may be a transceiver, a transceiver circuit, a communications interface, or the like. The storage module 611 may be a memory.

Figure 42:
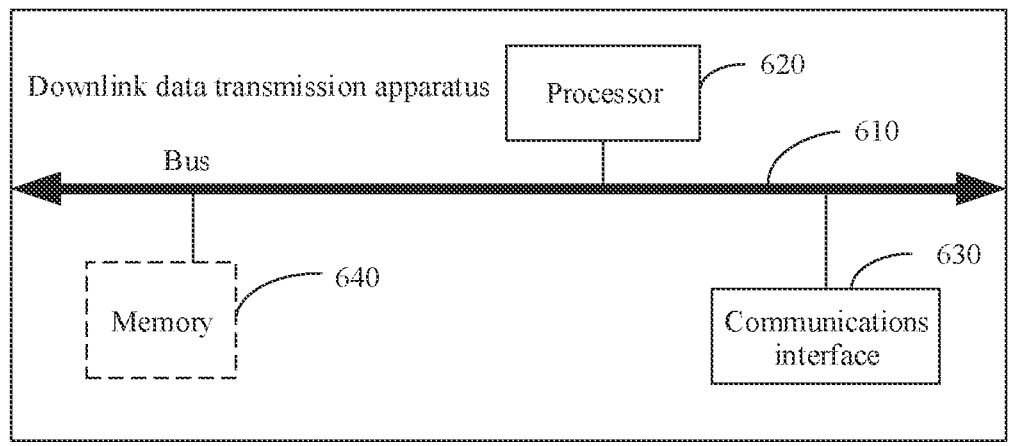
FIG. 42 is a third schematic structural diagram of a downlink data transmission apparatus according to an embodiment of this application.

When the processing module 612 is a processor 620, the communications module 613 is a communications interface 630 or a transceiver, and the storage module 611 is a memory 640, the downlink data transmission apparatus in this application may be a device shown in FIG. 42.

The communications interface 630, one or more (including two) processors 620, and the memory 640 are connected to each other through a bus 610. The bus 610 may be a PCI bus, an EISA bus, or the like. The bus may be classified into an address bus, a data bus, a control bus, and the like. For ease of representation, only one thick line is used to represent the bus in FIG. 42, but this does not mean that there is only one bus or only one type of bus. The memory 640 is configured to store the program code and the data that are of the downlink data transmission apparatus. The communications interface 630 is configured to support the downlink data transmission apparatus in communicating with another device (for example, a first device). The processor 620 is configured to support the downlink data transmission apparatus in executing the program code and the data that are stored in the memory 640, to implement S301 and S302 provided in this application.

Figure 43:
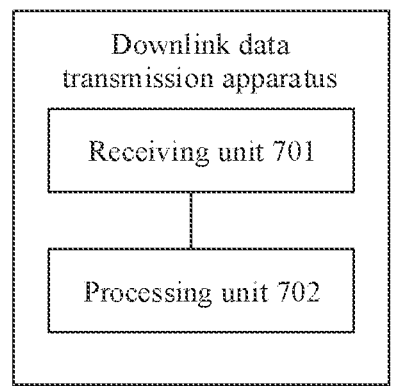
FIG. 43 is a fourth schematic structural diagram of a downlink data transmission apparatus according to an embodiment of this application.

When an integrated unit is used, FIG. 43 is a schematic diagram of a possible structure of the downlink data transmission apparatus in the foregoing embodiments. The downlink data transmission apparatus may be a second device or a chip in a second device. The downlink data transmission apparatus includes a receiving unit 701 and a processing unit 702. The receiving unit 701 is configured to support the downlink data transmission apparatus in performing S305 in the foregoing embodiment. The processing unit 702 is configured to support the downlink data transmission apparatus in performing S306 in the foregoing embodiment. All related content of the steps in the foregoing method embodiments may be cited in function descriptions of the corresponding functional modules, and details are not described herein again.

Figure 44:
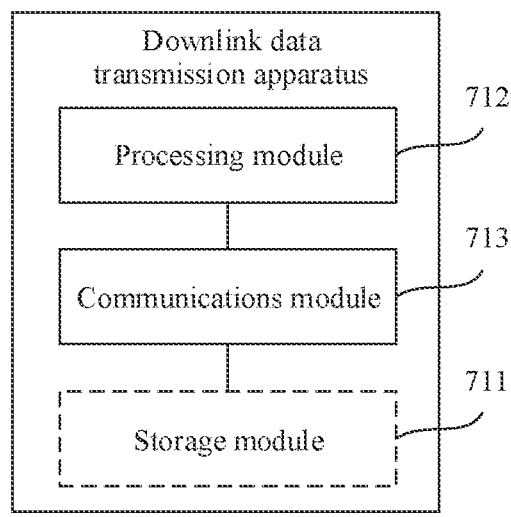
FIG. 44 is a fifth schematic structural diagram of a downlink data transmission apparatus according to an embodiment of this application.

When an integrated unit is used. FIG. 44 is a schematic diagram of a possible logical structure of the downlink data transmission apparatus in the foregoing embodiments. The downlink data transmission apparatus may be the second device in the foregoing embodiments, or may be a chip applied to the second device. The downlink data transmission apparatus includes a processing module 712 and a communications module 713. The processing module 712 is configured to control and manage an action of the downlink data transmission apparatus. For example, the processing module 712 is configured to perform a step of performing message or data processing on a side of the downlink data transmission apparatus, for example, support the downlink data transmission apparatus in performing S306 in the foregoing embodiment. The communications module 713 is configured to support the downlink data transmission apparatus in performing S305 in the foregoing embodiment, and/or another process that is used for the technology described in this specification and that is performed by the downlink data transmission apparatus.

Optionally, the downlink data transmission apparatus may further include a storage module 711, configured to store program code and data that are of the downlink data transmission apparatus.

The processing module 712 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 712 may implement or execute various example logical blocks, modules, and circuits described with reference to content disclosed in this application. Alternatively, the processing module 712 may be a combination of processors implementing a computing function, for example, a combination of one or more microprocessors or a combination of a digital signal processor and a microprocessor. The communications module 713 may be a transceiver, a transceiver circuit, a communications interface, or the like. The storage module 711 may be a memory.

Figure 45:
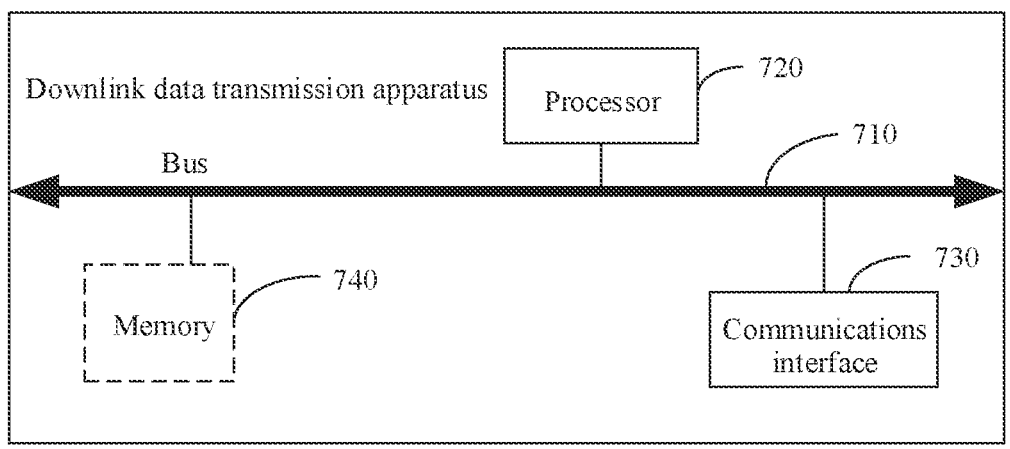
FIG. 45 is a sixth schematic structural diagram of a downlink data transmission apparatus according to an embodiment of this application.

When the processing module 712 is a processor 720, the communications module 713 is a communications interface 730 or a transceiver, and the storage module 711 is a memory 740, the downlink data transmission apparatus in this application may be a device shown in FIG. 45.

The communications interface 730, one or more (including two) processors 720, and the memory 740 are connected to each other through a bus 710. The bus 710 may be a PCI bus, an EISA bus, or the like. The bus may be classified into an address bus, a data bus, a control bus, and the like. For ease of representation, only one thick line is used to represent the bus in FIG. 45, but this does not mean that there is only one bus or only one type of bus. The memory 740 is configured to store the program code and the data that are of the downlink data transmission apparatus. The communications interface 730 is configured to support the downlink data transmission apparatus in communicating with another device (for example, a first device). The processor 720 is configured to support the downlink data transmission apparatus in executing the program code and the data that are stored in the memory 740, to implement S305 and S306 provided in this application.

Figure 46:
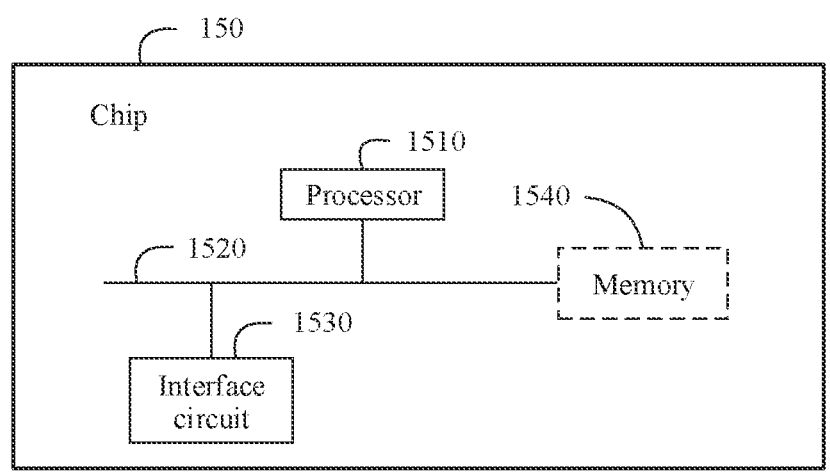
FIG. 46 is a schematic structural diagram of a chip according to an embodiment of this application.

FIG. 46 is a schematic structural diagram of a chip 150 according to an embodiment of this application. The chip 150 includes one or more (including two) processors 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements, an executable module or a data structure, or a subset thereof, or an extension set thereof:

In this embodiment of this application, a corresponding operation is performed by invoking the operation instruction (where the operation instruction may be stored in an operating system) stored in the memory 1540.

In a possible implementation, chips used by a first device, a second device, a third device, and a RAN device are similar, and different apparatuses may use different chips to implement respective functions.

The processor 1510 controls operations of the first device, the second device, the third device, and the RAN device, and the processor 1510 may also be referred to as a central processing unit (CPU). The memory 1540 may include the read-only memory and the random access memory, and provide the instruction and the data for the processor 1510. The part of the memory 1540 may further include the non-volatile random access memory (NVRAM). For example, during application, the memory 1540, the interface circuit 1530, and the memory 1540 are coupled together through a bus system 1520. The bus system 1520 may further include a power bus, a control bus, a status signal bus, and the like in addition to a data bus. However, for clear description, various buses are marked as the bus system 1520 in FIG. 46.

The methods disclosed in the foregoing embodiments of this application may be applied to the processor 1510, or may be implemented by the processor 1510. The processor 1510 may be an integrated circuit chip and has a signal processing capability. In an implementation process, the steps in the foregoing methods may be implemented by using a hardware integrated logic circuit in the processor 1510 or by using an instruction in a form of software. The processor 1510 may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of this application may be implemented or performed. The general purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor.

Optionally, the interface circuit 1530 is configured to perform the receiving and sending steps of the first device, the second device, the third device, and the RAN device in the embodiments shown in FIG. 13, FIG. 14, FIG. 15, FIG. 16, FIG. 17, FIG. 18, FIG. 19A, FIG. 19B, FIG. 19C, FIG. 20A, FIG. 20B, and FIG. 20C.

The processor 1510 is configured to perform the processing steps of the first device, the second device, the third device, and the RAN device in the embodiments shown in FIG. 13, FIG. 14, FIG. 15, FIG. 16, FIG. 17, FIG. 18, FIG. 19A, FIG. 19B, FIG. 19C, FIG. 20A, FIG. 20B, and FIG. 20C.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedures or the functions according to the embodiments of this application are all or partially generated. The computer may be a general purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk, SSD), or the like.

According to one aspect, a computer storage medium is provided. The computer-readable storage medium stores an instruction, and when the instruction is run, a first device or a chip applied to a first device is enabled to perform S102, S103, S104, S106, S108, and S110 in the embodiments, and/or another process that is used for the technology described in this specification and that is performed by the first device or the chip applied to the first device.

According to another aspect, a computer storage medium is provided. The computer-readable storage medium stores an instruction, and when the instruction is run, a RAN device or a chip applied to a RAN device is enabled to perform S101, S105, S107, and S109 in the embodiments, and/or another process that is used for the technology described in this specification and that is performed by the RAN device or the chip applied to the RAN device.

According to still another aspect, a computer storage medium is provided. The computer-readable storage medium stores an instruction, and when the instruction is run, a first device or a chip applied to a first device is enabled to perform S203 and S204, or S303 and S304 in the embodiments, and/or another process that is used for the technology described in this specification and that is performed by the first device or the chip applied to the first device.

According to yet another aspect, a computer storage medium is provided. The computer-readable storage medium stores an instruction, and when the instruction is run, a second device or a chip applied to a second device is enabled to perform S201 and S202 in the embodiments; or a second device or a chip applied to a second device is enabled to perform S305 and S306 in the embodiments.

According to yet another aspect, a computer storage medium is provided. The computer-readable storage medium stores an instruction, and when the instruction is run, a third device or a chip applied to a third device is enabled to perform S205 and S206, or S301 and S302 in the embodiments, and/or another process that is used for the technology described in this specification and that is performed by the third device or the chip applied to the third device.

The foregoing readable storage medium may include any medium that can store program code, such as a USB flash drive, a removable hard disk, a read-only memory, a random access memory, a magnetic disk, or an optical disc.

According to one aspect, a computer program product including an instruction is provided. The computer program product stores the instruction, and when the instruction is run, a first device or a chip applied to a first device is enabled to perform S102, S103, S104, S106, S108, and S110 in the embodiments, and/or another process that is used for the technology described in this specification and that is performed by the first device or the chip applied to the first device.

According to another aspect, a computer program product including an instruction is provided. The computer program product stores the instruction, and when the instruction is run, a RAN device or a chip applied to a RAN device is enabled to perform S101, S105, S107, and S109 in the embodiments, and/or another process that is used for the technology described in this specification and that is performed by the RAN device or the chip applied to the RAN device.

According to still another aspect, an embodiment of this application provides a computer program product including an instruction. The computer program product stores the instruction, and when the instruction is run, a first device or a chip applied to a first device is enabled to perform S203 and S204, or S303 and S304 in the embodiments, and/or another process that is used for the technology described in this specification and that is performed by the first device or the chip applied to the first device.

According to still another aspect, an embodiment of this application provides a computer program product including an instruction. The computer program product stores the instruction, and when the instruction is run, a second device or a chip applied to a second device is enabled to perform S201 and S202, or S305 and S306 in the embodiments, and/or another process that is used for the technology described in this specification and that is performed by the second device or the chip applied to the second device.

According to another aspect, an embodiment of this application provides a computer program product including an instruction. The computer program product stores the instruction, and when the instruction is run, a third device or a chip applied to a third device is enabled to perform S205 and S206, or S301 and S302 in the embodiments, and/or another process that is used for the technology described in this specification and that is performed by the third device or the chip applied to the third device.

According to one aspect, a chip is provided. The chip is applied to a first device, the chip includes one or more (including two) processors and an interface circuit, the interface circuit is interconnected to the one or more (including two) processors through a line, and the processor is configured to run an instruction to perform S102, S103, S104, S106, S108, and S110 in the embodiments, and/or another process that is used for the technology described in this specification and that is performed by the first device.

According to another aspect, a chip is provided. The chip is applied to a RAN device, the chip includes one or more (including two) processors and an interface circuit, the interface circuit is interconnected to the one or more (including two) processors through a line, and the processor is configured to run an instruction to perform S101, S105, S107, and S109 in the embodiments, and/or another process that is used for the technology described in this specification and that is performed by the RAN device.

According to still another aspect, a chip is provided. The chip is applied to a first device, the chip includes one or more (including two) processors and an interface circuit, the interface circuit is interconnected to the one or more (including two) processors through a line, and the processor is configured to run an instruction to perform S203 and S204, or S303 and S304 in the embodiments, and/or another process that is used for the technology described in this specification and that is performed by the first device.

According to another aspect, a chip is provided. The chip is applied to a second device, the chip includes one or more (including two) processors and an interface circuit, the interface circuit is interconnected to the one or more (including two) processors through a line, and the processor is configured to run an instruction to perform S201 and S202, or S305 and S306 in the embodiments, and/or another process that is used for the technology described in this specification and that is performed by the second device.

According to still another aspect, a chip is provided. The chip is applied to a third device, the chip includes one or more (including two) processors and an interface circuit, the interface circuit is interconnected to the one or more (including two) processors through a line, and the processor is configured to run an instruction to perform S205 and S206, or S301 and S302 in the embodiments, and/or another process that is used for the technology described in this specification and that is performed by the third device.

In addition, this application further provides a communications system. The communications system includes the configuration apparatus shown in FIG. 25 to FIG. 27 and the configuration apparatus shown in FIG. 28 to FIG. 30.

According to another aspect, an embodiment of this application provides a communications system. The communications system includes the uplink/downlink data transmission apparatus shown in FIG. 31 to FIG. 33, the uplink data transmission apparatus shown in FIG. 34 to FIG. 36, and the uplink data transmission apparatus shown in FIG. 37 to FIG. 39.

According to still another aspect, an embodiment of this application provides a communications system. The communications system includes the uplink/downlink data transmission apparatus shown in FIG. 31 to FIG. 33, the downlink data transmission apparatus shown in FIG. 40 to FIG. 42, and the downlink data transmission apparatus shown in FIG. 43 to FIG. 45.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or the functions according to the embodiments of this application are all or partially generated. The computer may be a general purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the scope of this application. In this way, this application is intended to cover these modifications and variations of this application provided that they fall within the scope of protection defined by the claims of this application and their equivalent technologies.

What is claimed is:

1. A method for wireless communications, comprising:
receiving, by a network device and from a centralized unit (CU) of a donor node, a routing configuration of a transmission path for a layer of the network device and a mapping relationship for the network device to perform data transmission on the transmission path, wherein the routing configuration comprises an identifier of a first wireless backhaul node, wherein the network device is a distributed unit (DU) of the donor node or a second wireless backhaul node connected to the DU, wherein the CU and at least one wireless backhaul node comprising the first wireless backhaul node is on the transmission path, wherein the layer of the network device is capable of mapping, on a backhaul link based on identification information related to quality of service (QoS) requirement comprised in a data packet, the data packet to a radio link control (RLC) channel on a backhaul link for sending the data packet to a next-hop node of the network device on the transmission path, and wherein the mapping relationship indicates a mapping between a first RLC channel on a prior-hop wireless interface of the network device and a second RLC channel on a next-hop wireless interface of the network device; and
performing, by the network device, the routing configuration on the layer.

2. The method according to claim 1, wherein the routing configuration further comprises an identifier of the next-hop node and an identifier of the transmission path.

3. The method according to claim 1, wherein the network device is the wireless backhaul node connected to the DU, and the method further comprises:
receiving, by the network device and from the CU, indication information indicating an automatic repeat request (ARQ) mode of the network device at RLC layer.

4. The method according to claim 1, wherein the network device is the wireless backhaul node connected to the DU, and the method further comprises:
receiving, by the network device and from the CU, information for configuring a packet data convergence protocol (PDCP) layer of the network device, wherein the PDCP layer of the network device is a peer layer of a PDCP layer of the CU or is a peer layer of a PDCP layer of the DU.

5. A method for wireless communications, comprising:
determining, by a centralized unit (CU) of a donor node, a routing configuration of a transmission path for a layer of a network device; and
sending, by the CU and to the network device, the routing configuration and a mapping relationship for the network device to perform data transmission on the transmission path, wherein the routing configuration comprises an identifier of a first wireless backhaul node, wherein the network device is a distributed unit (DU) of the donor node or a second wireless backhaul node connected to the DU, wherein the CU and at least one wireless backhaul node comprising the first wireless backhaul node is on the transmission path, wherein the layer of the network device is capable of mapping, on a backhaul link based on identification information related to quality of service (QoS) requirement comprised in a data packet, the data packet to a radio link control (RLC) channel on a backhaul link for sending the data packet to a next-hop node of the network device on the transmission path, and wherein the mapping relationship indicates a mapping between a first RLC channel on a prior-hop wireless interface of the network device and a second RLC channel on a next-hop wireless interface of the network device.

6. The method according to claim 5, wherein the routing configuration further comprises an identifier of the next-hop node and an identifier of the transmission path.

7. The method according to claim 5, wherein the network device is the wireless backhaul node connected to the DU, and the method further comprises:
sending, by the CU and to the network device, indication information indicating an automatic repeat request (ARQ) mode of the network device at RLC layer.

8. The method according to claim 5, wherein the network device is the wireless backhaul node connected to the DU, and the method further comprises:
sending, by the CU and to the network device, information for configuring a packet data convergence protocol (PDCP) layer of the network device, wherein the PDCP layer of the network device is a peer layer of a PDCP layer of the CU or is a peer layer of a PDCP layer of the DU.

9. A communications system, comprising a network device and a centralized unit (CU) of a donor node; wherein
the network device is configured to receive, from the CU, a routing configuration of a transmission path for a layer of the network device and a mapping relationship for the network device to perform data transmission on the transmission path, wherein the routing configuration comprises an identifier of a first wireless backhaul node, wherein the network device is a distributed unit (DU) of the donor node or a second wireless backhaul node connected to the DU, wherein the CU and at least one wireless backhaul node comprising the first wireless backhaul node is on the transmission path, wherein the layer of the network device is capable of mapping, on a backhaul link based on identification information related to quality of service (QoS) requirement comprised in a data packet, the data packet to a radio link control (RLC) channel on a backhaul link for sending the data packet to a next-hop node of the network device on the transmission path, and wherein the mapping relationship indicates a mapping between a first RLC channel on a prior-hop wireless interface of the network device and a second RLC channel on a next-hop wireless interface of the network device;
the CU is configured to send the routing configuration to the network device; and
the network device is further configured to perform the routing configuration on the layer.

10. The communications system according to claim 9, wherein the routing configuration further comprises an identifier of the next-hop node and an identifier of the transmission path.

11. The communications system according to claim 9, wherein the network device is the wireless backhaul node connected to the DU, and the network device is further configured to receive, from the CU, indication information indicating an automatic repeat request (ARQ) mode of the network device at RLC layer.

12. The communications system according to claim 9, wherein the network device is the wireless backhaul node connected to the DU, and the network device is further configured to receive, from the CU, information for configuring a packet data convergence protocol (PDCP) layer of the network device, wherein the PDCP layer of the network device is a peer layer of a PDCP layer of the CU or is a peer layer of a PDCP layer of the DU.

\* \* \* \* \*